(12) United States Patent
Fetik

(10) Patent No.: US 10,732,891 B2
(45) Date of Patent: Aug. 4, 2020

(54) SECURE APPLICATION ACCELERATION SYSTEM AND APPARATUS

(71) Applicant: Richard Fetik, Monterey, CA (US)

(72) Inventor: Richard Fetik, Monterey, CA (US)

(*) Notice: Subject to any disclaimer, the term of this patent is extended or adjusted under 35 U.S.C. 154(b) by 0 days.

(21) Appl. No.: 16/205,219

(22) Filed: Nov. 29, 2018

(65) Prior Publication Data

US 2019/0095129 A1 Mar. 28, 2019

Related U.S. Application Data

(60) Division of application No. 15/276,657, filed on Sep. 26, 2016, now Pat. No. 10,180,809, which is a
(Continued)

(51) Int. Cl.
| | |
|---|---|
| *G11C 29/52* | (2006.01) |
| *G06F 3/06* | (2006.01) |
| *G06F 8/61* | (2018.01) |
| *G06F 9/445* | (2018.01) |
| *H04L 29/06* | (2006.01) |

(Continued)

(52) U.S. Cl.
CPC .......... *G06F 3/0653* (2013.01); *G06F 3/0604* (2013.01); *G06F 3/0673* (2013.01); *G06F 8/61* (2013.01); *G06F 9/445* (2013.01); *G06F 21/44* (2013.01); *G06F 21/552* (2013.01); *G06F 21/6209* (2013.01); *G06F 21/78* (2013.01); *H04L 63/0209* (2013.01); *H04L 63/101* (2013.01); *H04L 67/1097* (2013.01); *G06F 21/62* (2013.01); *G06F 2221/2141* (2013.01); *H04L 63/0227* (2013.01)

(58) Field of Classification Search
None
See application file for complete search history.

(56) References Cited

U.S. PATENT DOCUMENTS

2006/0236033 A1* 10/2006 Guinn ................. G06F 12/0871
  711/118
2007/0198722 A1*  8/2007 Kottomtharayil ....... H04L 12/66
  709/226

(Continued)

*Primary Examiner* — Venkat Perungavoor
(74) *Attorney, Agent, or Firm* — Hamrick IP-Law Office; Claude A. S. Hamrick

(57) ABSTRACT

An improved data storage device including an improved storage controller that enables the acceleration of datacenter software by making it easier to deploy application software portions (applets) onto storage devices in a manner that best supports runtime performance acceleration of storage-network-latency-throttled applications. Means are defined for how server hosted applications cause to have provisioned, initiate execution of, and work with a multitude of applets disposed for execution proximate to storage contents on a multitude of storage devices. This invention supports the multi-exabyte growth of data storage, by scaling performance acceleration linearly with the growth in the number of storage devices. This in turn supports the evolving cloud and Enterprise Cognitive Computing datacenter by providing the infrastructure necessary for accelerating applications that face enormous heterogeneous datasets. This includes Big Data Analytics of problems that have eluded successful analysis.

24 Claims, 19 Drawing Sheets

Overview of AppAccel Invention

Related U.S. Application Data continuation-in-part of application No. 13/925,822, filed on Jun. 24, 2013, now Pat. No. 9,455,955, which is a continuation-in-part of application No. 12/820,137, filed on Jun. 21, 2010, now Pat. No. 8,474,032, which is a continuation-in-part of application No. 11/803,947, filed on May 15, 2007, now Pat. No. 7,743,260.

(60) Provisional application No. 60/747,536, filed on May 17, 2006.

(51) Int. Cl.
    *H04L 29/08*     (2006.01)
    *G06F 21/44*     (2013.01)
    *G06F 21/55*     (2013.01)
    *G06F 21/62*     (2013.01)
    *G06F 21/78*     (2013.01)
    *H04L 29/02*     (2006.01)

(56) References Cited

U.S. PATENT DOCUMENTS

| | | | |
|---|---|---|---|
| 2008/0120440 A1* | 5/2008 | Balasubramanian | G06F 11/328 710/19 |
| 2008/0282030 A1* | 11/2008 | Kalwitz | G06F 3/0613 711/114 |
| 2009/0249116 A1* | 10/2009 | Bartfai | G06F 11/2066 714/6.12 |
| 2013/0204960 A1* | 8/2013 | Ashok | G06F 15/17 709/213 |
| 2014/0173145 A1* | 6/2014 | Hatasaki | G06F 13/10 710/74 |
| 2015/0199131 A1* | 7/2015 | Powers | G06F 3/0608 711/114 |
| 2016/0231934 A1* | 8/2016 | Gensler, Jr. | G06F 3/0604 |
| 2016/0359622 A1* | 12/2016 | Bunch | H04L 9/0822 |

* cited by examiner

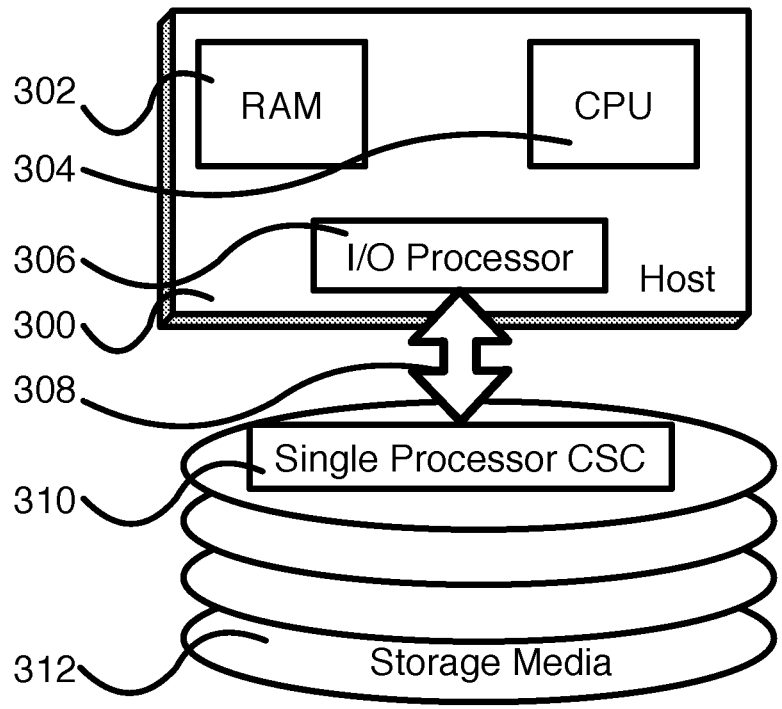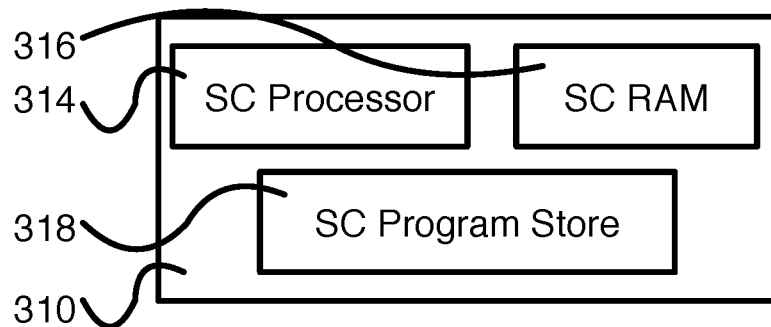
**Figure 8A
Customizable Storage Controller,
Single Processor**

Customizable Storage Controller,
Single Processor, Internals**

Customizable Storage Controller
with Security Coprocessor**

Customizable Storage Controller
with Security Coprocessor, Internals**

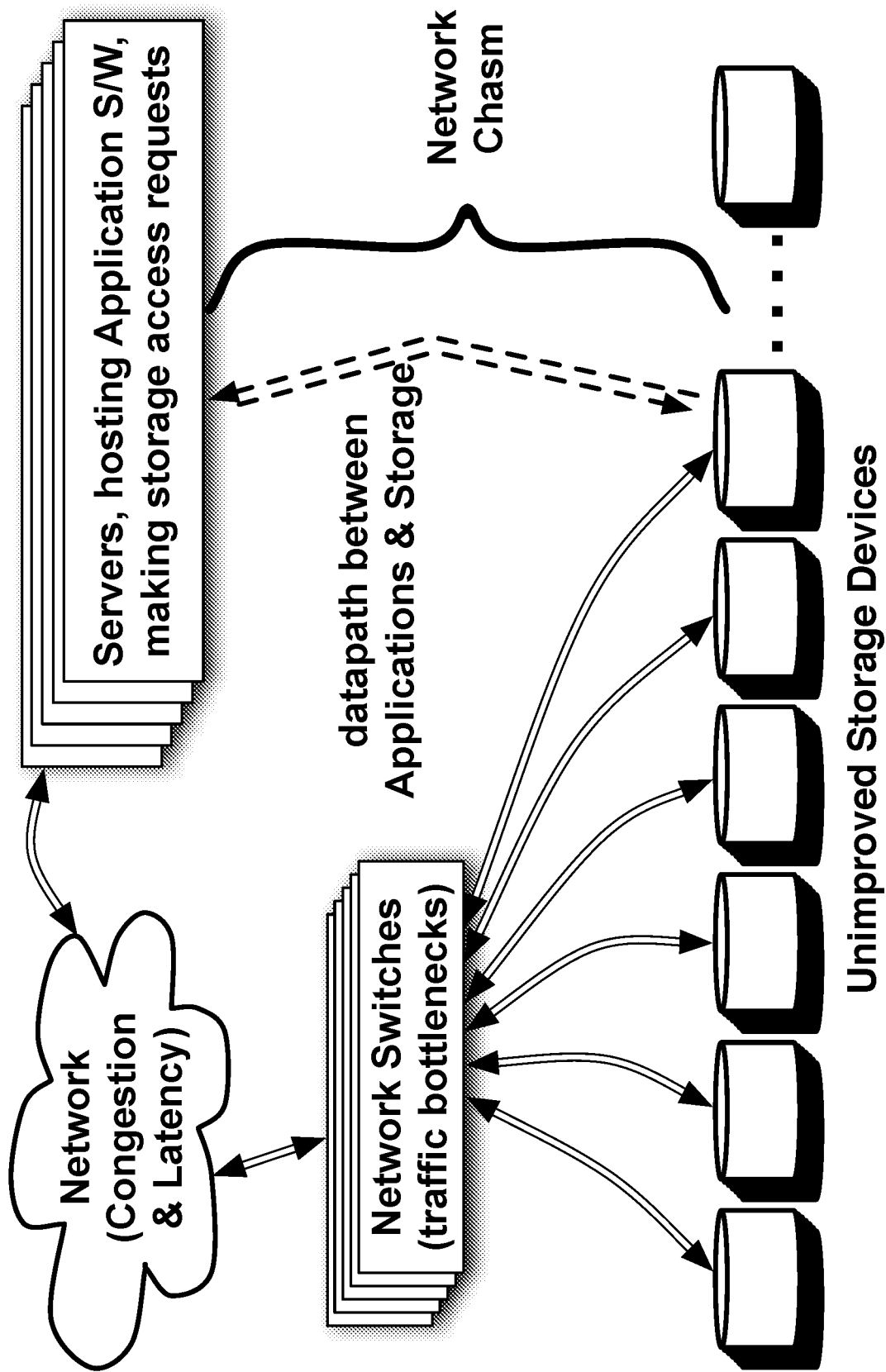
Figure 10 Background: Servers to Storage Devices

Overview of AppAccel Invention

Figure 12 AppAccel Software Execution Environment

Figure 13 Analytics to SCAP Interaction

Figure 14 Installation and Management of SCAP

Figure 15 Initiate SCAP Execution

Server Hosted Analytics Application (SHAA) using SCAPs to parallel search multiple storage devices

SECURE APPLICATION ACCELERATION SYSTEM AND APPARATUS

CROSS REFERENCE TO RELATED APPLICATIONS

This Application Ser. No. 16205219 is a Divisional of and claims priority to my pending application Ser. No. 15/276,657 filed Sep. 26, 2016 (now allowed as U.S. Pat. No. 10,180,809), and titled "Secure Application Acceleration System and Apparatus", which is a Continuation-In-Part of and claims priority to my prior U.S. Pat. No. 9,455,955, granted on patent application Ser. No. 13/925,822, filed Jun. 24, 2013, titled "Customizable Storage Controller With Integrated F+ Storage Firewall" (sometimes referred to herein as my "CIP#2 patent"), which is a Continuation-In-Part of and claims priority to my prior U.S. Pat. No. 8,474,032, (sometimes referred to herein as my "CIP#1 patent") granted on U.S. patent application Ser. No. 12/820,137, filed Jun. 21, 2010, titled "FIREWALL+STORAGE APPARATUS, METHOD AND SYSTEM", which is a Continuation-In-Part of and claims priority to my prior U.S. Pat. No. 7,743,260 (sometimes referred to herein as my "base patent") granted on U.S. patent application Ser. No. 11/803,947, filed May 15, 2007, titled "FIREWALL+STORAGE APPARATUS, METHOD AND SYSTEM" and claims priority to my prior U.S. Provisional Patent Application Ser. No. 60/747,536 filed May 17, 2006 and titled "Storage Firewall and FlashApp Support Technology", the disclosed subject matter of all of the above being expressly incorporated herein by reference.

FIELD OF THE INVENTION

The present invention generally relates to systems, methods and apparatus for running search and other application software on a storage device, and sets of storage devices, especially search software tailored to the contents of a storage device, where the software is part of a larger application or application framework such as a Big Data Analytics application.

BACKGROUND AND SUMMARY OF THE INVENTION

The present AppAccel invention disclosure is an expression of, derivation of, and application of technologies described in my prior Provisional Patent application and later F+ and Customizable Storage Controller (CSC) patents identified above.

This application relates to the cloud and Enterprise datacenter as a thinking machine, or rather as the infrastructure necessary for (hosting) processes (applications) that provide functionality that mimics thinking, that provide problem solving, that solves real world problems (Cognitive Computing). Some of this problem solving will be real-time reaction to real-world changing conditions for smarter factories, air, rail, and road traffic systems, medical and other healthcare, weather & atmospheric patterns (tornados, tropical storm systems, etc.), etc. Others may include 'batch' analysis of deep problems that have eluded successful analysis before now. Some will be decision support systems that collaborate with human decision-making and analysis in real time for opportunities such as market trading.

But the scope of this evolution of the datacenter is to create a foundation for thinking machines that solve problems that have high social and economic value.

The datacenter infrastructure currently includes the servers, storage resources, and the network that harnesses these together. 'Cognitive Computing As A Service' (CCaaS) is the next evolutionary step, benefiting from both the CSC storage improvements and the Application Acceleration (AppAccel) invention disclosed herein.

This application discloses an enabling technology, an approach to positioning storage-network-latency-throttled executables closer to the relevant storage contents. The example used in the preferred embodiment is "search", which is foundational to analytics and other algorithm types. This technology is useful no matter what network topologies or technologies are considered, and no matter what server or storage technologies are employed, so long as the network connected storage devices can host user designated runtime executables.

This application disclosure is for the system, methods, and/or mechanisms used to run search and other software on a storage device, especially search software tailored to the contents of the storage device, where the software is part of a larger application or application framework such as a Big Data Analytics application.

The objectives include accelerating datacenter applications, especially Big Data Analytics and Cognitive Computing, by reducing network traffic, reducing the number of server to storage round-trips, positioning search proximate to data, and enable "deeper" search and constant re-search This disclosed technology also supports the emerging datacenter storage architectures and Software Defined Data Center (SDDC) paradigm intended to deal with the enormous scaling of storage resources. It is not limited to the use of Ethernet (TCP, IP), or some other connection mechanism such as FC (iSCSI), etc.; all network (or network-like channel) connected storage interfaces and storage device types can be supported by this invention, including those not yet invented.

This disclosure is an expression of, derivation of, and application of the Bubble technology described in my Provisional Application No. 60/747,536, filed May 17, 2006, and subsequently granted F+ patents, and applies my F+ Storage Firewall technology and Customizable Storage Controller (CSC) technology disclosed in my above identified U.S. patents.

Cloud datacenters are evolving and growing in importance. There are several complementary technology families interacting to create this success. The present AppAccel invention affects several of these with complementary improvements.

The novel, unobvious, and useful technology disclosed in this application relate to the acceleration of analytics algorithms running in data-centers against very large datasets.

The problem being solved is the slow execution of important software due to latency caused by large numbers of storage access requests across data-center networks (or other communication links).

This invention is derived from that subject matter disclosed in part in my above identified Provisional and Utility patent applications disclosures of FlashApp Bubbles on USB Flash Drives, as well Storage Firewall and CSC technologies, and all first-to-invent rights thereto are claimed herein.

The CSC technology provides a way to store ready for execution ('host') and execute application software on CSC-equipped storage devices. There is a use for this in accelerating Big Data analytics algorithms. The portions of the application software run (hosted) on the storage devices' improved storage controllers are those that otherwise would make the largest number of storage accesses, therefore the largest number of over-the-network storage transactions. The result is that these portions of software run faster, and there are a smaller number of network transactions, albeit perhaps larger network messages.

The best candidate algorithms for running on the storage devices (close to the data) include search. All Big Data Analytics employ some type of search, so these are immensely accelerated. It does not matter whether Ethernet (TCP, IP), or some other connection mechanism such as FC (iSCSI), etc., all network (or network-like channel) connected storage interfaces and storage device types can be supported by the improved storage controller of this application acceleration invention, including future extensions thereof.

My prior patents introduced my Customizable Storage Controller (CSC) technology as an application of, and set of improvements to, my F+ Storage Firewall and Support System platform technologies, for the purposes of supporting multiple storage controller softwares, updating these as needed, and securely running applet portions of Enterprise and Cloud application software close to the corresponding stored (and protected) data. The CSC device and data security technologies relate to how the CSC protects itself (threat model, protection mechanisms).

The ability to host and support application software on compatible storage devices enables an important innovation, resulting in this present AppAccel invention, the acceleration of Big Data Analytics applications, and other important datacenter application software. This acceleration effect is partly provided by dramatically reducing the number of round trips between datacenter application servers and storage, by running storage-facing portions of the application software on the storage devices. Each storage access network round-trip has storage and network stack latency costs; many of these round trips can be eliminated by the invention disclosed below.

This disclosure describes how to accelerate Big Data Analytics and other applications that work across large datasets. The focus is on data centric (really dataset centric) algorithms, enhanced storage and application execution services, with much shorter elapsed time required to complete or achieve useful results on very large and exabyte scale datasets.

AppAccel Achieves the Performance Goal

The objective of the datacenter architect and others concerned with application performance should be to reduce the actual elapsed time required to search a possibly large number of possibly very large datasets, looking for correspondence with results of other searches.

The latency imposed by accessing storage over network links has to be reduced, and the cost of sequentially searching a very large number of storage devices has to be eliminated. The CSC permits the storage devices to be searched in parallel, with many fewer network round trips from the servers.

This speeds up application software in proportion to the size of (the magnitude) of the data and the extent to which the application's algorithm matches the paradigmatic analytics algorithm dissected in this disclosure specification.

So, the benefits include:
Reduced network traffic and next to data;
Object model for applet, so applets can be implemented as Bubbles!; and
Distributable among storage devices.
Object model for data by itself does not improve the performance of applications, but a model that provides for distributed data sets can grow (scale) better than bringing data adjacent to server blades (Clusters, in-Memory, etc.)

The present AppAccel invention reduces the effect of network congestion and latency by running query & search algorithms as close as possible to storage media. This permits Big Data Analytics algorithms, as provisioned applets (SCAPs), to run at local storage access performance, without network latency slowing the data access. This supports running server-hosted application software with high performance access to data.

Consider what a big data analytics algorithm is, under the covers; it is an analysis (compare and rank) algorithm acting on the results of non-SQL "joins" across heterogeneous data sets. Why non-SQL? Because these data sets don't fit into neat tables in a relational database.

These non-SQL joins are really the joins of the results of searches of these data sets, which may extend over many storage devices in possibly more than one storage pool.

Each of these non-SQL joins, therefore, requires a great many searches of the respective datasets; without the present AppAccel invention, these searches have a large number of storage access round-trips across network links.

In addition, the present AppAccel invention provides the facility for optimized search applets that are application aware and data set aware. This means that applets can be built so as to conform to the requirements and design of server-hosted applications, and also to be performance optimized for particular datasets.

If the structure of key analytics algorithms could be distilled into their essence, it might look something like this:
a) Rank or compare the elements in a set (list, array, table) of tuples (1 to N components per tuple, no requirement the tuples be of equal length);
b) Where these tuples are the result of searches of one or more datasets, or of non-SQL joins, or of SQL joins;
c) Where non-SQL joins are tuples or tuple sets (aka tables) put together as synthetic, perhaps temporary, objects, as a result of searches of one or more datasets.

The key to all of this is the speed with which a possibly large number of possibly very large datasets can be searched, looking for correspondence with results of other searches.

Therefore, to accelerate Big Data Analytics, put storage close to, next to, or interleaved with processing (reduced network latency, etc.). Since another objective is to scale out the storage to accommodate the exa-scale and yotta-scale data deluge, the processor to storage relationships have to change.

The present AppAccel invention sees large performance improvements in areas that have significance such as search, big data analytics, and other server-hosted applications, by applying AppAccel to needle-in-haystack and other solutions whose underlying structure includes some sort of search, non-SQL join, rank or compare.

This is enabled by the benefits of the present AppAccel invention:
Eliminating a significant percentage of server-hosted application storage access requests to & from storage devices, therefore reducing a significant number of network round-trips, network & storage stack latency, etc.;
Reducing network congestion, consequently speeding up other server-hosted applications' access to data and other resources;
Improving SDS storage pool average response time as well as storage pool throughput
Operations next to Storage (Reduced Network Latency);
Parallelism;

Dataset aware, storage volume aware, aware of the larger application, efficient access protocol (ex: optimized search applet);

Support In-Situ Processing, and Rack-Scale Flash; and

Providing a significant server-hosted application performance improvement; depending on the design of the server-hosted application, application framework, algorithm, and data set, this performance gain may be as much as 100 times to 1000 times or more.

It is therefore an objective of the present AppAccel invention to provide a high performance solution to datacenter performance difficulties with Big Data Analytics and exa-scale datasets.

Another objective of the present invention to provide a system, method and apparatus to run search and other data access operations on a storage device.

Another objective of the present invention to provide a system, method and apparatus to run search and other data access operations on a storage device, so as to search the contents of that storage device in much less time.

Another objective of the present invention to provide a system, method and apparatus to run search and other data access operations on a storage device, where the software is part of a larger application or application framework such as a Big Data Analytics application, so as to run data center applications in much less time.

Another objective of the present invention to provide a system, method and apparatus to run search and other data access operations on a storage device, especially search software tailored to the contents of the storage device.

Another objective of the present invention to provide a system, method and apparatus to run search and other data access operations on a storage device, especially search software tailored to the contents of the storage device, so as to search the contents of that storage device in even less time.

Another objective of the present invention to provide a system, method and apparatus to run search and other data access operations on a storage device, especially search software tailored to the contents of the storage device, so as to discover results that might not have been discovered in any other way.

Another objective of the present invention to provide a system, method and apparatus to run search and other data access operations on a storage device, especially search software tailored to the contents of the storage device, where the software is part of a larger application or application framework such as a Big Data Analytics application, so as to run data center applications in much less time.

Another objective of the present invention to provide a system, method and apparatus to run search and other data access operations on a storage device, in order to run a continual re-search of the storage device as data streams on to it and as data on it is modified by other means, so as to discover results that might not have been discovered in any other way Another objective of the present invention to provide a system, method and apparatus to run search and other data access operations on a storage device, especially search software tailored to the contents of the storage device, in order to run a continual research of the storage device as data streams on to it and as data on it is modified by other means, so as to discover results that might not have been discovered in any other way.

This solution consists of an improved execution environment for Datacenter server-hosted applications with high storage access requirements.

SUMMARY

Accordingly, an improved storage controller is disclosed that enables the acceleration of datacenter software, by making it easier to deploy application software portions (applets) onto storage devices, in a manner that best supports runtime performance acceleration of storage-network-latency-throttled applications. Means are defined for how server hosted applications cause to have provisioned, initiate execution of, and work with a multitude of applets on a multitude of storage devices, proximate to storage contents. This invention supports the multi-exabyte growth of data storage, by scaling performance acceleration linearly with the growth in the number of storage devices. This in turn supports the evolving cloud and Enterprise Cognitive Computing datacenter by providing the infrastructure necessary for accelerating applications that face enormous heterogeneous datasets. This includes Big Data Analytics of problems that have eluded successful analysis.

Big Data Analytics Performance

Some of the concepts and terms used or introduced in this disclosure include:

Server-side is the array of servers, server blades, and other compute resources;

Storage-side is the pool of storage resources, no matter how it is arranged;

Server-side needs to use resources located on the storage-side; and

The network chasm is a gap (of time) caused by the very activity the data center was built to handle: as the data center activity increases, the network chasm grows larger.

The biggest drag on the performance of server-hosted software that makes heavy use of network-connected storage is the network latency between the server and storage pool.

Another drag on the performance of server-hosted software that makes heavy use of network-connected storage is the architecture of the software; it generally was not designed for current conditions such as the ability to run parts of itself in parallel on storage devices.

FIG. 10 of the Drawing is a block diagram of a datacenter network diagram that illustrates the background of the problem being solved: namely, network chasm, a performance gap caused by switch congestion, network latency, where parallelism across servers actually aggravates the (increases) overall performance problem as each of these accesses multiple storage devices.

Datacenter Background and Problems

Traditional networks and data centers are being stretched to their limits. They were never designed for today's astronomical growth in the size and number of datasets, and the number of datacenter applications with high demands on the storage access communication network.

Professor Michael Coey, a principal investigator at Trinity College Dublin's School of Physics and SFI funded AMBER (Advanced Materials and BioEngineering Research) Centre has been quoted as saying:

"The flood of digital data is growing every year and new storage concepts are urgently needed to sustain the information revolution. Forecasts envisage 20.8 billion wirelessly-connected 'things' throughout the world by 2020. At present, it is estimated that 5.5 million new ones are connected every day. This is a huge challenge for mass storage, which currently relies on HDDs. Everything we download daily onto our computers or mobile phones is stored magnetically on millions of these spinning discs located in data centres scattered across the planet."

Source: http://www.tcd.ie/Physics/news-events/news/

The designs of current datacenters' legacy technologies were intended to address today's needs. Architected in a previous era and deployed as storage silos, these datacenters were not designed to handle exa-scale data loads and highly available applications. And there is little flexibility in the designs of these datacenters and their components to adapt to new architectures.

The challenges of improving the performance of datacenter applications include:

Coordination (Orchestration) of work across server blades;

Network Latency, and difficulty of converting legacy applications to datacenter architectures;

Storage device and data set management; and

Orchestration of heterogeneous 3rd party mechanisms & algorithms.

Cloud Computing Overview

Cloud computing is transforming IT delivery and services. Cloud computing fundamental principles include:

Greater flexibility, Configurability, and Prompt activation of new services;

Rapid capacity expansion, and support for massive execution and data scale-out;

Control, Security, Automated deployment and provisioning;

Compliance to regulatory requirements;

Uptime, Availability, Stability, and Data Integrity;

Faster performance;

Abstraction between layers, views, etc.; and

Faster software development.

Current best practices include proprietary technological solutions for security and data management, Cloud services and their administration, and the increasing use of web and service oriented architectures.

A limiting factor to the broader adoption of Cloud services is network and storage access latency, which delay application performance. The use of my presently described invention will partially resolve the network and storage latency issues, which will improve application performance.

Evolution from the One-Size-Fits-all Cloud

Currently, the one-size-fits-all cloud is being transformed by several trends. The factors pushing cloud evolution include the scale of the increasing data and workload with essentially flat IT budgets.

The older cloud approach is for a cloud service provider to force all applications to fit a common set of virtualization technologies and underlying infrastructure. The direction of datacenter evolution is towards more flexibility, with Software Defined Data Center (SDDC), Software Defined Networking (SDN), Software Defined Storage (SDS)—more on SDS below—and other Software Defined technology areas.

The problem being addressed, and the solution set (tool set) being used to address the problem, impose requirements on the datacenter and storage infrastructure.

The requirements and requirement drivers include:

HADOOP clusters, CEPH clusters, rack scale computing, clusters-yet-to-be-defined;

Non-SQL databases and other Non-SQL datasets;

Big Data Analytics algorithms, data mining, etc.;

Exa-scale (exabyte scale) datasets, faster performance;

Data security (integrity, assurance, etc.);

DLP, SOX, etc., compliance; and

Future-proofing access to datasets and reproducible results.

There are attempts being made to develop more flexible technology for cloud computing infrastructure, such as 'software defined storage'. This more flexible approach to storage architecture will initially improve application performance, and is expected to later be part of a new cloud that will enable next-generation applications, new revenue streams for the cloud providers as well as their customers.

Current State of the Art in Cloud Computing

Converged, Hyperconverged, Cloud Clusters, Cloud-in-a-Box, . . . .

Nutanix has been selling Hyper-converged 2U cloud servers, which combine the server, storage, virtualization software, management, etc., suitable for clustering. The goal of these "cloud-in-a-box" appliances is to reduce the costs associated with building Enterprise and datacenter cloud clusters, to accelerate the movement of large applications to virtualization environments.

From the Nutanix main webpage http://www.nutanix.com/

"Hyper-converged infrastructure natively integrates compute and storage into a single x86 based server deployed in scale-out clusters. It reduces power and space, and eliminates storage complexity. Built-in virtualization makes infrastructure truly invisible, shifting focus back to applications."

From an online article http://www.pcworld.com/article/3040833/hpe-will-take-on-nutanix-and-cisco—with-hyper-converged-system.html Hyper-converged systems combine storage, compute and networking functions in a single product that's often sold as an appliance. As the name suggests, they're an evolution of converged systems but with components that are more tightly coupled.

Converged systems, like VCE's Vblocks, tend to be higher-end products customized for particular workloads at large enterprises. Hyper-converged systems have found traction at mid-sized companies and tend to cost less and use less customization.

Research firm IDC says they became popular for running virtual desktops but have expanded to support other workloads. IDC expects the hyperconverged market to grow by 60 percent per year through 2019, reaching nearly $4 billion in sales.

Benefits claimed for the Nutanix Hyperconverged approach (on the Nutanix main webpage http://www.nutanix.com/) include 1. Lower Costs: 40-60% Reduction in overall CapEx and OpEx.
2. Limitless Scalability: Scale infrastructure predictably with no limits.
3. Fastest Time-to-Value: Faster time to value in buying, deploying, and managing.
4. Smallest Footprint: Up to 90% Reduction in power, cooling, and space with a 2U form factor.
5. Time for IT Innovation: Free IT resources to focus on important business initiatives and true innovation.

But the Hyper-converged approach cannot scale to the exa-scale and larger datasets that must be addressed. The difficulty is that clustering the compute-storage server nodes on the server side of the network gap from the exa-scale datasets does not address the network latency in running software on the servers that must make frequent access across the network to the scaled-out storage.

A good introduction to the basic concepts can be found at http://www.evaluatorgroup.com/measure-scalability-hyper-converged-appliances-eric-slack/. This has been copied here:

"Scalability in IT systems is a fundamental requirement. Most compute environments need to grow, or at least have that capability as business expands, etc., so infrastructure choices are often made based on products' abilities to meet this demand for resources. But how do you measure scalability? In a storage system it's capacity, tempered with processing power. In a server that's running applications its CPU speed and number of cores, with enough memory. Now, with the pervasiveness of server virtualization and the popularity of hyper-converged appliances a more comprehensive scalability measure is needed, one focused at the VM level."

Scaling a Storage System

Scalability in a storage system has historically meant capacity—the size and number of disk drives supported—and how easily they can be increased. "Scale-up" systems got bigger by adding more drive shelves but eventually hit a point where storage performance was limited by available processing power in the storage controllers.

Scale-out systems allowed that processing to expand, usually by combining storage capacity and storage controllers in the same physical modules. They made it possible to scale much larger, but could also be less efficient since linking capacity and storage processing restricted the independent growth of these resources. Now hyper-converged infrastructures are making the definition of scalability more complicated.

Scalability in a Hyperconverged Appliance

Hyper-converged systems combine the compute function with the storage function (both capacity and storage processing), as well as the networking function that connects server nodes, when multiple nodes are housed in the same chassis. These turnkey systems are almost always used in virtual server environments, and most vendors support multiple hypervisors. Hyper-converged Appliances (HCAs) are usually clustered architectures that physically expand by adding modules. But is the scale of these systems determined simply by the number of nodes or chassis that are connected in a cluster?

The typical HCA vendor literature lists a number of characteristics, below the module level, that factor into a system's ability to scale. These include the number and size of storage devices, the type of storage (HDDs and SSDs) and often both the raw and 'effective' capacities of these resources. They list the number of CPU cores, the amount of memory, the number and bandwidth of network interface cards, even how many disk failures they can sustain without losing data. But what's the best metric for comparing real scalability in a hyperconverged appliance?

The VM as a Measure of Scalability

The most pertinent measure of scale in a hyper-converged appliance is number of virtual machines (or virtual desktops) the system will support. The requirement to expand a virtual server environment is driven by the applications running on each host, specifically by the need to spin up additional VMs. When the demand for more virtual machines exceeds the supply of resources to support them, administrators 'hit the scale button'. The question then becomes how to determine how many VMs each module, or node can accommodate.

Users are most concerned about assuring current VMs are well supplied and that their infrastructures can support the new virtual machines they expect to add without impacting existing workloads. This kind of planning takes more than a rule-of-thumb estimation, it requires testing tools that can generate real-world workloads and repeatable results using industry standard metrics.

Hyper-converged appliance vendors are now describing their systems in terms of the virtual machine, providing resource management at the VM level. VVOLs are VMware's effort to move the unit of management to the VM, away from resource-specific metrics such as GBs of capacity, CPU cores, etc. In addition to supporting VVOLs, some HCAs enable policies to be applied for each VM around where and how they store data, the efficiency methods they apply (like deduplication) even data protection parameters. Now, we're seeing HCA vendors starting to provide accurate specs on how many virtual machines and virtual desktops their products can support, and one of the tools they're using is IOmark.

Hyper-converged cannot meet the exa-scale data challenge because the individual nodes each have a maximum amount of possible storage, and the storage pooling approach creates limits to the number of compute nodes whose storage can be added to any particular pool.

The underlying problem is that the data scaling issue cannot be addressed by optimizing for Virtual Machines, CPUs, etc., or by adding more clustering server nodes. It has to be addressed by scaling out the number of storage devices (as well as their capacity, therefore the density of the dataset component on each). This will be done as either as part of SANs (Storage Area Networks) or as Ethernet connected storage devices. As the number of these grows, and as the number of servers and server-hosted applications (and server-hosted application instances) grows, the network traffic will grow, possibly geometrically or even exponentially. The solution has to include a reduction in the number of per-application storage access messages sent across the network, on a per application basis.

In-Memory Databases for Application Acceleration

One of the performance optimization strategies is to use local storage caches (such as in-memory databases, or some other caching technology) on the server blade side of the data center, where presumably relevant data can be prefetched into, for local (sever-side) operations.

One of the optimization strategies is to use local storage caches (such as in-memory databases, or some other caching technology) on the server blade side of the data center, where presumably relevant data can be prefetched into, for local (sever-side) operations.

In-memory databases (IMDBs) employ large amounts of system memory (RAM) for faster data processing. These in-RAM data structures are frequently linked to storage resources, for obtaining data and for saving results.

The constraints on use include RAM size limitations preventing exabyte scale and difficulty in providing simultaneous access to multiple servers.

The problems with this "prefetch and operate locally" strategy includes the transmission costs of large data transfers, which can put a heavy load on the SAN, etc.

And there is the wrong fetch cost where some of the data transferred may (probably) will not be used, and the finite size of the local cache is small compared to some of the very large and possibly actively growing (streaming) datasets. Wrong guesses on the prefetch can waste significant amounts of the very resource whose limitations cause the slow algorithm execution: the network connection between the server-side and the storage-side of the network chasm.

The scale-up cost problem involves the available application performance bandwidth; if the in-memory database's size is scaled up significantly, there is a corresponding increase in the amount of time needed to read relevant data from network attached storage resources since every byte has to be transferred across the network. This scale-up can also cause network congestion and increased latency for other network access.

Software Defined Infrastructure, Software-Defined-Storage

Software-Defined-Infrastructure is programmable infrastructure. Software-Defined-Infrastructure components enable flexible, adaptable datacenter architectures that address specific workload and datacenter challenges such as exabyte scale-out.

SDS Separates the Storage Hardware from the Software

By separating the storage hardware from the software that manages the storage infrastructure, software-defined storage enables enterprises to purchase heterogeneous storage hardware without having to worry as much about issues such as interoperability, under- or over-utilization of specific storage resources, and manual oversight of storage resources.

The software that enables a software-defined storage environment can provide functionality such as de-duplication, replication, thin provisioning, snapshots and other backup and restore capabilities across a wide range of server hardware components. The key benefits of software-defined storage over traditional storage are increased flexibility, automated management and cost efficiency.

Software-Defined Storage (SDS) is not Storage Virtualization

Software-defined storage is sometimes confused with the term storage virtualization, but while the storage virtualization involves separating capacity from specific storage hardware resources (and thereby pooling storage devices as in Hyper-converged), SDS involves separating the storage capabilities and services from the storage hardware.

This is an open approach, with open, industry and 'community' defined specifications, commodity hardware, open source software platforms, etc. The goal of SDS is to provide storage infrastructure that is managed and automated by intelligent software as opposed to by the storage hardware itself. In this way, the pooled storage infrastructure resources in a software-defined storage (SDS) environment can be automatically and efficiently allocated to match the application needs of an enterprise.

SDS Requires Storage Resource Orchestration

SDS improves data center flexibility & efficiency through:

More complete utilization of available resources;

Better able to meet rapidly changing operational objectives in real-time; and

Reduced growth of CAPEX, COSS, and OPEX.

But SDS requires storage resource 'orchestration'; this must be (will be) provided by an open resource management facility that maintains a complete database of the configurations of every managed resource. This application aware and policy driven automation can manage storage functions & provide the orchestration needed for the successful operation of the datacenter. The SDS orchestrators can be separate physical appliances or be virtualized "server appliances" (services) running in a virtualization environment.

SDS is capable of managing the huge growth in storage requirements from exa-scale data, IoT, user data, meta-data, other Big Data, and other analytics. And the SDS approach optimizes application storage access, providing higher performance storage access.

Cloud and SDS Security

The other side of the problem being solved by SDS is security. It is a premise, a foundational belief, that the integrity of data is only as trustworthy as each and every one of the digital system components that have contact with this data. Cloud computing relies on distributed systems technologies where even the location their data is hidden from most of the owners and users, and where there must be 100% assurance that data being used (such as in calculations and decisions) has not been tampered with, yet there cannot today be 100% assurance that none of the relevant computing and network components have been compromised. This is a significant and costly problem for both customers and cloud vendors; customers because they will keep certain IT operations in their private data processing facilities where they have a greater assurance of security, and cloud vendors because they lose the additional revenue they would have achieved were they able to prove a verifiable level of security including data integrity.

The same orchestration service that manages the datacenter resources for optimized operations can (must) manage and monitor security relevant resources such as identities of hardware and software entities, authentication, and data access authorization.

CSC is the Best Choice for SDS

The CSC approach transforms the cloud by improving the ability of cloud architects to define the functionality of storage architectures through to the storage interfaces, data formats, and other storage device functionality on an as-needed basis. Cloud computing storage devices can be as provisionable and modifiable as other aspects of the virtualization foundations of the cloud, with virtualization environment requirements directly supported by compliant (customizable) storage devices.

The CSC-enabled storage device supports these goals by:

Enabling flexibility in storage architecture and driving cloud virtualization into the storage device, and by Securing each component, each storage device, to provide assurance of data integrity as well as system integrity, data confidentiality, and reduced downtime through protection of storage device availability.

The Customizable Storage Controller (CSC) provides built-in flexibility of storage devices to be able to be dynamically provisioned with the appropriate storage controller software, able to support whichever storage interface is required, as it is required. It provides the ability of several different concurrent (co-resident) software storage controllers (i.e. storage device controller software applications that implement storage interface protocols) to share the storage device, even to share all of the storage on the storage device. The ability to support multiple simultaneous storage interfaces is provided by sharing the lower layers of the storage stack among the disparate software storage controllers. This flexibility means that the CSC can be mass-produced and mass deployed, with the assurance that mass-customization of storage resources can correspond to the evolving requirements of the data centers of the present and the future. As such, the CSC is the best choice for storage controller architectures for the Software Defined Storage (SDS) paradigm being introduced into datacenters.

Architecture of Big Data Analytics Applications

The Focus of the Data Center is the Data

The center, focus, purpose of the data center is the data and rapid responses to queries against this data.

The major objectives of the data center include the execution of Big Data Analytics software applications that employ non-SQL join query algorithms.

Big Data Analytics can be thought of as high performance data mining on immense data warehouses of heterogeneous data. Why do we capitalize "Big Data Analytics"? Because is a marketing term, corresponding to improvements to data mining on data warehouses. The Big Data Analytics improvements are real, and are needed to deal with the changed requirements: larger datasets, many more datasets, heterogeneous and unformatted data. Data warehouses were (are) generally relational databases or some other form of ordered data; these data formats helped to shape the data mining techniques.

Consider what a Big Data Analytics algorithm is, under the covers: It is an analysis (compare and rank) algorithm acting on the results of non-SQL "joins" across heterogeneous data sets. Referred to as "non-SQL" because the search target data sets don't fit into neat tables in a relational database. (more below)

Big Data Analytics queries are or employ non-SQL joins on found items (fast search results) across datasets, which prepares intermediate results for the next steps in the analytics software applications' algorithms. These next steps are generally some variety of compare operation: sorting, ranking, visualization, etc., often in the pursuit of the identification of patterns in the underlying data.

Enterprise Apps (ERP, Web Ecommerce, etc.) generally include some these steps, but also include a significant amount of creation (generation) of information as result of the data processing and fresh data collection.

The use of the term "join" in the phrase "non-SQL joins" implies linking found (identifiable and discoverable) data elements with discovered or designated relationships into new data objects of some sort, useful for the next steps in the analytics algorithms.

Non-SQL joins are conceptually similar to relational database style joins (to create possibly transient views, but on non-SQL datasets stored in and across storage array volumes) of the results of non-SQL searches of possibly enormous non-SQL datasets.

The datasets analyzed by the analytics algorithms are generally non-SQL: these datasets are usually not in a SQL database (often not neat tables, often no pre-known relationships between tuples in the same data-set or between tuples in different data-sets). Sometimes these are non-SQL (aka noSQL or non-relational) databases with well defined data formats such as MongoDB and Cassandra, and at other times these datasets can be best characterized as raw, streaming, and/or "high-velocity". These datasets can be organized in ways peculiar (particular to or specific to) each dataset, likely with lack of uniformity of element size (tuple field size and organization) within each dataset, in contrast to SQL tables with their uniformly sized and organized records (tuples).

The result of the analytics algorithms is some sort of an ordered or ranked set of items where the order of this set satisfies some criteria(s). These non-SQL joins are really the joins of the results of searches of these data sets, which may extend over many storage devices in possibly more than one storage pool. Each of these non-SQL joins, therefore, requires a great many searches of the respective datasets, with corresponding round trips across network links.

History of F+ Technology, Narrative

AppAccel leverages CSC, and CSC Employs Earlier F+ System Technologies

This section shows the foundation of the CSC has been built using elements of my Provisional application, base patent and first CIP, as well as the CSC technology of the second CIP.

This section is intended to provide context for the present AppAccel invention's disclosure: novel and unobvious significant benefits of Accelerating Applications by running search and other data access operations on enhanced storage devices (improved storage device controllers), which leverages the earlier F+ patents.

Provisional Storyboard & Narrative

This section reintroduces the F+ System Provisional Figures with an explanation of how they fit into the CSC and AppAccel narratives, how the CSC is designed using these Figures as illustrations, and how the present AppAccel invention adapts these to the innovative and useful purpose of accelerating the execution (reducing the time required to complete) of Big Data Analytics, Enterprise, and other complex and long running server-hosted application software.

The Provisional Figures can be seen in my above identified Provisional patent specification.

FlashApp Architecture, as Disclosed in My Provisional Application

Provisional FIG. 1 (FlashApp Architecture) shows the complete path for the update of software to a Bubble which is resident on a USB Flash Drive. Malware is blocked by the F+ Storage Firewall, which is shown in this illustration as inside the USB connector of the USB Flash drive, but which the text and Figure indicate would execute on the host computer.

The relevance of Provisional FIG. 1 to my subsequent CSC invention is that it has the same parts, organized in about the same way, providing very similar functionality. There are strong similarities between the F+ technology as described in the Provisional application and the CSC invention. The F+ Storage Firewall was not described in the Provisional application as acting as a storage controller for the USB storage device, yet on comparison of the functionality of a CSC (customizable storage controller) and the Provisional-described functionality of the F+ Storage Firewall, the biggest difference is that the CSC has a local SC Processor and SC RAM on the storage device, and it expects to support one or more storage device externally visible storage interfaces (Storage Controller Interface Programs or SCIPs) which are software programs that are located in the SC Program Store when at rest and execute on the SC Processor.

The CSC SC Program Store is essentially the F+ Bubble as described in the Provisional. The SC Processor and SC RAM constitute the host computer as described in the Provisional. The CSC provides the F+ Storage Firewall functionality integrated into the storage controller as described in CIP#1 and CIP#2, the CSC invention disclosure.

This is relevant to this present AppAccel invention because it leverages the CSC invention. The SCAPs (Storage Controller Application Programs), in a manner similar to the CSC SCIPs, are at rest in the CSC SC Program Store and execute on the SC Processor.

FA Architecture Close-Up

While Provisional FIG. 1 included the Update Server in the illustration, Provisional FIG. 2 provides a close-up of the F+ Storage Firewall blocking a malware attempt to write to the Bubble protected storage while an authenticated update reaches the Bubble. The intent of Provisional FIG. 2 shows that malware is blocked from access to the protected storage, while authenticated updates can be made to the contents of the Bubble. As illustrated, the goal of the F+ Storage Firewall is to prevent unauthorized tampering with any portion of the FlashApp application and security softwares, application and security data, and/or any other part of the protected storage, by any software or user action (meaning any action taken by any entity, whether software, human, hardware, or any combination of these) or by cosmic event or accident of any sort.

But it is theoretically possible for malware to penetrate any defenses, so damage to Bubble (storage volume) contents can be automatically detected and corrected by the Firewall+; covered below.

This protection, malware-blocking, and repair functionality is directly applicable to the CSC, whether a storage device has one Bubble as it's protected storage volume or whether multiple Bubbles reside there. So this is relevant to the CIP#2 CSC because it illustrates the CSC approach to preventing damage to the contents of storage contents by blocking unauthenticated attempts to access the protected storage, as well as illustrating an 'Authenticated Update' into the Bubble (protected storage).

This is relevant to this present AppAccel invention because it leverages the CSC invention.

Phases of FlashApp Operation

The Provisional addressed the software embodiment of the F+ Storage Firewall, designed to protect the contents of portable storage media such as portable application software and associated data. The portable storage media would often be removable Flash storage devices such as USB Flash Drives (UFDs). This software embodiment is referred to in the Provisional variously as the FlashApp, FlashApp Firewall+, FlashApp F+, FA, and FA F+.

There are 3 phases of FlashApp (FA) Firewall+ operation: (1) startup, (2) active, and (3) shutdown. The active phase is when the FlashApp Firewall+ is providing its intended functionality.

The SyncLink (SL) protocol and mechanism used to support the F+ Storage Firewall and other F+ endpoints with updates, configuration changes, etc.

Note that while normal SyncLink operations will only commence in the active phase, during the startup phase special SL operations may be initiated to repair damaged FlashApp components.

This material is relevant to the CIP#2 CSC because it is designed around the same 3 operational phases as the FA/Firewall+ execution environment. The CSC startup phase is recognizable as basically the same set of FA steps; the CSC active phase is recognizable as the same FA steps though with quite a few additional steps for support of the various storage controller softwares (SCIPs) and applets (SCAPs); and the CSC shutdown phase is recognizable as the same set of FA steps.

In the overview flowchart, Provisional FIG. 1 'Overview of FlashApp Processes, Flowchart', an overview of these 3 phases is shown.

The same FA Firewall+ mechanisms and methods are employed by both the F+ Storage Firewall and by the CSC invention, since they leverage the same code base and design work. The differences are in the specific steps taken during each phase, and how the steps are arranged in each phase. For example, where the FA process checks (verifies the integrity of) the FA Bubble, the CSC version of this process checks the CSC Program Store and relevant areas of the protected storage and data structures stored in the protected storage, the virtual Bubble. The present AppAccel invention leverages the verification done by the CSC without significant change; minor changes may include more frequent repeated verification of the identity (hash values, etc.), authentication, and authorization of installed application software.

This material from the Provisional is relevant to this present AppAccel invention; the CSC invention used this, and the present AppAccel invention leverages the CSC invention.

Startup Phase Process Flowchart

In the flowchart of Provisional FIG. 4 'Startup Process Flowchart', the steps of the startup phase are shown in relation to each other. These include the Firewall+ self-authentication, self-repair, and self-replacement operations. From a high level perspective, these are the same as for the CSC invention. The differences are in the details of the embodiment, due to differences in the execution environment, etc. For example, where the flowchart step is labeled "App starts running", the CSC Coordinator has entered the Active phase and the storage device is ready for storage access requests, etc.

This is relevant to this present AppAccel invention because it leverages the CSC invention.

Active Phase

The active phase is the normal operational state of the FlashApp (FA) Firewall+, F+ Storage Firewall, or CSC.

The Provisional FIG. 5 'Application File Access, Flowchart' presents the active phase of the use of a storage device, as well as the active phase of the protection of this storage device. In this phase, the CSC SCIP storage controller software(s) and SCAP applet(s) are in use, and the F+ Storage Firewall is protecting the contents of the storage device.

Whereas in the FlashApp embodiment there is a human user employing application software to do something, with this FA software and associated data files stored inside the Bubble on the protected storage, in the F+ Storage Firewall (base patent embodiment) the software executable may not be stored on the same storage device, and in the CSC embodiment the software executables may also not be stored on the same storage device.

This is relevant to this present AppAccel invention because it leverages the CSC invention.

Shutdown Phase

The shutdown phase, illustrated by Provisional FIG. 6 'Shutdown Processes, Flowchart', has several controllable options. These relate to what to do if there is an active SyncLink transaction when the shutdown phase is triggered:

Fast Shutdown process;

SyncLink Continuation on Shutdown process; and

User control of Shutdown process.

All three of these are included in the Provisional FIG. 6 'Shutdown Processes, Flowchart'. The FA's F+ ext and F+ int Bubble-content verification functionality is provided by the CSC's CSC Coordinator.

This is relevant to this present AppAccel invention because it leverages the CSC invention.

Fast Shutdown

The Fast Shutdown portion of Provisional FIG. 6 'Shutdown Processes, Flowchart', shows the default behavior on immediate power loss; it is included to have a deterministic starting point on next startup.

The storage device is shutdown immediately, rudely terminating any current SyncLink operation (also possibly terminating any current operation of application software)—there is no attempt to write any open files to recover buffers. (It is useful if there is a journaling feature in the as-built version or in the file system used by the Bubble or by the protected storage device.) On next use the storage device state is determined, in the normal startup process, and any interrupted operations are re-done where possible. If application data was lost, there is no recovery method provided by the Firewall+; the application data and transactional data can be recovered by other mechanisms on the storage device and storage topology.

The CSC invention applies this hand-off approach to journaling and storage transaction recovery, in the expectation that the SCIPs and SCAPs will handle this better since they understand their protocols and data formats. This is relevant to this present AppAccel invention because it leverages the CSC invention.

SyncLink Continuation

This is the default behavior for clean shutdown of devices without user interfaces.

Before the storage device is shutdown, the SyncLink module completes the current SL operation, and all data operations are completed.

This works the same way for the CSC invention.

This is relevant to this present AppAccel invention because it leverages the CSC invention.

User Control

For devices with user interfaces, the user is asked for guidance, to control the shutdown behavior, or even whether to cancel the shutdown (which would return the device to active phase). If there is no mechanism for user control, this is omitted from the as-built version.

FlashApp Administration

The Provisional FIG. 7; 'Overview of FlashApp Server's Website' provides an overview of how FlashApp users are expected to make changes to their FlashApp devices. What is useful about this Provisional FIG. 7 illustration is the relationship of the 'Configuration Database' object to the 'FlashApp Administration' web page.

The illustration provided in Provisional FIG. 7 introduces the concept that there is a web site (or some other user controlled mechanism) to adjust settings in the Update Server's Configuration Database. This database contains the configuration settings for FlashApps (FAs) and other storage devices (and other non-storage devices that contain some sort of storage).

The corresponding CSC administration workflow mechanisms permit adjustments to the Update Server's Configuration Database, to provide control over an essentially automatic process of rapidly deploying and provisioning software to where it is needed.

The Update mechanism, as described in the Provisional, can be employed for modifying the configuration of the storage device, as well as adding features and new applications to the device. Configuration change requests are saved to the Configuration database. From the Configuration Database the configuration request information can be applied by the Update Server to the managed devices.

Administration of CSC storage devices apply the same basic approach as for FlashApps and the F+ Storage Firewall devices, but with some differences. CSC storage devices will be monitored and managed by the Update Server mechanisms, including the Configuration Database, which are expected to be integrated into a Software-Defined-Storage (SDS) orchestration service. The incorporating SDS orchestration services are expected to have their own user interfaces, possibly using web servers (web sites) but also possibly using a different administration interface technology.

This is relevant to this present AppAccel invention because it leverages the CSC invention.

Software Access to Data

In Provisional FIG. 8 'Software Access to Data', we can see the 'Flash Drive' as a storage device, topologically similar to a network connected storage device. The USB connection has the same function as a network connection, etc.

The 'PC' pictured is a host computer, which could be a server with a network connection to the [network connected] storage device, it can be viewed as the SC Processor of the CSC.

The host has a locally attached 'Hard drive' storage device.

The 'at-rest' application "App" is seen stored within the Bubble (protected storage space) on the 'Flash Drive' storage device, while the 'in-use' or active app is running on the host computer.

The relevance to the CIP#2 CSC application is that this Firewall+ illustration is the same or equivalent set of system components, connected in the same way, as is used by the CSC invention.

This is relevant to this present AppAccel invention because it leverages the CSC invention.

Provisional FIG. 9 'Flashware Versus Deskware'

Provisional FIG. 9 'Flashware versus Deskware' illustrates the contrast between the protected storage ('Flash Drive' with active Firewall+) versus the unprotected 'Hard drive'. The malware infection is not able to infect the protected storage but is able to infect the unprotected storage.

In Provisional FIG. 9, the caption "Flashware versus Deskware" is irrelevant to the CSC narrative. The relevance of the F+ system concept to the CSC embodiment is that the CSC provides the same protective functionality as the F+ Storage Firewall in protecting storage devices and their content, as well as providing the other CSC functionality.

Update Server (FlashAppp, F+ Storage Firewall, CSC, AppAccel)

The basic mechanism for monitoring and maintaining FlashApp devices, Firewall+, FlashApp application software, F+ Storage Firewall configuration, and other various mechanisms is through a SyncLink update from an Update Server, where this Update Server has a suitable Configuration Manager database. This system controls functionality as well as healing problems.

The relevance to the CSC invention is that an Update Server, or some other service that has integrated the Update Server functionality, can be used to monitor and maintain CSC configurations, CSC storage controller software, CSC application software, etc. A Software-Defined-Storage (SDS) orchestration service or appliance can integrate Update Server functionality, methods, etc.

This is relevant to this present AppAccel invention because it leverages the CSC invention.

FA Maintenance, Introducing Server Synchronization Link Aka SyncLink

The FlashApp Bubble environment is very similar to the software environment on the CSC storage device. The biggest difference is that the CSC invention has an embedded processor, or two processors if the security co-processor is present, or possibly more processors for other reasons.

An important requirement for a stable FlashApp software (Bubble) environment is an ability to remotely update, upgrade, and patch apps and environments. This means the ability to patch and upgrade the FlashApps, which means better integrity, stability, and flexibility, through software patches, upgrades, etc.

The CSC approach is exactly the same; there are additional values and flags for some of the update transactions; these transactions are part of the Server synchronization Link (aka SyncLink or SL), a message level communication protocol. There are two endpoints to the protocol, one at the Update Server and the other at the storage device. Each endpoint has its own perspective on the interaction of each transaction. To understand the F+ approach to software maintenance, it is necessary to consider both the FA Firewall+(storage device) and the Update Server sides of an authenticated transaction.

This is relevant to this present AppAccel invention because it leverages the CSC invention.

Authenticated Software Maintenance Transaction

The SyncLink connects the Update Server(s) to managed devices. It is used in much of the following material on the system that enables the functionality of the CSC and other F+ endpoint technologies.

This is relevant to this present AppAccel invention because it leverages the CSC invention.

Some of these bullets are duplicates of those listed elsewhere in this document:

Server synchronization link (SyncLink, or SL) securely delivers updates, patches, upgrades, etc. from Update Server(s) to storage devices.

The SL protocol is designed under the assumption the connection is intermittent. This is different from the typical approach.

There is no retrieval of stored information from storage devices to an Update Server over update transactions.

SyncLink (SL) uses PKI-type authentication of the Update Server, software application executables, updates, and storage devices' identities, etc. There is no requirement to use certain standard PKI mechanisms such as Certificate Authority Certificates, aka "CA certs", yet nothing is in the design that would prevent their use. Authentication methods can be swapped for others, as required.

The SyncLink (SL) protocol uses end-to-end message encryption, split into acknowledged pieces, to prevent man-in-the-middle attacks, during transmission of updates, patches, and upgrades. This means that a single message is split into several pieces, with each piece sent separately, each acknowledged before the next piece is sent. The acknowledgements reflect a mathematical relationship (i.e. protocol details in the design document) with the acknowledged message piece, such that the Update Server can detect tampering with the message.

Update Server: Control of Firewall+ and Other FlashApp Functionality

The architecture of the FlashApp Update Server and SyncLink components was designed to the requirements of supporting large numbers of deployed storage devices.

The Update Server has two interfaces, one facing the managed devices, and the other facing whatever is providing changes to the Update Server's Configuration Database.

Provisional FIG. 10 'FlashApp Server Overview', shows a set of components of the Update Server. Unfortunately, in the Provisional several terms were conflated: the term "Update Server" in this Provisional Figure labels a specific hardware server, supported by the other components 'Database Server' and 'Configuration Database'. It is the combination of these components, along with others, that provides the Update Server functionality referred to in this present AppAccel invention as the Update Server.

The Update Server is used to monitor, manage, and add functionality to FlashApp storage devices, Storage Firewalls, CSC storage devices, and any other device that has a storage component. Some of this functionality added to storage devices requires the deployment (i.e. SyncLink download) of additional software (in a Package, of course), while other additional functionality is activated through configuration changes.

Introducing Update Terms: Package, Link, Manifest

A Package is a set of one or more files, plus additional information on version, change detecting & correcting codes, etc. A Package can be thought of as a self-installing change to the behavior of the storage device, or as a zipped set of files one of which provides instructions to the others as to how to install and configure themselves; both are reasonable perspectives.

A Link is a reference to a Package, sort of a package handle or name. The Update Server can interpret a Link, such as in a Get request, to provide the correct Package.

Links generally do not have (or include) version information, and the Package referred to does not have to exist at the time the Link is interpreted—The Link is a sort of virtual handle to a named resource. The Package Manager can generate a Package at the time it is needed, or it can resolve a Link to a specific pre-existing Package file. Often a Package will exist as a specific version of installable software, suitable for many storage devices. When a Link refers to a virtual Package, it can be generated from a database query or in some other way.

A Manifest can be viewed as a sequential list of Links, plus some additional information (the Modifiers) that the storage device uses to control the retrieval of the Links/Packages. The order of Links and other information is important. The storage device will retrieve ("FAGet request") Packages in this order, unless specific additional information is provided in the Manifest in the form of Modifiers.

The Modifiers are actually statements in an SL scripting language. This scripting language is defined for the requirements of the update mechanism. The statements (Modifiers) are similar to pragma instructions and constraints in other systems, but with several additions. One is "fuzzy synchronization", which is related to fuzzy logic, where definite conclusions & decisions can be made using ambiguous or vague input information; in this case, fuzzy synchronization permits late binding. Another difference from some pragma instruction and constraint semantics is the use of conditional and control statements (such as IF statements). The SL scripting language is intended to grow into a true programming language designed for managing the deployment, maintenance, and security of billions of devices.

Components of Update Server

The components are:

Update Server: implemented using an XML server, optimized to provide Update Server support interactions. It's the software server that acts as the executive to coordinate the other components.

Package Manager: each of the updates sent to supported devices is organized as one or more packages. Packages are usually pre-tested sets of files. The support and update interactions (defined below in more detail) each include a 'Manifest', which refers to one or more Packages. The Package Manager has functionality to create and maintain Package lineages.

SyncLink or SL: an interface module that provides (and encapsulates or isolates) the storage device interactions and communication protocols. These sit on top of the web (HTTP & SSL) protocols. The basic protocol is very similar to that of a web client-server interaction: the client polls for updates. If pending, the storage device downloads a Manifest. Based on the Manifest contents, the storage device downloads and deploys the Packages. [XML, etc.]

Configuration Manager, aka Storage Manager: module (layer) that provides an interface to the database. This includes the configuration of all deployed storage devices (the configuration database), plus other information that encapsulates the relationship to the customers (users/owners). The current implementation uses a database suitable for moderate loads, but as the numbers of supported & deployed devices grow there will be a need for a larger & more complex database.

Database Server

Configuration Database—Configuration Manager's database, organized in some fashion, containing data about managed storage devices. This per-storage-device data structure contains the previous, current, and pending configuration of each managed storage device.

Provisional FIG. 11 'FlashApp Server Architecture', shows the FlashApp Server, aka Update Server, as containing some of the components listed above.

This is relevant to the CSC invention because there are no architectural differences between the Update Server for supporting the FlashApp storage devices, the F+ Storage Firewall, CIP#1—style storage controllers with integrated F+ Storage Firewall technology, and the CSC. It will also be able to support possible future compute devices such as IoT devices. All with the same Update Server, SyncLink protocols, and device architecture.

This is relevant to this present AppAccel invention because it leverages the CSC invention.

Update Server Modes of Operation

The Update Server has several distinct modes of operation, each of which has a set of client-server interactions. All of these are supported by common (shared) transport functionality.

The actual interactions are described below, but in abstract there are several types:

the client polls for updates;

the client reports a problem, naming a file that's been damaged; and the client reports a problem, does not provide damaged file information.

FA Registration with Update Server

This material on device registration provides context for the 'Communication States' flowchart below.

The FlashApp system, as described in the Provisional, relies on the FlashApp Server for update, configuration, and patch support. It is possible to operate a FlashApp device without ever contacting (polling) the FlashApp Server (discussed elsewhere), at the cost of never receiving remote server support. While the typical approach is to use the server, this is not required.

The effects of never registering (the user/owner may use the device without registration), The FlashApp user/owner/device registration process/procedure which initiates the client-server communication between FlashApp and FlashApp Server, The 'excommunication' process to discontinue Firewall+ client-server polling, in order to eliminate risk to the FlashApp from server security breaches, and 'Server-side' security-breach vulnerability/attack scenarios.

It is possible, even reasonable, to register a FlashApp to obtain current updates, then to 'excommunicate' the device from the remote support system. This sequence can be done multiple times.

The CSC probably never discontinues polling the Update Server, and probably is always registered to the Update Server.

This is relevant to this present AppAccel invention because it leverages the CSC invention.

FA Communication States

The following material refers to Provisional FIG. 12 'FlashApp Communication States'.

By following the directional arrows in the Communication States diagram, the reader can see the typical FA user case on the left hand vertical path. The FA user is expected to start using, choose to start polling for updates, then make a decision about whether to register the FlashApp on the server, in order to obtain additional services.

It is possible for the FA device to be used without connecting to the FA Update Server. In this situation, there is no FA Firewall+ attempt to poll the server for remote support, updates, etc.

This is relevant to my CSC invention because it is not reasonable for a CSC storage device to not ever connect to an Update Server, because it is only through connection to the Update Server that storage controller software can be obtained. Without at least one storage controller software the CSC storage device does not have storage functionality. But the CSC can be manufactured in such a way that it connects to an Update Server in the factory, so that the intended configuration, storage controller software, and other storage interface software is installed, thereby providing the intended functionality.

This is relevant to this present AppAccel invention because it leverages the CSC invention.

SyncLink Architecture

The Provisional FIG. 13 'SyncLink Model, Flowchart', illustrates this section.

The purpose of the SyncLink (server synchronization link) is to provide a secure, authenticated message-level mechanism to update, patch, and upgrade. The SyncLink module is part of the Update and Configuration Server, which in the Software Defined Storage (SDS) environment will be integrated into the SDS storage management service.

When used as a marketing term or for specificity of feature description, we may use SyncLink: and SL: (note the colon ":"), so that we can refer to SL:patch and SyncLink: upgrade.

SyncLink (SL) is similar in concept to the patch update mechanism used by Microsoft, the LiveUpdate mechanism used by Symantec, and the similar mechanisms used by many other systems. There are such software update mechanisms in place for many PC applications. [But there are significant differences in design and implementation.]

The purpose of the extent PC update mechanisms is to react to changing requirements, because of a changing reality (ex. virus signature updates), or to patch bugs in the released product (ex. Microsoft operating system patches).

SyncLink will support both of these common operations (patch and update), but also support upgrades of the purchased product. (The SL protocol will also support remote backup from the FlashApp to the FlashApp Server, as an optional feature/service.) The upgrade functionality may be supplemented by an e-commerce web site that provides a way for current owners to pay for more functionality in their current version and/or the next version of a particular FlashApp product.

SyncLink has a significantly more powerful design than the other (known) update protocols and mechanisms—the Manifests (defined later in document) are actually programs, written in the SL scripting language, executed by the Firewall+-SyncLink mechanism, similar to the way a web browser executes HTML web pages (these are really software programs, too). The deployed implementation of the SL scripting language will initially be quite simple, with few constructs, but will grow in power and complexity over time.

The SL protocol and mechanism has these assumptions, requirements, and attributes:

The SL port on the FlashApp Server is represented by a URL (or URL list, as represented by an IP address, or list of IP addresses) known to the FlashApp, where this value is changed through SL:update.

The FlashApp Server is implemented by a set of servers, which might be geographically distributed, and/or which might be implemented employing an "on demand" server virtualization architecture, perhaps using edge servers, grid computing, point servers, or blade servers.

The connection between the FlashApp and the FlashApp Server is intermittent, and SL knows how to recover from an interrupted sync (synchronization), when the connection is re-established, sooner or later [where sooner might be seconds after the disconnection, and where later might be as much as months or years later.]

The SL protocol architecture (as shown in the SyncLink Model flow chart) assumes a direct client-server connection, with no recognizable intervening store-and-forward network nodes. If there are any such network nodes, they are transparent to this protocol [see packet level encryption below.]

There are several levels/types of encryption employed in the SL communication protocol:

Message level end-to-end encryption of the entire message, where the message is broken into several parts, with separate acknowledgements, each containing values that correspond to the received message components.

Message components and the entire message will also have PKI (Public Key Infrastructure) authentication/signatures. This requires that each FlashApp store (and be able to retrieve fresh versions of) the FlashApp Server's public key(s), and be able to generate and publish its own public key.

Packet level point-to-point encryption, with packets routed unchanged from the FlashApp Server to the FlashApp.

The payload of the SL messages may have additional encryption; it will certainly have authentication identifiers The FlashApp Firewall+ will poll for updates, sending update requests to the FlashApp Server when appropriate. The default polling interval will be defined on a product (i.e. title) basis, then adjusted by the registered user using the web based User Interface.

There will be configurable SL update behavior, controlling

When to request updates

Whether to alert user before an update request

Whether to request approval from user before an update request

How to treat downloaded updates, including whether to immediately apply, etc.

Whether to alert user before applying an update

Whether to request approval before applying an update

Whether to alert user that update has been applied

How to handle the interruption of user activities (Flashware application operation) and other Firewall+ operations while applying the update.

Configurable SL update behavior will be controlled by/from a user accessible web site. There will be different update options presented to the user depending on the particular FlashApp, so that different products will have different default configurations and different sets of user configurable options.

Firewall+ has a SyncLink module that polls for updates, receives update messages (assembles the message components), and applies the updates to the FlashApp. Sometimes this will require terminating the current Flashware application, or terminating the current Firewall+, while applying the update.

There are Shutdown implications for Firewall+/SyncLink operations, including the handling of current SL update operations when the user wants to or has terminated the use of the Flashware application software. These are covered in the Shutdown phase description and flowchart.

The CSC invention applies this SyncLink technology without significant change.

This is relevant to this present AppAccel invention because it leverages the CSC invention.

Firewall+ stops illegal access attempts (Malware Attempts, Flowchart). The Provisional FIG. 14 'Malware Attempts, Flowchart' illustrates this section.

This Provisional FIG. 14 flowchart shows the methods used by the FA, F+ Storage Firewall, and the CSC to clean up the effects of cosmic rays or malware (somehow) penetrating defenses to damage the contents of the protected storage.

This is relevant to this present AppAccel invention because it leverages the CSC invention.

SyncLink States and Protocols

The SyncLink interactions between the FlashApp and the FlashApp support server have been described elsewhere (including in this AppAccel disclosure document) from the perspectives of the endpoints, but it's useful to consider the network interactions, protocols, etc. in their own right.

Each logical FlashApp feature (such as update) has it's own request type, but leverages the functionality of the SyncLink protocol.

The SyncLink protocol is based on HTTP, SSL (TLS), and XML.

Some of the important features provided by the SyncLink module are

End point authentication (each of the FlashApp and server PKI authenticate to the other)

Package validation (hash value signatures, error correcting codes, etc)

In addition, for each of the protocol's request/response sets there are defined states.

The combination of the endpoint pair (FlashApp and FlashApp support server) and interaction sets is a well-defined state machine, which can be understood by considering a state table, where each interaction is a transition from one state to another for the endpoint pair.

The added complexity of the FlashApp system's state table is caused by the synchronization requirements across a large number of FlashApps; not all FlashApps must go through all of the steps (states). If a FlashApp has missed some of the states through lack of connection to the FlashApp Server, once it connects it may be skipped past some of the intermediate states when bringing it up to current. (This is related to the "fuzzy" synchronization mentioned before).

The CSC invention applies this SyncLink technology without significant change.

This is relevant to this present AppAccel invention because it leverages the CSC invention.

FlashApp SyncLink Request Overview

Any description(s) given in this section on the internal behavior of FlashApps is merely to illustrate the interaction of the FlashApps with the Update Server. The focus is on the behavior and structure of the Update Server; the other parts of this patent disclosure will provide more accurate descriptions of endpoint behavior.

Current SyncLink request types. More will be added as necessary. Each request is made from the FlashApp to the Update Server. The base set includes:

FAGet—given a Link, return a Package;
FAUpdate—poll for pending updates, return a Manifest; and
FARepair—report a problem, return a Manifest.

The CSC invention applies this SyncLink technology without significant change.

This is relevant to this present AppAccel invention because it leverages the CSC invention.

Deploy Additional Flashware Application Software

Also, the SyncLink mechanism permits the installation of additional functionality, downloaded, then installed as part of the storage device's next SyncLink update. Details are in the description of FAUpdate, specifically "FAUpdate: Add New FlashApp Application Software".

The CSC invention applies this SyncLink technology without significant change.

This is relevant to this present AppAccel invention because it leverages the CSC invention.

SyncLink FAGet

Provisional FIG. 15 'FlashApp Server Behavior on FA Get Link Request, Flowchart', shows the behavior when an endpoint requests a single Package (or single file), using a Link previously provided by the Update Server in a Manifest, as a response to an FAUpdate or FARepair request. Generally there are multiple FAGet requests for each Manifest, each corresponding to a named Link.

The CSC invention applies this SyncLink technology without significant change.

This is relevant to this present AppAccel invention because it leverages the CSC invention.

SyncLink FAUpdate Request

Update is the most commonly used support operation, as well as generally the first Update Server oriented operation attempted by an endpoint when it first starts up.

There are several update options. The default behavior is described first, followed by descriptions of several of the options.

Configure FlashApp Firewall+
Configure FlashApp Application Software
Add New FlashApp Application Software The basic scheme is that the FlashApp polls the FlashApp Server to detect whether there are any pending (queued) updates for this FlashApp. In terms of the SyncLink protocol, the FlashApp requests an Update; a successful response is a Manifest, which is a list of 'Links' to files that the FlashApp Server knows how to deliver (either by retrieving or generating). Then the FlashApp iterates over the list of Links in the Manifest, sending an FAGet request for each link.

While Link order in the Manifest is important, it is intentionally un-determined as to how a particular FlashApp will interpret a particular Manifest. For example, it is more flexible for the FlashApp to decide on the amount of bandwidth to use to request and process Links, the number of current Link requests, etc. This flexibility is provided by the Modifiers. As explained elsewhere and below, the Modifiers are statements in the SL scripting language, which also contains conditional and control statements.

The Manifest contains Modifiers along with the Links. Most Modifiers are 'soft instructions', suggestions really, to control or adjust FlashApp behavior. Some Modifiers are 'hard instructions' or commands. The goal in FlashApp installation (i.e. execution) of Manifests' contents is for the local Firewall+ to be able to apply the Manifest's contents in a way that is compatible with local conditions and situations.

Provisional FIG. 16 'FlashApp Server Behavior on FA Update Request, Flowchart'

To reiterate, the order of Links is important but not always strictly followed. The typical behavior is for the Links to be used sequentially in the Link order. The design permits the use of Modifiers that may affect the behavior—most of these can be considered more of the nature of suggestions' than commands. In other words, if the FlashApp mechanism that interprets the Manifest does not understand a "soft" Modifier it is free to ignore it. There are a few hard Modifiers, which will always be followed; an example is the 'restart' Modifier that may be interleaved between Links, causing the FlashApp to shutdown and restart before processing the next Link. There are also time-based and synchronizing Modifiers, and there are Modifiers that cause the Links to be used out of order, based on conditional tests.

In essence, the SyncLink Manifest/Link/Modifier semantics are of a programming language, for the asynchronous control and content synchronization of remote deployment, and execution of arbitrary executables on the deployment targets. Synchronized with what may be happening on the FlashApp Server, other FlashApps, etc.

This is similar to the HTTP protocol, when the web browser makes a request for a web page; this page is composed of a combination of commands to display text, formatting commands, and additional URLs for included graphics and other files. These additional URLs may be ignored or acted upon by the browser. Any of the formatting commands may be ignored. The text is usually displayed, but not all of it has to be, depending on the design and configuration of the browser.

The biggest difference (in this area of the FlashApp Firewall+ support design) is the synchronization. The goal is to provide a synchronized action across as many targeted FlashApps as desired, perhaps many millions. This is an important detail: Not all of the targeted FlashApps can be expected to be operating (plugged in) at the same time, so the synchronization uses "fuzzy timing"—it will be pending for the unplugged FlashApps, sitting in a virtual FlashApp queue on the FlashApp Server. But it will not sit there forever—an expiration timestamp can be set (both as a Modifier and controlled by server virtual queue software), just as a release timestamp defines the earliest moment the Manifest will/can be released.

The CSC invention applies this SyncLink technology without significant change.

This is relevant to this present AppAccel invention because it leverages the CSC invention.

FAUpdate: Configure FlashApp Firewall+

When the FlashApp receives a Manifest, the FlashApp requests the Linked Packages.

In most cases:

When the FlashApp has completely received the Firewall+ configuration change Package, it alerts the user and asks permission to deploy the changed Firewall+ configuration.

If permission received, the FlashApp applies the configuration changes and restarts the FlashApp.

If user permission is not received, the FlashApp stores the changed configuration. When the user next uses the FlashApp i.e. next starts the FlashApp, if there is a locally pending configuration change, the default behavior is for the FlashApp to repeat the local user alert/permission request, then to apply the new Package on user permission. Other (non-default) behavior may be indicated by Manifest Modifiers.

In the default process, if the user wants to indicate that this changed configuration is never to be applied (deployed), this will need to be done on the FlashApp Server. It may be possible to define a return to the previous configuration, depending on how the configuration change was generated. Some changes are system generated to resolve problems, evolve the support infrastructure, etc., while others were user generated.

In some cases, the FlashApp deploys the changed Firewall+ configuration in a quiet mode (without user interaction). There are two types of quiet changes: those that require an immediate restart and those that don't. The FlashApp alerts the user before any restart. If there is no requirement for an immediate restart, the Firewall+ configuration change may deploy silently. (Some configuration changes will take effect only after a restart, but in some of these situations it is permissible to wait for the next use before using the changed behavior.)

The CSC invention applies this SyncLink technology without significant change.

This is relevant to this present AppAccel invention because it leverages the CSC invention.

FAUpdate: Configure FlashApp Application Software

Most or all of the FlashApp applications will be existing application software ported to the secure FlashApp environment, so the applications will have various designs. There is a consistent set of changes, including the use of the Firewall+ file access API. Other changes will be to remove some of the known security vulnerabilities, ports to additional operating system environments, some possible UI modifications, etc.

There are often configuration change mechanisms built into the applications. One of the FlashApp goals for application software is to move some of these configuration change operations to the secure web site, where they will not be susceptible to local change by on-host (PC) malware and hackers. Whether the application's local configuration functionality is removed, restricted, or otherwise changed will be decided on a case-by-case (application-by-application) basis. In the cases where some or all of this configurability is moved to the FlashApp Server, the registered user (owner) can use the web-based FlashApp Server's User Interface to configure these application options on registered FlashApps, but any combination of non-registered FlashApps and/or non-registered users will prevent use of the web-based UI.

In all cases, there are specific default interactions with the Firewall+ that are configured for a specific deployment of an application on a FlashApp. These types of FlashApp application configuration are provided by the same mechanism, interactions, etc.

When the FlashApp receives a Manifest, the FlashApp requests the Linked Packages.

In most cases:

When the FlashApp gets the application configuration change Package, it alerts the user and asks permission to deploy the changed configuration.

If permission received, the FlashApp applies the configuration changes. In some cases it will be necessary to restart the application.

If permission is not received, the FlashApp stores the changed configuration. When the user next uses the FlashApp i.e. next starts the FlashApp, if there is a locally pending configuration change, the FlashApp alerts the user and asks permission to deploy the changed configuration.

If the user wants to indicate that this changed configuration is never to be applied (deployed), this will need to be done on the FlashApp Server. It may be possible to define a return to the previous configuration, depending on how the configuration change was generated. Some changes are system generated to resolve problems, evolve the support infrastructure, etc., while others were user generated.

In some cases, the FlashApp deploys the changed configuration in a quiet mode (without user interaction). There are two types of quiet changes: those that require an immediate restart and those that don't. The FlashApp alerts the user before any restart, if there a local user interface. If there is no requirement for an immediate restart, the configuration change may deploy silently. (Some configuration changes will take effect only after a restart, but in some of these situations it is permissible to wait for the next use of the application.)

The CSC invention applies this SyncLink technology without significant change.

This is relevant to this present AppAccel invention because it leverages the CSC invention.

FAUpdate: Add New FlashApp Application Software

This is the transaction that can dramatically enhance and augment the existing FlashApp functionality, or even change it entirely into a different FlashApp.

It is expected that deploying new application software has no effect on user data.

It still uses the same Update functionality: when the FlashApp receives a Manifest, the FlashApp requests the Linked Packages.

In most cases:

When the FlashApp gets the new software Package, it alerts the user and asks permission to deploy the new software.

If permission received, the FlashApp deploys the software and, if necessary, restarts the FlashApp.

If permission is not received, the FlashApp stores the new software locally. When the user next uses the FlashApp i.e. next starts the FlashApp, if there is a locally pending new software Package to deploy, the FlashApp alerts the user and asks permission to deploy the new software.

If the user wants to indicate that a particular software application is never to be deployed, this information will need to be stored in the Configuration Database.

The CSC invention applies this SyncLink technology without significant change.

This is relevant to this present AppAccel invention because it leverages the CSC invention.

Generic Versus Custom Manifests

One or more generic Manifests are defined to update a specific version of software to another specific version. Custom Manifests are defined based on the preferences of specific user-owners to change the configuration of their FlashApps.

At multiple points in the FlashApp startup phase, and even into the active phase, the FlashApp may discover that part of it's core software has been damaged. This may have been caused by malware, or it may have another cause.

The CSC invention applies this SyncLink technology without significant change.

This is relevant to this present AppAccel invention because it leverages the CSC invention.

FlashApp Repair (FARepair Request)

The FlashApp sends a FARepair request to the FlashApp server, and receives back a Manifest response.

The FARepair request is similar to the FAUpdate request, in that a successful response is a Manifest. The difference is in two parts, in the request argument(s) and in how the response is determined.

The FlashApp specifies the problem file(s), by filename, as well as version information. The FlashApp Server must determine the correct replacement file(s), possibly providing other files as well, to insure that the replaced file(s) has the correct environment to work properly.

The Package Manager on the FlashApp Server uses the filename(s) and version information to determine which packages The FlashApp behavior, on receiving the Manifest, is also similar to how an Update Manifest is handled. The biggest difference is that the Repair actions must be completed before the application is permitted to start, while a normal Update action can often be done in parallel to the application execution.

Part of the difference between the implementation of repair and update is the urgency, and the possibility that the damaged FlashApp is currently under attack. Provisional FIG. 17 FlashApp Server Behavior on FA Repair Request, Flowchart has the flowchart for handling this situation.

The CSC invention applies this SyncLink technology without significant change.

This is relevant to this present AppAccel invention because it leverages the CSC invention.

SyncLink Software Deployment & Provisioning Ephemeral Applets: Alert Mechanism

Also, as part of our SyncLink mechanism, we will have an 'Alert' mechanism, perhaps utilizing a splash screen applet if there is a user interface associated with the device, application, or storage device being managed. This will usually display or convey important messages, such as security alerts. It will be used rarely, to retain impact when used. New product introductions can be done this way, but usually the Alert will provide the user (owner) with important notices relevant to their FlashApp.

One possible implementation of the Alert mechanism is an ephemeral application that may be downloaded at any time to any FlashApp using the typical FlashApp SyncLink Update Package mechanism. The Alert will be provided with a message and schedule of deployment/display in the same manner as any other application Manifest/Package is configured. And, after use, the Alert executable can be deleted from the FlashApp. (The Alert application is an example of an ephemeral application; this functionality can also be employed for diagnostics, security (integrity and data-loss-prevention), and management purposes.

The CSC invention applies this SyncLink technology without significant change.

This is relevant to this present AppAccel invention because it leverages the CSC invention.

F+ Storage Firewall Base Patent

Firewall+ Storage Firewall Functional Block Diagram, High Level Design

Patent FIG. 1 (Firewall+ Storage Firewall Functional Block Diagram) of my base patent (U.S. Pat. No. 7,743, 260), included and described herein, illustrates the functional relationships between the elements of the hardware embodiment of the storage firewall.

This is relevant to the present invention because the CSC uses these same components, in the same architecture, and this AppAccel invention leverages CSC functionality.

In general terms, on the storage device endpoint, it is the same design using the same components as the F+ Storage Firewall. The SyncLink 34 has a few more flag values, and it assumed that as storage controller applications are installed there will be more states & state transitions in the state table (State Engine 28) corresponding to the various storage controller functions.

The most significant difference between the F+ Storage Firewall and the CSC is that the CSC uses the design shown in FIG. 1 plus some extra RAM (the Program Store) to run provisioned software applications—some of these applications are assumed to be storage controllers, others will be storage-device located parts of server-hosted applications.

Bubble Design (What's Inside)

FIG. 2 (Bubble Design: What's Inside) was created for the base patent, and is likewise included and described herein. FIG. 2 shows the contents of the Bubble including, for illustrative purposes, some of the authentication mechanism data structures.

This is relevant to the AppAccel invention because it clearly shows the 'Stored Firewall+' and 'Stored App', as well as the authentication data structures stored within the protected storage. The CSC treats storage controller software as stored applications, SCIPs (Storage Controller Interface Programs).

Authentication Data Structures

FIG. 3 (Authentication Data Structures) was created for the base patent disclosure, and is likewise included and described herein; it illustrates some of the Authentication Data Structures. The important ones shown are the Credentials Table and the Application Rights Table. These are described in the base patent's disclosure.

This is relevant to the CSC invention because the CSC uses them in approximately the same manner as the F+ Storage Firewall, and this present AppAccel invention leverages the CSC invention.

The differences in the specific embodiments of these tables between the earlier F+ Storage Firewall and the datacenter capable CSC are in the table structure; the CSC and AppAccel inventions will have to manage much larger and more complex protected storage resources (Bubble, SC Program Store, etc.), possibly more software applications, and other such scaling requirements.

Interaction Between Firewall+ Storage Firewall (F+) and Application (App)

FIG. 4 (Interaction between Firewall+ Storage Firewall and Application) was created for the base patent, and is likewise included and described herein.

In FIG. 4, the Application (App) has bi-directional communication with a F+(F+ Storage Firewall) that is protecting (encapsulating) a Bubble (protected storage). This means that the F+ Storage Firewall provides access operations and protection for the contents of the Bubble.

The Bubble (protected storage) stores both F+ Storage Firewall components, shown as the Rights Table and File Table, but which will include other components, and the Application Data Files, which can be zero, one, or multiple software applications as well as any other data.

FIG. 4 shows one possible call sequence interaction between application software and the Firewall+ as a storage access request is evaluated, authenticated, authorized, and then proceeds successfully.

This interaction makes use of an auth_token as described in the base patent. The auth_token method is one of several supported by the F+ Storage Firewall, and therefore inherited by the CSC. This is relevant to the CIP#2 CSC invention (and the CSC patent specification disclosure) because this is one of the supported CSC interaction models.

In the interaction shown by FIG. 4, there are some assumptions:

A software implementation of the F+ Storage Firewall protects the Bubble;

A compliant F+ API (and ABI) is linked into the Application software, and therefore the F+ Storage Firewall initiation request is in the Application software startup code; and The Application software is registered in the F+ Storage Firewall Application Rights Table.

As shown in FIG. 4, the interaction chain is as follows:

(1) The Application software starts to run, initiates contact with the F+ Storage Firewall;

(2) The F+ Storage Firewall authenticates the Application software, provides authorization credential (auth_token), where the F+ ABI keeps track of it;

(3) The Application software sends 'open for read' file access request to the F+ Storage Firewall, where auth_token is added to the fopen( ) by the F+ ABI;

(4) The F+ Storage Firewall (optionally logs access request), verifies the Application software's auth_token, opens the file for read, returns a file reference—an index into the File Table;

(5) The Application software sends read access request to the F+ Storage Firewall where auth_token is added to the fread( ) by the F+ ABI, and the file pointer (fp) is a F+ file reference, an index into the File Table; and (6) The F+ Storage Firewall (optionally logs access request), verifies the Application software's auth_token, reads requested data from file, updates entry in the File Table indicating current position in the file, returns the requested data to the Application software.

Note that as described in FIG. 4 and the base patent, etc., the contents of the Bubble may be a very different file system than the externally visible file system. This is not mandatory, but is possible. If it is a different file system, then the F+ mechanism is functioning as a storage controller and file system, maintaining its own file table, as referred to in FIG. 4. In addition, the Bubble may have its own operating system such as a Linux kernel.

This is relevant to the CSC invention because the CSC uses the Bubble data structures and mechanisms in approximately the same manner as the F+ Storage Firewall and as described in the Provisional, and this present AppAccel invention leverages the CSC invention.

In one embodiment, the CSC can employ the same authentication mechanism, supporting the same authentication interaction, but other authentication mechanisms and interactions can be employed instead, such that the CSC can support standard storage interfaces such as SATA and NVMe, as well as standard authentication protocols and mechanisms such as OASIS KMIP (Key Management Interoperability Protocol), etc.

Firewall+ System Functional Block Diagram

In FIG. 5 (Firewall+ System Functional Block Diagram), created for the base patent, and likewise included and described herein, the Storage Firewall 12 contains the State Engine 28. The State Engine is a key component used by the CSC for enabling multiple applets and storage controllers. The State Engine is used to start and control execution of the installed software programs.

The CSC uses the same application deployment, monitoring, and maintenance mechanisms as the FlashApp Firewall+, F+ Storage Firewall, etc. This F+ support System is provided by the SyncLink 212, Configuration Database 210, and other components of the Update Server, in cooperation with the SyncLink 34 and other modules of the Storage Firewall 12. The F+ monitoring and maintenance system, invented for support of the F+ family of endpoint technologies, has unique features, which provide valuable benefits to the CSC.

This is relevant to this present AppAccel invention because it leverages the CSC invention.

Interaction, Chain of Requests, Between Storage Firewall (or CSC) and Update Server FIG. 6 (Interaction between F+ Storage Firewall and F+ Update Server) was developed for the base patent; and is likewise included and described herein. This is relevant to the CSC because the CSC has same 'chain of requests' interaction between the storage device and the Update Server as the FlashApp Firewall+ and the F+ Storage Firewall. The CSC has the same chain of requests and responses because the CSC employs the same technology base as the previously patented F+ Storage Firewall.

The 'Update Request' and 'Update Response' messages are part of the mechanism for the provisioning of new software, and the repair and configuration of existing software, to the CSC.

This is relevant to this present AppAccel invention because it leverages the CSC invention.

F+ Storage Firewall Integrated into Storage Controller

Solid State Disk (SSD) Conceptual Design

FIG. 7A (Solid State Disk (SSD) Conceptual Design was developed for CIP#1 and is likewise included and described herein; it provides an overview of a typical SSD design. This typical SSD design is shown as not having (i.e. does not have) F+ Storage Firewall technology integrated into it. FIG. 7A is relevant to the CIP#2 CSC patent specification because the (S2) SSD Controller of this Figure is replaced by the CSC invention.

This is relevant to this present AppAccel (CIP#3) invention because it leverages the CSC (CIP#2) invention.

Solid State Disk (SSD) Conceptual Design with Storage Firewall Components Integrated into SSD Components Patent FIG. 7B (Solid State Disk (SSD) Conceptual Design with Storage Firewall Components integrated into SSD Components) was developed for CIP#1, and is likewise included and described herein. It provides a conceptual view of the integration of F+ Storage Firewall components deep into the elements (components) of a typical current SSD. The block labeled 'SSD Controller w/Storage Firewall Components (S2)' is a representation of an SSD storage controller designed and implemented in the way most SSD storage controllers are currently designed, but with intertwined integration of F+ Storage Firewall functionality. The integration of the F+ Storage Firewall functionality is provided by modifying the design of each relevant portion of the SSD storage controller, so as to add the F+ Storage Firewall data structures and algorithms.

FIG. 7B is relevant to my CIP#2 CSC invention application because while my CIP#1 integrated F+ Storage Firewall functionality as deeply as possible into an SSD storage controller, the CIP#2 CSC invention replaces the older version (the current industry approach) of the SSD storage controller with an on-the-fly customizable architecture for storage device controllers, where multiple storage controller software implementations of storage access interfaces such as SATA and SAS can co-exist due to leveraging the F+ Storage Firewall state table (State Engine) design, combined with more RAM and a Program Store. Yet both approaches employ the same F+ Storage Firewall data structures and F+ support system for configuration and other management.

This is relevant to this present AppAccel invention because it leverages the CSC invention.

CSC Technology is Now Prior Art

As disclosed in the preceding CSC application specification (now U.S. Pat. No. 9,455,955), the CSC applies the earlier patented F+ Storage Firewall and Support System technology to solving the problems of improving storage system security by providing a better update and configuration mechanism, completing the Software-Defined Storage (SDS) part of the Software-Defined Infrastructure (SDI) evolution being introduced into datacenters, and improving the run time performance of Big Data Analytics and other data-bound parallelizable algorithms.

Key features and benefits provided by the CSC invention include an improved storage controller software architecture intended to support multiple storage interface mechanisms at the same time, as well as permit dynamic updates, upgrades, and customizations of the storage controller apparatus while the storage device is in operation. Also the provisioning and execution of applets (portions of larger software applications) to run on relevant storage devices for 100 times to 10,000 times performance improvements on certain big data applications running in large data centers. Also the security innovations covered by the previously issued F+ Storage Firewall patents, improved to prevent unauthorized applets and other malware from taking advantage of the new functionality provided by the CSC invention.

CSCs can support any or all of object store, file system store, and block store interfaces, and are intended to meet the needs for massively scalable storage topologies in cloud data centers as well as other market opportunities such as The CSC approach is to redesign the storage device controller mechanism paradigm, so that CSC—implemented storage devices can be used under any (or at least many) of the emerging storage paradigms.

In the CSC approach, the data center server-hosted and storage-device application software pieces need only have proof of their own identity, where the storage device controller has the ability to keep track of which application software is authorized to access the storage contents, and where the storage device (controller's storage firewall) has the ability to authenticate the application. As a result, the CSC approach will scale into vast numbers of storage devices.

The F+ Update Server (or some other assisting server-appliance such as a SDS {Software Defined Storage} service) is needed to define which applications have permission to access each of the protected storage resources, as well as other per-storage-device access and execution rights and permissions.

In my Provisional patent specification, the FlashApp was defined as a software application which was expected to be installed onto a flash drive (or a hard disk drive or a segment of a hard disk drive), where the application software is combined with all necessary data files, all of this protected by a software implementation of a storage firewall. The bundled data, software, and the F+ Storage Firewall are installed to the inside of a "Bubble".

Provisional FIG. 1 FlashApp Architecture' shows the complete path for the update of software to a Bubble resident on a USB Flash drive. Malware is blocked by the Firewall+, which is portrayed as inside the USB connector of the USB Flash drive, but which would really execute on the host PC.

The "Bubble" is a name for the large file (or file set) that represents the protected storage. There may actually be several, possibly large, encrypted files, rather than just one—but for purposes of this document they will be referred to as though there were only one single encrypted Bubble file.

There can be multiple Bubbles on a single storage device. When a F+ Storage Firewall is active, it can contact an Update Server for updates of the F+ Storage Firewall software itself, updates of the protected application(s), etc. It is made clear in the Provisional that software can be deployed (installed and provisioned) onto the Bubble.

The Bubble can be thought of as an "object" as the word is used in "object storage" definitions, and that therefore use of the Bubble/FlashApp approach provides a "software defined object storage" mechanism. This "software defined object storage" mechanism can be employed as an added layer of functionality for improving older storage devices such as SATA, SAS, and NVMe.

In Provisional FIG. 1 the Firewall+ mechanism is illustrated as inside the USB connector. It is described by the Provisional as running on the PC's processor or running on a separate processor inside the Flash memory device.

The biggest distinction between a USB Flash drive and a Solid State Disk (SSD) is the architecture of the storage controller; the USB Flash drive has a very simple storage controller, while the SSD has a more complex storage controller. They are essentially the same from the perspective that they are an application of Flash storage media, yet have very different storage controller designs, leading to different performance characteristics.

The architecture of the storage controller of a typical SSD product is probably such that it would be possible to extend it to provide storage firewall and/or CSC functionality, possibly merely requiring, essentially, a better processor and more RAM. Attempting to extend the storage controller of a USB Flash drive to add CSC functionality would probably result in a storage controller that closely resembles that of an SSD.

The storage media facing part of the CSC storage controller will, as in current storage devices' storage controllers, be implemented as an ASIC or in some other difficult to modify, rarely changed form.

The external facing part of the CSC storage controller (the storage device's external interface) is software. In the prior art storage controllers, the storage controller is basically a monolithic software executable. The CSC storage controller software, the storage device's external interface, can provide SATA, NVMe, SAS, or some other storage interface standard. In the CSC scheme, these can be swapped out, replaced, augmented, etc., because they are software applications running inside the F+ Storage Firewall operating framework.

In the CSC storage controller, the external facing part of the storage controller software, implemented as one or more software applications, where each is divided into portions, and where these portions are likely to be (frequently are) storage access operations.

These storage access operations are implemented as re-entrant {standard industry meaning} functions (subroutines). As the state table, the main execution decision mechanism, makes state transitions in response to external commands and internal events, the state table transitions can address (make function calls to) these defined operations. This is a very convenient way to employ the access control mechanisms, etc., at the point where the security controls need to be employed.

The relevance of this to the CSC patent specification is provided in the next several paragraphs of this technology overview:

The mechanism of the F+ Storage Firewall software embodiment Firewall+, as described in the provisional, is designed to run on a host computer processor, the host the USB Flash drive is physically plugged into. The Firewall+ software designed can be tweaked so as to support execution on other hardware processors such as storage controllers. As will be seen below, the flowchart for the startup of the Firewall+ has the implicit assumptions that the Firewall+ is implemented as software, and that Firewall+ will be running on a host computer.

The architecture of the Firewall+ combines a state table with the very fine-grained access control and whitelist mechanisms as shown below in the various Figures (all of them) from the provisional. The F+ Storage Firewall employs a different sort of software architecture than most software; this is what makes it more secure and easier to update, as well as providing a more secure operation mechanism because at each transition of the state table the software to be called (executed) on that transition can be verified and authenticated.

The CIP#2 CSC patent specification has the assumption that the CSC architecture leverages the CIP#1 patent specification material, which is a storage controller with embedded storage firewall functionality enabled by tightly integrated F+ Storage Firewall design elements (algorithms and data structures) into the storage controller mechanisms.

The basic idea of the CIP#2 CSC patent specification is to use the storage firewall mechanisms (state table, access control, execution whitelist, etc.) as the foundation for the external facing part of the storage controller software. This means that rather than the F+ Storage Firewall being layered on top of and integrated into the storage controller design (as in CIP#1), instead the storage controller is running as application software on top of the F+ Storage Firewall architecture and component mechanisms. The CSC mechanisms are the same as the F+ Storage Firewall mechanisms as described in the provisional, base patent, and CIP#1. But they are employed in a novel manner; it occurred to me a few years ago that there is nothing sacred about the storage controller; it is just another piece of software, not a black box, and there is no reason not to run several of them on the same storage controller hardware.

The F+ Storage Firewall execution and access control mechanisms provide a means for multiple simultaneous storage controller softwares, as well as other application softwares, as well as other softwares. This is a perfect fit for the needs of the 'Software Defined Storage' evolution in the cloud and enterprise data center, as well as a tremendous performance enhancer for the 'Big Data' application trend.

In addition, the F+ execution and update space for these storage controller and other softwares is protected by the same F+ Storage Firewall mechanisms that were described in the base patent specification as protecting the F+ Storage Firewall firmware and update mechanism.

The CSC-enabled storage device (controller) provides a built-in flexibility for storage devices to be dynamically provisioned with the appropriate storage controller software and configuration, able to support whichever storage interface is required, as needed, in a just-in-time manner. It provides the ability of several different concurrent (co-resident) software storage controllers (Storage Controller Interface Programs or SCIPs) to share the storage device, even to share all of the storage on the storage device. This functionality is provided by sharing the lower layers of the storage stack among the various SCIPs and other applications. This flexibility means that the CSC-enabled storage device can be mass-produced and mass deployed, with the assurance that mass-customization of storage resources can correspond to the evolving requirements of the data centers of the present and the future. As such, the CSC-enabled storage device (controller) is the best choice for storage controller architectures for the Software Defined Storage (SDS) paradigm being introduced into datacenters.

This recapitulation of U.S. Pat. No. 9,455,955 and the previously patented inventions, will help to introduce the innovations of the current invention, which is disclosed below.

CSC—Trust Model, Prevention of Unauthorized Software

The CSC is built around secure methods, mechanisms, and the F+ update and support server system, where these work together to improve storage apparatus while in operation in parallel with the storage media access operations. The functionality provided includes update, upgrade, dynamic reconfiguration, and dynamic adaptation to alternate storage interfaces.

The F+ approach to the question of trust and whether to permit an application access to storage contents is quite different; as part of a "360 degree paranoia" philosophy to building trustworthy systems, the F+ approach to storage security is to maintain a mechanism that enforces an on/off (binary) permissions and rights regime for access to specific storage contents and storage resources, where by default no access is granted.

The CSC invention makes use of an integrated F+ Storage Firewall, which has the intent of protecting the integrity of both the data and the storage device, as well as the privacy of the data stored on the storage device. The CSC-integral F+ Storage Firewall provides authentication and verification on every attempt to access storage before deciding whether to permit or block the access. While authentication tokens may be provided to the client software applications by the CSC for purposes of improving access performance, these are part of a strict strong security regime with no loopholes for privileged applications, and the CSC authentication tokens are optional as the application may opt to provide it's identification, authentication, and authorization credentials on every access.

The F+ Storage Firewall provides an access-by-access authentication process, closer to the protected data, with different methods and mechanisms than anything that has come before, thereby providing stronger security. The F+ Storage Firewall approach requires that whether to permit access to storage contents must be completely controlled by deterministic mechanisms, not statistically derived and adjusted trust values. The CSC-type storage controller either permits (authenticated and authorized) access or does not permit (other attempts to) access.

In the F+ Storage Firewall approach, the access authentication, authorization, etc., take place on the storage device (controller), reducing the amount of data moved back and forth across the network, as well as defining exactly the access rights of the application, so as to block all unauthorized access. This is a much more time and network bandwidth cost effective approach than those that employ over-the-network indices and authentication tokens provided by. And the authentication server token problem gets worse as the amount of addressable storage increases; this is a significant scalability issue as datacenters scale out. The CSC approach does not impose this performance tax.

The intent of a "Strict Trust Model", part of a strict or strong security model, is to impose deterministic controls. This should include per-access-request authentication and per-access-request rights & permissions examination to determine whether to permit the access on every access attempt. The F+ Storage Firewall approach is to block all unwanted access; the F+ Storage Firewall enforces authentication and verification on each and every attempt to access storage. The CSC, incorporating the F+ Storage Firewall, is integrated into the storage controllers integrated into each of the storage devices that the SAN is composed of, i.e. that the SAN controller manages. This combination improves the security of the SAN.

This is relevant to this present AppAccel invention because it leverages the CSC invention. This present AppAccel invention can be applied to either (both) of the embodiments of the CSC invention, both with and without a SC Security Co Processor.

Benefits of CSC-Enabled Storage Devices

The CSC technology can be applied to benefit many purposes. It can be used for more flexible designs for HADOOP and CEPH clusters, for SDS integration, for accelerating Big Data Analytics, for easier scaling to exabyte scale datasets, to build rack scale storage designs, for data mining, data security, and to better meet organization requirements such as DLP (data loss prevention) and SOX (Sarbanes-Oxley Act) compliance.

One of the key CSC CIP#2 ideas is that storage controller interfaces are essentially application software that meet corresponding storage interface protocol requirements.

Multiple storage controller application software can run on the same storage controller hardware at the same time. Other application software can run on the same (multi-core) processor at the same time, and application software can be ephemeral applets.

Though the CSC does enable enormous storage scalability it does so in quite a different manner than other approaches. Authentication of deployed software, and of access requests, is a problem for other storage controller approaches. The CSC approach does not have this obstacle. When deployed to the CSC-enabled storage device, the application need only have proof of it's own identity, where the storage device (controller) has the ability to keep track of which applications are authorized to access the storage contents, and where the storage device has the ability to authenticate the application. As a result, the CSC-enabled storage device approach will scale much more easily into vast numbers of storage devices.

The CSC can support the object and other novel storage interfaces by supporting multiple SCIPs. The CSC is a very different approach from currently commercially available storage controllers, built using a different set of technologies, providing a dynamically customizable storage controller architecture capable of simultaneous support of diverse storage interfaces as well as execution of portions of application software adjacent to the storage contents (on the distributed storage resources).

While the benefits provided by other Datacenter architecture improvements may include improved scalability and performance, with the intent of handling the enormous increase of data, they do not include the massive scalability and other benefits provided by customizable storage controllers.

Customizable Storage Controller (CSC)

FIG. 8A (Customizable Storage Controller with Single Processor) of my CIP#2 CSC specification illustrates the use of a single processor and some RAM to provide the described CSC functionality. The CSC software programs are stored on the SC Program Store 318 (which may be provided by a portion of the storage resource, the Storage Media 312 if it is not a separate component).

FIG. 8B (Customizable Storage Controller with Single Processor, Internals) of my CIP#2 CSC application shows the relationship between the SC Processor 314, SC RAM 316, and SC Program Store 318. The SC Processor will be running the CSC operating environment, which will include the same components as the Storage Firewall 12 as shown in earlier patent figures such as FIG. 1. This CSC operating environment has the same architectural-level functionality as the Bubble of the FlashApp and Firewall+ disclosed in the base patent (U.S. Pat. No. 7,743,260) and Provisional patent disclosure; the most significant differences are an expectation that there is no local user, and that there will be many more application software programs to manage.

FIG. 9A (Customizable Storage Controller with Security Coprocessor) was created for my CIP#2 CSC application. The Security Coprocessor 322 and Locked Firmware 324 are the differences from the simpler CSC, from the earlier similar Figure. The Security Coprocessor provides security functionality such as verifying (authenticating) the identity of other devices, and communication (data-in-motion) encryption. The reason to have a separate Security Coprocessor is to offload the runtime performance cost from the SC Processor. The Security Coprocessor is provided its functionality by the software stored in the Locked Firmware 324. This Locked Firmware is software that is very carefully locked down against unauthorized changes. It is possible for the Security Coprocessor and Locked Firmware to be combined into one device such as an FPGA or ASIC, both for runtime performance reasons and to prevent unauthorized changes.

FIG. 9B (Customizable Storage Controller with Security Coprocessor, Internals) was created for my CIP#2 CSC application. The Security Coprocessor 322 and Locked Firmware 324 are the differences from the simpler CSC, from the earlier similar Figure.

FIG. 9B shows the Security Coprocessor 322 between the rest of the CSC and the external world, and shows the relationship between the components of the CSC with Security Coprocessor. FIG. 9B shows that the Security Coprocessor (generally) runs software resident in the Locked Firmware, but can also run software resident in the SC Program Store. FIG. 9B also shows that the SC Processor can write changes to the Locked Firmware; this functionality depends on the nature of the Locked Firmware, ASICs are read-only.

The CSC Processor, memory, and Program Store: These are for the execution of portions of application software, useful for accelerating the performance of big data and other software, by putting local processing close to the data, to avoid many of the data round-trips between the data (storage device) and the host (application running on a remote computer).

In my CSC FIG. 8A there is an illustration of a single processor version of a CSC. The single processor version of the CSC uses the same processor for executing the distributed software applications, storage device management, F+ Storage Firewall protection, storage media access functionality, and other functionality, where 'distributed' implies 'provisioned' FlashApps (see the Provisional for FlashApp description) as well as big data applets, as well as any other software required. The single processor version of a CSC is essentially the same category of hardware as can be found in past and current commercially available storage devices, though with larger storage controller RAM and with a program store for the additional software; probably in the single processor version of a CSC the storage controller processor should be faster than in current commercially available storage devices as it has to do more. CSC FIG. 8B shows one view of the relationship between the SC Processor, RAM, and SC Program Store in the normal operation for provisioning and executing distributed software applications.

For comparison, in CSC FIG. 9A there is an illustration of the CSC version with a Security Coprocessor. This is a stronger security design where the additional security also improves the total performance of the storage controller, by, among other things, off-loading some or all of the security tasks from the main storage controller processor as well as shielding the main storage controller processor from various classes (types) of security attacks.

CSC—Datacenter Perspective

The CSC invention enables a more complete commodization of enterprise-class storage controller hardware. The magic of CSCs is the dynamically update-able, upgrade-able, modifiable-at-will software storage controller environment, capable of simultaneously providing (supporting, running) any or all of several storage device interfaces. The value-add of CSCs is provided by this customizable software environment, which can dynamically define (customize) storage devices and their interfaces into what is needed at a particular time. CSCs are the right match for the software-defined-network (SDN), software-defined-storage (SDS), and software-defined-everything-else cloud data center that has been emerging for the past few years. There are several flavors of software-defined technologies data center . . . but the CSC can fit into and enable (support) all of them.

In addition, the CSC invention creates the opportunity for large data center applications to provision small portions of the larger application into the storage controllers, for local data access. This can provide several thousand times the performance over the current approach (as exemplified by the NAS and SAN topologies) as it reduces the number of data access request-response round trips between the computers hosting the client application software and the storage devices (storage device controllers) hosting the small application portions. And with the much greater storage media density of future storage devices, the performance benefits will be correspondingly greater, because that many more request-response round trips will be avoided. The CSC invention will be a fundamental building block of the emerging SDS (Software Defined Storage) approach to storage architectures, which will obsolete and supersede (replace) both the NAS and the SAN approaches in the long view, and improve them in the short view.

The CSC-enabled storage device invention is intended as improvements to the storage controller mechanisms, both software and hardware. The CSC-enabled storage device invention focuses on the architecture and mechanisms of the storage controller in a storage device such as a HDD (hard disk drive) or SSD (Solid State Drive); the CSC approach re-envisions the architecture of storage device storage controllers, enabling significantly different features over prior storage controller architectures.

The CSC approach is to redesign the storage device controller mechanism paradigm, so that CSC—enabled storage devices can be used under any (or at least many) of the emerging storage paradigms.

The CSC is an improved storage controller software architecture intended to support multiple storage interface mechanisms at the same time, as well as permit dynamic updates, upgrades, and customizations of the storage controller apparatus while the storage device is in operation.

The CSC-enabled storage device can support any or all of object store, file system store, and block store interfaces. The CSC invention achieves massive scalability through the customizability of the storage controller software. The CSC employs the storage controller software application registration methods described in the CSC and F+ Storage Firewall disclosures, and the CSC application registration mechanism supports the dynamic on-the-fly customization features of the CSC.

The CSC-enabled storage device provides a built-in flexibility for storage devices to be dynamically provisioned with the appropriate storage controller software and configuration, able to support whichever storage interface is required, as needed, in a just-in-time manner. It provides the ability of several different concurrent (co-resident) software storage controllers (i.e. storage controller softwares that service storage access protocols) to share the storage device, even to share all of the storage on the storage device. This functionality is provided by sharing the lower layers of the storage stack among the various storage controller softwares and other applications. This flexibility means that the CSC-enabled storage device can be mass-produced and mass deployed, with the assurance that mass-customization of storage resources can correspond to the evolving requirements of the data centers of the present and the future. As such, the CSC-enabled storage device is the best choice for storage controller architectures for the Software Defined Storage (SDS) paradigm being introduced into datacenters.

Use of the CSC in the datacenter will improve the performance of the entire data center:

Reduce network congestion;

Speed up other applications' access to data and other resources;

Improve storage pool average response time as well as storage pool throughput; and Transform the datacenter by enabling more pervasive SDS+ SDI, thereby reducing the current pressure to network bandwidth.

One way to think of the benefits of the CSC invention and system is to consider the cost of supporting big data and other Enterprise software applications. The 'traditional' approach to designing a storage paradigm (leading to a storage architecture and related topologies) is either to estimate the requirements of an ideal (paradigmatic) use-case, or to estimate the average load requirements based on a further estimate of average application density, activity, and storage requirements. In either case, a reasonable one-size-fits-all architecture is then designed and deployed, with relatively unmodifiable components. In the real world, after construction of a data center, applications that do not fit expectations are considered poorly behaved because of their effect on the deployed infrastructure; these bad applications may hog storage network bandwidth or some other no-no, and IT staff will spend time and other resources taming the bad applications, etc. The value of the CSC invention, as well as the rest of the SDS (Software Defined Storage) technologies being introduced by industry, is that the storage infrastructure can adjust to the needs of the applications, with enormous cost savings as well as performance improvements.

As another thought on this topic, in the June 2015 issue of 'Communications of the ACM', page 78, the article 'Future Internets Escape the Simulator', 11 authors starting with Mark Berman, there is this passage:

"Cloud computing researchers confront a . . . dilemma. In order to maintain uniformity and efficiency in their data centers, commercial cloud providers generally do not provide "under the hood" controls that permit modifications to the underlying network topology or protocols that comprise the cloud environment."

The CSC invention is the storage technology part of the solution to this situation, in that a CSC storage device can be customized to support and enable the novel and experimental as easily as it supports and enables enormous scalability and meets the requirements for high performance.

The CSC invention opens storage devices, and the present AppAccel invention employs many of the CSC features. The CSC supports the provisioning and execution of applets (portions of larger software applications) to run on relevant storage devices for 100 times to 10,000 times performance improvements on certain big data applications running in large data centers. The CSC also includes the security innovations covered by the previously issued F+ Storage Firewall patents, improved to prevent unauthorized applets and other malware from taking advantage of the new functionality provided by the CSC invention.

AppAccel Goal is Reduced Total Execution Time

This portion of the present AppAccel invention disclosure is to clarify the objectives. While the CSC invention provided certain benefits, it did not completely address the performance objectives of Big Data Analytics algorithms that have to deal with the massive scale out of storage resources currently underway:

Digital Data Storage is Undergoing Mind-Boggling Growth

Dr. Lauro Rizzatti, Verification Consultant

Sep. 14, 2016 04:10 PM EDT http://www.eetimes.com/authorasp?section_id=36&doc_id=1330462

The goal of the present AppAccel invention is reduced total execution time for server-hosted datacenter analytics applications, to enable them to scale with the enormous growth in data storage. These may be Big Data Analytics, Enterprise software, or other datacenter applications that have to cope with the massive scaling of data load.

The objectives that support this goal: distribute work as widely as possible, operate close to the data, tailor the operations to the data, collect the results in an orderly fashion, and reduce network load. These objectives have particular significance to the problem of massive search, necessary to support the high performance requirements for Big Data Analytics and similar categories of applications.

One way to think about on-storage-device execution of search and other software, tailored for the dataset, storage device, and so on, is to consider the basic performance problem of any server-hosted application: if an array (data structure) has to be filled with data, where obtaining the data for each array element requires one storage access network round-trip (request and response), then a 100 element array requires 100 storage access network round-trips, and a 1 million element array requires 1 million storage access network round-trips, and so on. There may be billions or trillions of such storage access network round-trips required for the completion of an algorithm, adding up to heavy network load, significant network latency for both this application and other applications on the shared network resource. This situation holds even as the network bandwidth scales up, because the dataset sizes are also scaling up.

The solution to (some of) the performance problems encountered by Big Data Analytics is to run the search portions of the Big Data Analytics Applications on the storage devices, in proximity to the data, with many storage devices doing this in parallel, and where each search instance is customized to the local conditions on it's storage device regarding dataset and other parameters. The results of these parallel searches of storage devices can then be integrated by the server-hosted Big Data Analytics Applications.

Therefore, providing faster performance of Analytics and other datacenter and Enterprise algorithms on large datasets requires:

High-performance secure parallelism in the execution of portions of server-hosted application software; in the case of search, high-performance search parallelism;

Per dataset data access algorithms, corresponding to (customized for) particular attributes of the dataset (and subsets of the dataset); in the case of search, per dataset search algorithms, corresponding to (customized for) particular attributes of the dataset (and subsets of the dataset); and Where portions of the per dataset data access algorithms execute in proximity to the data; in the case of search, portions of the per dataset search algorithms execute in proximity to the data.

The leveraged CSC invention provides improved storage devices that are programmable, customizable storage controller processing environments, capable of hosting/running portions of server hosted application software.

This present AppAccel invention provides performance-related benefits such as:

Optimized multi-haystack search;

Secure execution of application software on storage devices (adjacent to the data);

Per dataset localized data access operations and per dataset search operations;

Massively scalable parallelism; processing naturally scales with the number of storage devices; and Reductions in overall network load, leading to reduced network contention and reduced network latency.

Introduction to Accelerated Analytics, or Multi-Haystack Search

This section of the present AppAccel invention disclosure is on "Finding the needle in the haystack, or a lot of needles in a great many really big haystacks." This is a different conceptual approach to improving the runtime performance of Big Data Analytics, to searching exa-scale (and larger) data sets. Faster search among the datasets can achieve faster results from the analytics software applications, even if analyzing exabyte scale datasets. Parallel simultaneous searches should complete in no more than the time required for the longest (largest) search to complete.

Consider the metaphor of the needle in the haystack, or some possibly non-null number of needles among multiple haystacks; if we can ask the haystacks to search themselves, in parallel, we can obtain the set of found needles in the longest time spent searching a haystack, probably the time it takes to search the largest haystack.

Therefore, another way to think of the present AppAccel invention is as an approach to radically improving the performance of search by translating it into multi-haystack search, which accelerates Big Data Analytics queries.

The difficulty of finding the proverbial 'needle in the haystack' comes from the nature of the haystack, the nature of the needle, and the nature of how we expect to have to search.

There is some unknown (unpredictable) number of non-needle items, plus some unknown number of needles in each haystack (dataset).

The time to search any arbitrarily selected haystack is T, which is proportional to the size of the haystack. The entire haystack has to be searched, since even the last element examined may be a needle. If we are sequentially searching one haystack after another, the time to search each haystack can be designated Th (read as T-sub-h, where 'h' is the numerical subscript designation of the haystack).

The length of time needed for the entire sequential search is the sum of the lengths of time to search each of the haystacks. Let's call this time S, which is the sum of {T1, T2, T3, . . . , Tn} ($T_n$ should be read as T-sub-n), where n is the number of haystacks. S will grow in proportion to the number of haystacks to search, which could be a very long length of time.

There is a faster way, if we can employ multiple server agents. If we employ, for example, N searching servers to the task, and if we organize the datasets into approximately equivalent sized search sets, then the length of time needed is approximately 1/N.sup.th of S. (If 10 servers, then 1/10.sup.th of S). This is an improvement, but 1/N S will still grow in proportion to n, the number of haystacks to search.

If we search all haystacks simultaneously then S (the length of time needed to search all haystacks) is the length of time required to search the largest of the individual haystacks. In other words, S is equivalent to max of {T1, T2, T3, . . . , Tn}. One way to do this is to have a corresponding search server for per haystack. A better way (this present invention) is to ask each haystack to search itself; i.e. to install a search tool at each haystack.

Another optimization is to carefully define the problem with the objective of reducing the size of the haystacks. If we divide the haystacks, especially larger haystacks, into smaller search sets, then the overall length of time needed is the time required to search the largest search set; this means we reduce S in proportion to the extent we can define small haystacks, although there will be a larger number of these smaller haystacks. This may not be possible in all cases, but haystacks may be amenable to being virtually organized into smaller search sets.

In addition, each haystack's search can be aware of the nature of that haystack's hay (component elements') organization and format, so that each Th (time to search that haystack) is reduced (faster). This means that there is a performance benefit for the search tool installed at each haystack to be aware of the organization and format of the elements of that haystack (dataset).

Therefore, using these optimizations we can find the needles in the haystacks more quickly.

Execute in Proximity to the Data

This section of this disclosure is about the objective of employing per-storage-device secure execution of application software on storage devices (adjacent to the data).

Storage-device-facing portions of server-hosted datacenter applications can be excerpted, extracted, and ported to become storage-device-hosted applets. These will execute in proximity to (close to) target data.

The best candidates for this performance optimization (of the server-hosted application) are data access operations and (portions of) search algorithms.

When run close to the data on storage devices, data access operations run without network latency overhead, and complete more quickly. This translates to faster completion of the server-hosted application that makes use of the storage-device-hosted applets.

The applicability to the search problem is that each haystack (dataset) will search itself, by dint of the search applet on the storage device that contains the dataset.

The present invention Secure Application Acceleration (AppAccel) functionality can leverage the local execution abilities of the currently allowed CSC invention's improved storage devices and the F+ support system including the F+ Update Server.

Per Dataset Search and Other Data Access Operations

This section of this disclosure is about the objective of applying per dataset (per data format) customizations of data access software.

Continuing the haystack search metaphor, each haystack (dataset) should know how to best access and/or search itself. This translates to the data access and/or search software knowing about the dataset organization and format, as well as any other useful information that would help to optimize the data access and/or search operations. This means the software running on the storage device should be optimized for that particular dataset and that type of storage device.

The search and/or other data access operations are customized for the dataset, for optimized performance. This means that the mechanism that deploys the software onto the storage device has to be selective, and that appropriate software (with the correct per dataset data access and/or search algorithms) has to already exist and be available for provisioning, or that the deployment mechanism has the ability to create the correct software as needed.

Massively Scalable Parallelism

This section of this disclosure is about the objective of applying per-storage-device parallelism to search and/or other data access operations.

The objective of parallelism is to offload work to the many storage controllers, to further reduce the load on servers and network, and to do in parallel whatever can be.

As explained in the multi-haystack search metaphor, this reduces the total time to completion of a search of many storage devices to approximately the time required to search the largest dataset storage device.

As datacenter data grows to exabyte scale and larger, there is probably going to be a corresponding increase in the number of physical storage devices containing this data. (The alternative is to increase the amount of storage media per storage device beyond what the device can readily address and serve the contents from.)

Each of these storage devices can be CSC and AppAccel equipped, enabling these storage devices to host search and/or other data access operations. This reduces a significant challenge, even obstacle, to the efficient access to the exa-scale data.

The resulting datacenter storage architecture will pose its own challenges such as managing the complexity of a great many pieces of software on a great many storage devices.

Reductions in Network Load

This section of this disclosure is about the objective of reducing network load, when employing per-storage-device parallelism for search and/or other data access operations.

This has the benefits of reducing network congestion and reducing network latency for this application and for all other applications sharing the same network.

Some of the concepts employed here:

Server-side is the array of servers, server blades, and other compute resources;

Storage-side is the pool of storage resources, no matter how it is arranged;

Server-side uses resources located on the storage-side; and

The network chasm is a gap (of time) caused by the very activity the data center was built to handle; as the data center activity increases, the network chasm grows larger.

Network performance is one of those areas where perception is akin to reality: if the time required to make a set of data access requests, such as for the search of a storage resource, is high, and if the requesting server-hosted application is blocking on this 'disk I/O', then the network chasm is very high indeed. It is as though the storage latency is high because of a 'chasm' or great distance between the server-side and the storage-side.

The network chasm is reduced when the total time required for the server-hosted application to obtain the data it needs is reduced. As discussed elsewhere, there are various ways to do this; the methods introduced by the present AppAccel invention reduce the total amount of traffic, substituting an increase in the number of large packets for a larger number of small packets.

Query Completion Time

There has been considerable industry and academic attention paid to network latency, network congestion, and network slowdowns. There are multiple performance measurement methodologies. The more useful capture the nature of the affect on the performance of server-hosted applications.

One of the useful performance measurement methodologies is "query completion time", the time required for a typical query to complete; this could be a search of a dataset or a database query. The assumption behind this measurement is that server hosted applications generally make multiple sets of queries of datasets.

Query completion time is a statistical approach, which measures the average time to completion of a query operation. This provides a useful metric for the efficiency of a particular datacenter architecture, network topology, or combination of the datacenter component that support the operation of server-hosted applications. This is more useful for understanding datacenter design options and choices than is network bandwidth.

This metric is further described and applied in the following paper:

Datacenter Applications in Virtualized Networks: A Cross-layer Performance Study http://researcheribm.com/researcher/files/zurich-DCR/Datacenter%20Application%20in%20Virtualized%20Networks%20A%20Cross-layer%20Performance%20Study.pdf Manuscript received Jan. 15, 2013; revised May 28, 2013.

Daniel Crisan, Student Member, IEEE, Robert Birke, Member, IEEE, Katherine Barabash, Member, IEEE, Rami Cohen, Member, IEEE, and Mitch Gusat, Member, IEEE. Corresponding author: gusat@ieee.org Daniel Crisan, Robert Birke and Mitch Gusat are with IBM Research, Zurich Research Laboratory, Saumerstrasse 4, CH-8803 Ruschlikon, Switzerland (e-mail: {dcr,bir,mig}@zurich.ibm.com).

Katherine Barabash and Rami Cohen are with IBM Research Lab in Haifa, Haifa University Campus, Mount Carmel, Haifa, 31905, Israel (e-mail: {kathy,ramic}@il.ibm.com)

The abstract of this IBM paper is Datacenter-based Cloud computing has induced new disruptive trends in networking, key among which is network virtualization. Software-Defined Networking overlays aim to improve the efficiency of the next generation multitenant datacenters. While early overlay prototypes are already available, they focus mainly on core functionality, with little being known yet about their impact on the system level performance. Using query completion time as our primary performance metric, we evaluate the overlay network impact on two representative datacenter workloads, Partition/Aggregate and 3-Tier. We measure how much performance is traded for overlay's benefits in manageability, security and policing. Finally, we aim to assist the datacenter architects by providing a detailed evaluation of the key overlay choices, all made possible by our accurate cross-layer hybrid/mesoscale simulation platform.

AppAccel changes this situation; while query completion time is still a valuable metric when the storage access is through SCIPs such as NVMe over Fabric, etc., the nature of storage access queries in an AppAccel improved datacenter architecture, through SCAPs, is fundamentally different. This improved storage access approach means that fewer network queries will be made, with greater (larger) data returns. One way to refactor the query completion time metric is to combine the estimated completion time for a set of queries against unimproved storage resources, then compare this to the completion time for an equivalent result set of queries against improved storage resources. The present AppAccel invention should be quite a bit faster, with performance effects caused by datacenter and storage architecture.

Avoid-At-All-Times Network Traffic

Network load can be broken into several categories, which include 'unavoidable', ' occasional', ' optimized', and ' avoid-at-all-times'—of course there can be still other categories.

The avoid-at-all-times category includes heavy repeated requests for the *same* data elements from the same dataset, same storage resource. It can be detected by looking for this pattern. This is the sweet spot for caching this data close to the servers.

The avoid-at-all-times category also includes the case of the storage resources which receive a large number of not-the-same-data requests, therefore not lending itself to server-side caching. This may include storage devices containing large and frequently updated datasets, or perhaps data streaming in from an external source. This network load can be reduced through on-storage-device "in-situ" processing and other CSC enabled operations, where the resulting traffic can be characterized as part of the optimized category. These are the datasets that belong on CSC storage devices.

TCP Incast

Another part of the datacenter performance problem is referred to as TCP incast. TCP incast is a datacenter network related problem that slows down one-to-many access to network connected storage.

TCP incast is one of the 'avoid-at-all-times' categories of network traffic, yet it is very hard to avoid if the storage architecture stripes datasets across multiple separately-network-addressed storage devices.

One simple version of TCP incast is when a server-hosted application requests some set of data from a set of storage devices, where this dataset is distributed across multiple storage devices. Each storage device will respond, in its own good time, with its portion of the data. The server-hosted application does not (can not) request additional data until all portions of the requested dataset have been received. There is network contention and response latency, perhaps because of the network topology, or because one or more of the target storage devices is busy serving other requests. The server-hosted application is blocked, waiting on the storage access I/O, until all parts of the pending request have completed.

Frequently, TCP incast is caused by the basic layout of datacenters: each server has one (or a small number of) connections to the network (a major bottleneck), and each network connected storage device has one connection to the network (a minor bottleneck), and storage access responses from many storage devices at once creates network congestion, similar to the way a merging lane on the highway creates a traffic slowdown—consider the effect of merging many lanes at the same point onto a single lane road.

TCP incast has been described by this paper:

Understanding TCP Incast and Its Implications for Big Data Workloads https://www2.eecs.berkeley.edu/Pubs/TechRpts/2012/EECS-2012-40.pdf Yanpei Chen, Rean Griffith*, David Zats, Anthony D. Joseph, Randy Katz University of California, Berkeley, *VMware (ychen2, dzats, adj, randy)@eecs.berkeley.edu, *rean@vmware.com Let's consider the TCP incast problem from the perspective of the performance of a server-hosted application. The TCP incast problem is a sort of self-inflicted wound of network congestion, similar to a distributed denial of service (DDoS) attack. The situation is created by a storage access request for data that is distributed among multiple storage access devices. The replies from these multiple storage devices to a single server collide with each other; this network congestion is the TCP incast problem. This, of course, slows down the performance of the application— what is ironic about this is that distributing a dataset across storage devices, such as in striping blocks across disks, is intended to improve performance, not slow it down.

The TCP incast problem also negatively affects the performance of other applications hosted on the same server, as well as other applications hosted on other servers connected to the same portion of the datacenter network.

The present AppAccel invention reduces the scope of the TCP Incast problem by reducing the total amount of storage network traffic to and from the server-hosted applications, and by changing the way that storage devices interact with the applications and with the network.

Also, there is another beneficial effect of the present AppAccel invention on the TCP incast problem, in that the server-hosted application (that has requested the data) does not block on the storage access I/O, but rather can make asynchronous non-blocking RPC calls to storage device— hosted storage access Applets (for purposes such as search), which can return the result of what would have been multiple storage access requests.

IN THE DRAWING

FIG. 8A is an illustration of a customizable storage controller (CSC) having a single processor in accordance with a first embodiment of the present invention.

FIG. 10 is a datacenter network diagram (Block Diagram) that illustrates the background of the problem being solved by the present invention: network chasm, a performance gap caused by switch congestion, network latency, where parallelism across servers actually aggravates the (increases) overall performance problem as each of these accesses multiple storage devices.

Figure 11:
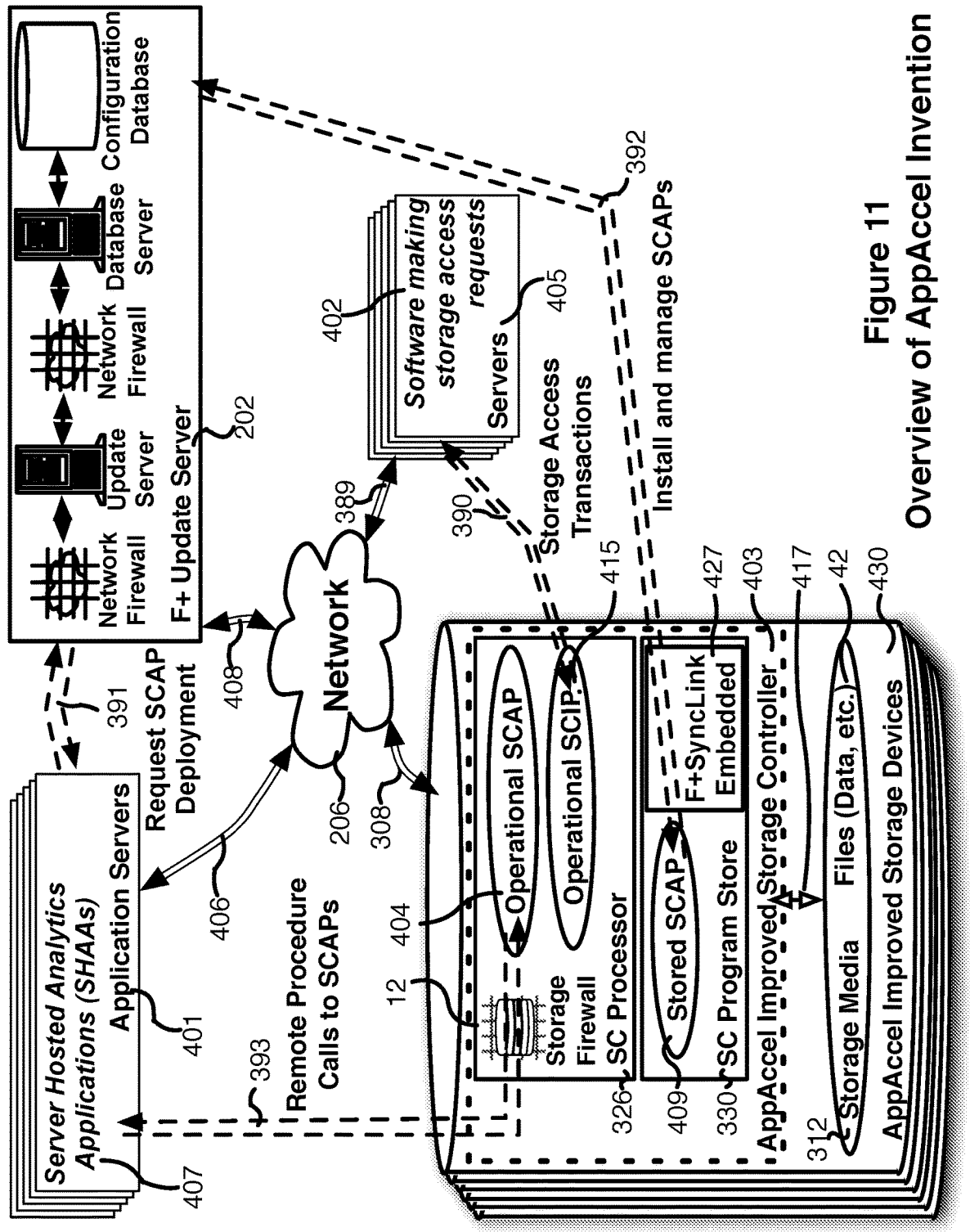

FIG. 11 is a datacenter network diagram that illustrates the present invention from a high level, including the relationship of the Analytics Applications running on the Application Servers to the AppAccel Improved Storage Devices and to the F+ Update Server in accordance with the present invention, and the relationship of other server hosted software making accessing the improved storage devices by way of a multiplicity of storage controller interface programs.

Figure 12:
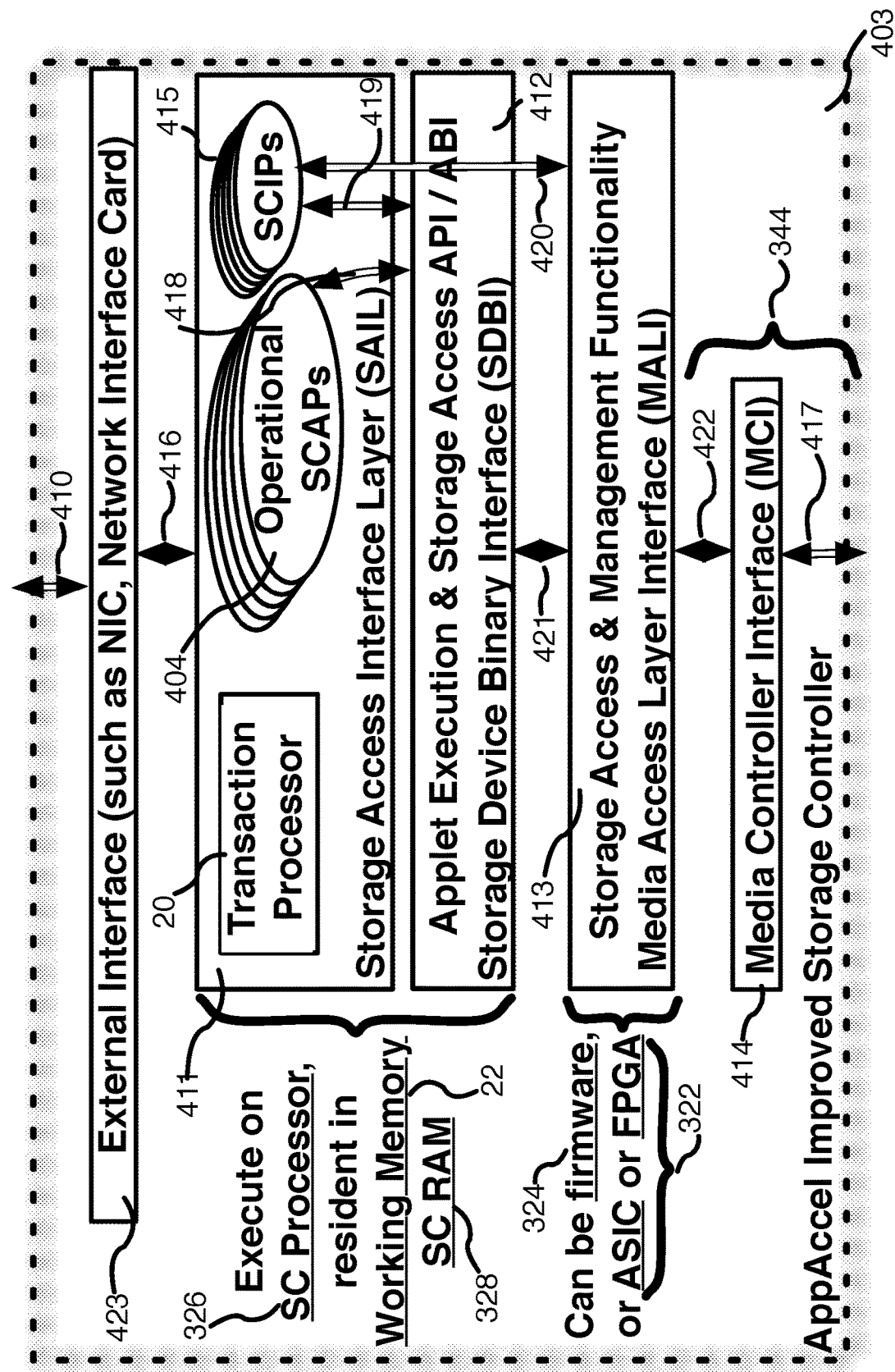

FIG. 12 is a software stack illustration showing important components of the present AppAccel invention (though some leveraged F+ components are not shown) in accordance with the present invention.

Figure 13:
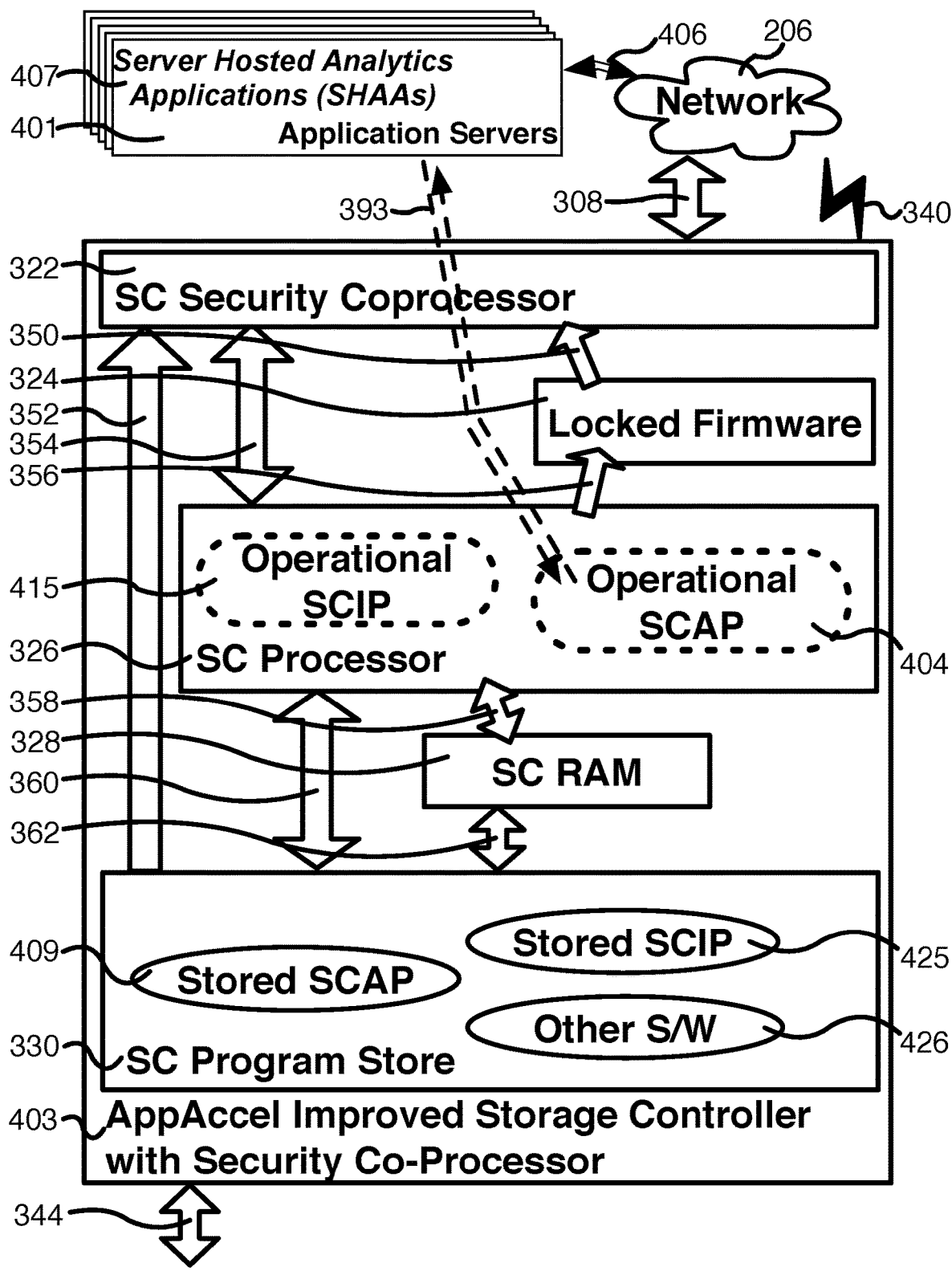

FIG. 13 is a block diagram that illustrates the runtime calling and datapath relationship between a Server-hosted Analytics Application and a representative running Operational SCAP (not shown is the F+ Update Server) in accordance with the present invention.

Figure 14:
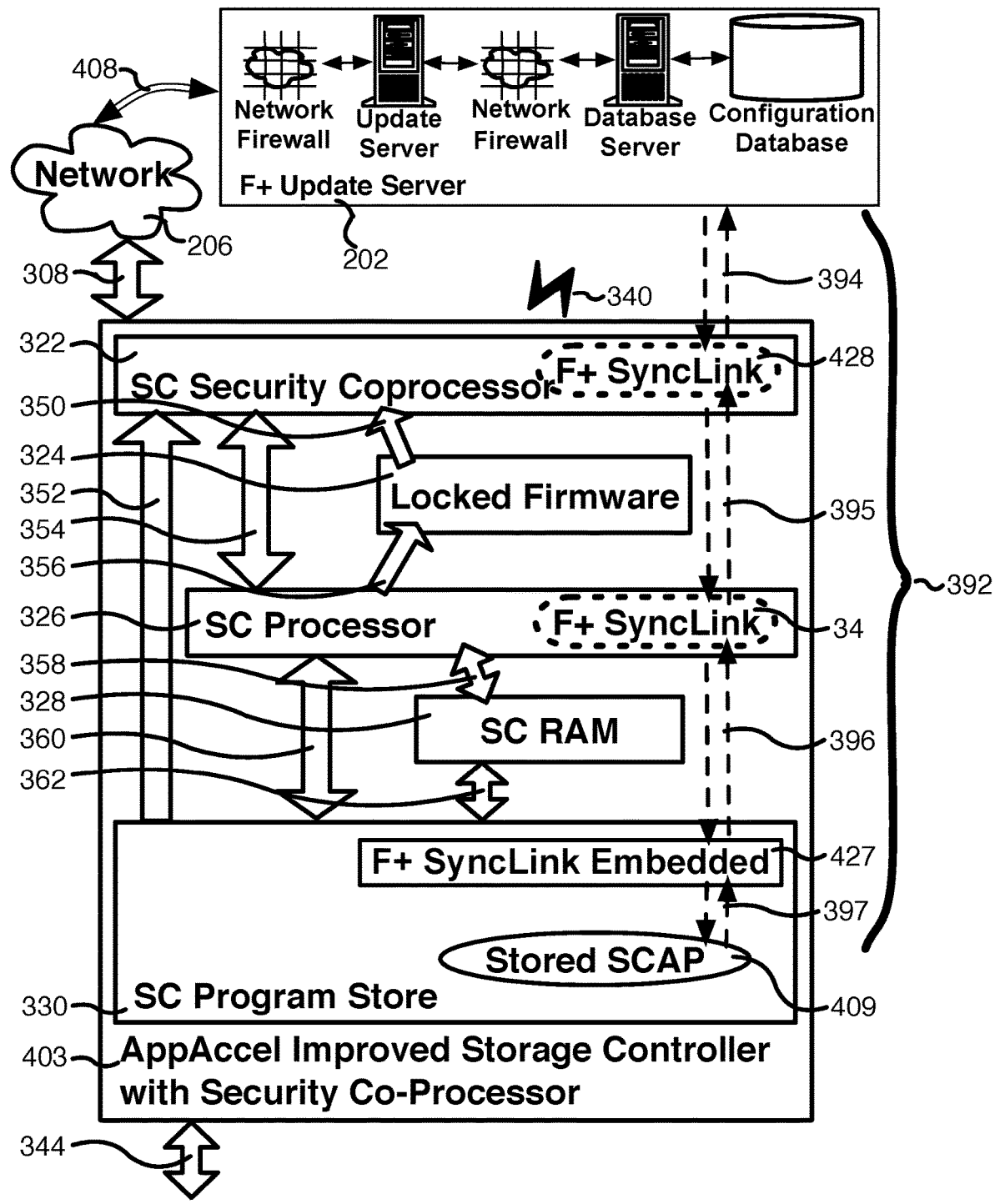

FIG. 14 is a block diagram that illustrates the runtime installation and management relationship between the F+ Update Server and a representative Stored SCAP; shows intermediate F+ SyncLink relays as well as the target F+ SyncLink Embedded mechanism that provides the local direct installation and management of software in the SC Program Store (not shown are other F+ mechanisms such as the F+ Authentication/Authorization and F+ Application Rights & Credentials components) in accordance with the present invention.

Figure 15:
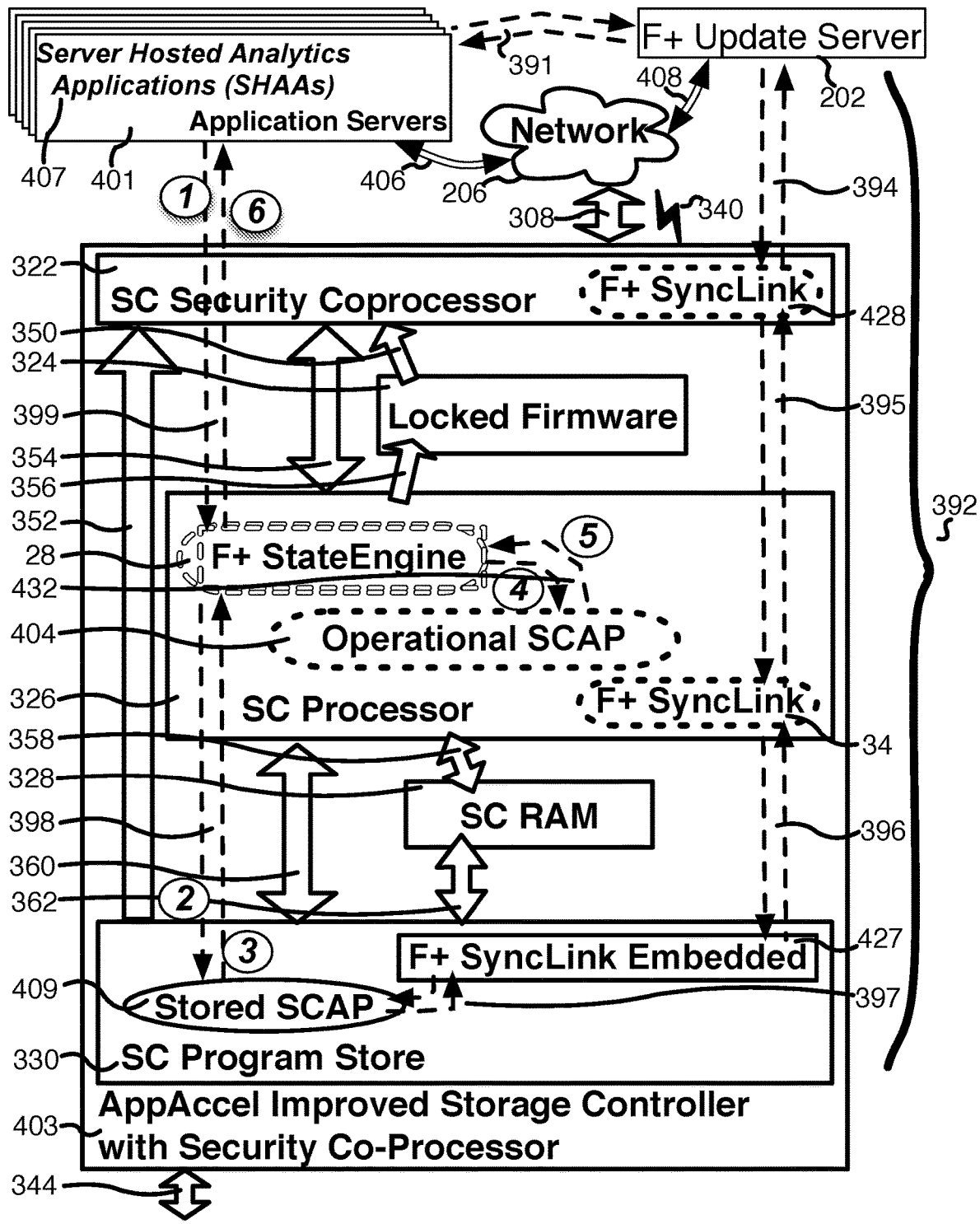

FIG. 15 is a block diagram that illustrates the execution start of a representative Stored SCAP; it becomes the representative Operational SCAP in accordance with the present invention. The numbered circles indicate the sequence of data flow.

Figure 16:
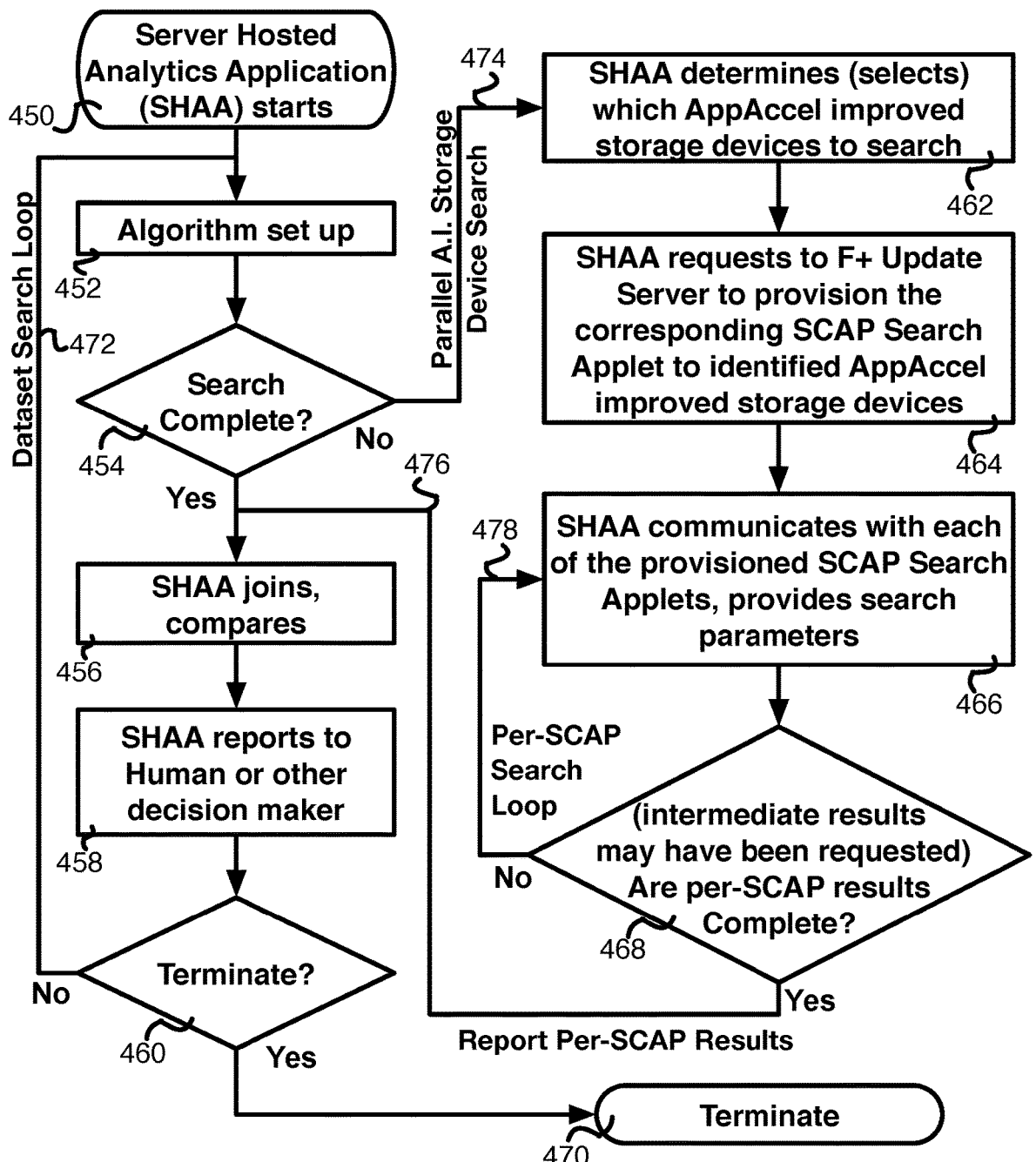

FIG. 16 is a comprehensive high level flowchart of the algorithm to accomplish multi-haystack search, to scale the Server-hosted Analytics with the number of storage devices in accordance with the present invention.

DETAILED DESCRIPTION

Figure 1:
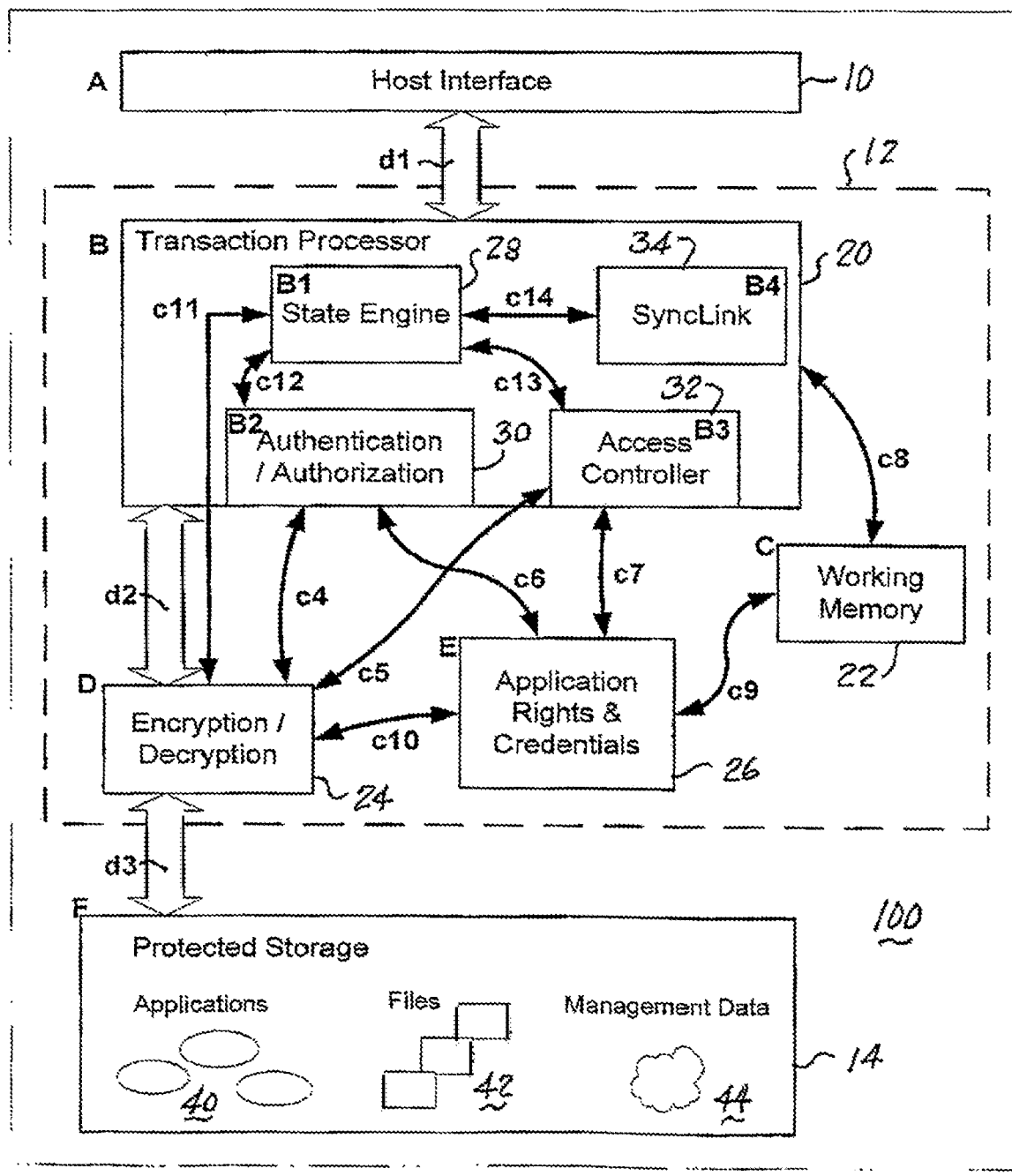
FIG. 1 is a block diagram illustrating an embodiment of a data storage device including a storage firewall in accordance with the present invention.

Referring now to FIG. 1 of the drawing, a data storage system in accordance with the invention disclosed in my prior U.S. Pat. Nos. 7,743,260 and 8,474,032, and sometimes referred to herein as the Firewall+ storage firewall or the F+ storage firewall, is schematically illustrated in block diagram form at 100. As depicted, the system includes a host interface 10, a storage firewall 12 and a protected storage component 14.

The illustrated host interface 10 provides an interface between a host computer (not shown) and a storage firewall 12. The storage firewall 12 is composed of a transaction processor component 20, a working memory component 22, an encryption/decryption component 24, and an application rights & credentials component 26. The protected storage 14 is the memory that is being protected.

The storage firewall 12 is connected to the host (not shown) through the interface 10 and sits between the interface 10 and the protected storage 14.

Transaction processor component 20 processes storage access requests and other requests related to the administration of the storage firewall 12, and includes a state engine module 28, an authentication/authorization module 30, an access controller module 32 and a SyncLink module 34.

Working memory component 22 provides local memory storage that persists across transactions. It is used for a variety of processing memory and storage purposes by the storage firewall.

The encryption/decryption component 24 provides encryption and decryption functionality for both storage firewall processing and encryption and decryption of data of authorized transactions. It also keeps track of the symmetric key needed for the encryption and decryption operations, and provides the command & control path to the protected storage 14 from the transaction processor component 20.

The application rights & credentials component 26 stores, processes, and provides user and application credentials and access parameters for authentication, authorization, and access control purposes.

State engine module 28 provides for execution of the transaction decision tree or state table of the storage firewall 20. All transactions are processed through the state engine module, which decides what to do, how to respond, and which other modules and components to use to meet the requirements of the requested transaction.

Authentication/authorization module 30 provides the authentication and authorization functionality of the storage firewall. This means that the authentication/authorization module examines the current credentials and identifying information of the requesting user and the requesting application, then decides whether to grant access to the protected storage. If granted, an authentication token is generated.

Access controller module 32 provides access control for an application that requests access to the protected storage 14. The requesting application must provide a valid authentication token. The access controller module validates and verifies this authentication token. If the authentication token is valid, the request is evaluated to decide whether to grant access, based on previously stored authorization parameters.

The SyncLink module 34 provides an intelligent communication channel to a remote management system's update server (not shown). As indicated above, the SyncLink module is part of the transaction processor 20. Although the storage firewall can operate as a stand alone storage unit and provide its security functionality without a SyncLink component, as will be discussed in detail below, a Firewall+ storage firewall without the SyncLink module 34 will not be integratable with a remote update server (not shown) in that it will not be able to obtain updates, such as changed and new application software.

The protected storage unit 14 is the memory that is being protected by the firewall 12 and may contain protected applications 40, protected files 42, and protected storage firewall management data 44. Applications are stored as files 42 and management data may also be stored as files. This is to say that the files 42 may include any digital information or object.

The double headed arrow d1 represents the data and request signal path between the host Interface 10 and the transaction processor component 20 in firewall 12. It is also used as a path into and through the host Interface 10 (and host computer's Internet connection) to poll a remote management system update server (not shown) for updates.

The double headed arrow d2 is the data path between the transaction processor component 20 and the encryption/decryption component of the firewall 12. Data moving on the path d2 has not been encrypted by the encryption/decryption component.

Double headed arrow d3 is the data path between the encryption/decryption component 24 and the protected storage 14. Data on the path d3 has been encrypted by the encryption/decryption component 24.

The arrow c4 is the control connection and data path between the authentication/authorization module 30 and the encryption/decryption component 24 and carries commands to encrypt and un-encrypt (clear) data to the encryption/decryption component 24. c4 also carries encrypted data back to the authentication/authorization module 30. In addition, c4 also carries commands to decrypt and encrypt data to the encryption/decryption component 24, and carries decrypted data back to the authentication/authorization module 30.

Arrow c5 is the control connection and data path between the access controller module 32 and the encryption/decryption component 24. c5 carries commands to encrypt and un-encrypt (clear) data to the encryption/decryption component 24, and carries encrypted data back to the access controller module 32. c5 also carries commands to decrypt and encrypt data to the encryption/decryption component 24, and carries decrypted data back to the access controller module 32.

The arrow c6 is the control connection and data path between the authentication/authorization module 30 and the application rights & credentials component 26. c6 carries user and application credentials and access parameters for authentication and authorization processing; and also carries authentication tokens that represent granted permissions for access requests.

c7 is the control connection and data path between the access controller module 32 and the application rights & credentials component 26 and carries access parameters and authentication tokens for authorization and access control processing. c7 also carries granted permissions for access requests.

Arrow c8 is the control connection and data path between the transaction processor component 20 and the working memory component 22. It carries a wide range of data in support of storage firewall processing.

c9 is the control connection and data path between the application rights & credentials component 26 and the working memory component 22. It carries data in support of authentication, authorization, access control, application and user rights and credentials processing.

Arrow c10 is the control connection and data path between the application rights & credentials component 26 and the encryption/decryption component 24. c10 carries commands to encrypt and un-encrypt (clear) data to the encryption/decryption component 24, and carries encrypted data back to the application rights & credentials component. c10 also carries commands to decrypt and encrypt data to the encryption/decryption component 24, and carries decrypted data back to the application rights & credentials component 26.

c11 is the control connection between the state engine module 28 and the encryption/decryption component 24 as well as control signals from the state engine module 28 to the protected storage 14 by passing them to the encryption/decryption component 24, which in turn passes them through to the protected storage 14.

Arrow c12 is the control connection and data path between the state engine module 28 and the authentication/authorization module 30.

Arrow c13 is the control connection and data path between the state engine module 28 and the access controller module 32.

And finally, arrow c14 is the control connection and data path between the state engine module 28 and SyncLink module 34.

The illustrated storage unit undergoes several phases of operation:

a). Quiescent Phase (Pre-Startup, Not Running)

When the device is in its Quiescent Phase, the protected storage is not reachable, i.e. it can not be written to, nor can it be read from.

b). Startup Phase

When the storage device starts running, it is in its Startup Phase. In the startup phase the device becomes ready to handle local transactions. But the storage firewall 12 will not grant access to the protected storage 14 until there are valid credentials received and stored by the application rights & credentials component 26. It is required that these valid credentials be successfully provided before storage access transactions can be granted.

c). Active Phase

The Active Phase begins when the storage firewall 12 begins to grant access to the protected storage 14. During the active phase, the storage firewall 12 requests updates from an update manager (not shown) if a secure connection can be established.

d). Shutdown Phase

The Shutdown Phase begins when the storage firewall 12 stops granting access to the protected storage 14, and performs cleanup operations such as deleting obsolete credentials from the application rights & credentials component 26. This phase is not necessary to the successful subsequent operation of the storage device. If the shutdown phase cleanup is not performed, then these actions might be performed on the next startup of the storage device.

Implementation

As pointed out above, the transaction processor component 20 has three subsystems. The implementation of the transaction processor component involves the integration of three subsystems; i.e., the state engine module 28, the authentication/authorization module 30, and the access controller module 32. As will be further described below, the SyncLink module 34 is also included for enabling communication with a remote server.

The state engine module 28 is the transactional portion of transaction processor 20, and is based on a software coded state table, an implementation of the storage firewall decision tree. To save space on the chip, the decision tree is encoded in a state table. The state table has an entry for every transaction conducted by the storage firewall unit.

There is also one or more no-op transactions provided as catch-alls for received transactions that do not match any of the supported transactions. This no-op transaction ability is an important security measure, responding to attempts to map the transaction set provided by the specific storage firewall being attacked. The no-ops in the storage firewall's transaction processor component's state engine module may or may not provide deliberately erroneous results (obfuscation) to the attacker, or may ignore the request; this ambiguity is part of the defense mechanism.

If the chip is implemented as an FPGA (Field Programmable Gate Array) or other field-changeable chip or chip portion, it may be possible to upgrade or replace the state table in an operational storage firewall's transaction processor component's state engine module. This is useful to add transactions, or to improve or change the behavior of existing transactions. It can also be a security vulnerability, if an attacker is able to change transaction behavior. This implementation is preferred in some consumer products, to reduce product support costs. In addition, upgrading the state table permits completely new functionality to be added to the storage firewall, as well as permitting existing functionality to be removed. If new states (and the corresponding operations) are added to the state table, then additional corresponding executable software may also be added, or the new states may activate pre-deployed executable software, or may apply existing executable software in a new way. Executable "software" may be hardwired into the chip used for the storage firewall implementation, or may be pre-deployed in some other way, or may be provisioned (deployed) from (by) the update and configuration server. If a state table operation can not be performed as a result of the absence of the corresponding executable software, the resulting action shall be as if the state engine directed the processor to a no-op transaction.

If the chip is an ASIC (Application-Specific Integrated Circuit) or other non-field-changeable chip or chip portion, then it is not possible to upgrade or replace the state table in the field. This implementation is preferred in a highly secure product or installation, such as a military application.

The state engine module uses the authentication/authorization module to evaluate (verify and validate) input application-signatures, user input credentials, and other authentication and authorization inputs. If an authentication token is generated as part of the initiation request transaction processing, it is provided to the application through the host interface.

The state engine module 28 uses the access controller module 32 to evaluate (verify and validate) input authentication tokens. Inputs to the state engine module are provided by the host interface 10. These inputs are part of transaction requests. If the inputs are valid, and the internal state permits, the requests are granted.

For granted (authorized) read transactions, the state engine module directs the encryption/decryption component 24 and the protected storage component 14 to provide and decrypt the requested data. The data is provided to the application through the host interface.

For granted (authorized) write transactions, the state engine module directs the encryption/decryption component and the protected storage component to accept and encrypt the provided data. The data is provided to the storage firewall from the host interface.

User authentication and application authentication are implemented differently. As used herein, the term authentication refers to both authentication and authorization.

The authentication/authorization module 30 is controlled by the state engine module 28. Identification credentials of the current user are used to authenticate this user. The provided user credentials are validated by the authentication/authorization module. The implementation is to use the application rights & credentials component 26 and the encryption/decryption component to compare the provided user credentials against those stored previously.

Access to the protected storage 14 is granted only if the provided user credentials are successfully validated. The result determines whether the current user will be permitted to access the protected storage. The application rights & credentials component 26 indicates whether or not the provided user credentials are validated.

The authentication/authorization module 30 uses the application rights & credentials component 26 to keep track of whether valid user credentials have been provided by the user since the storage firewall started running. A fresh user authentication must take place each time the storage firewall starts running.

The authentication/authorization module also uses the application rights & credentials to store, process, and retrieve the user's authorization rights. When an application wants to access the protected storage, it must request initiation of a storage firewall transaction session. The application provides an application-signature with the initiation request.

The authentication/authorization module 30 uses the application rights & credentials component 26 and the encryption/decryption component 24 to attempt to validate the application-signature. If the application-signature is valid, and the current user credentials are valid, then the application rights & credentials component is used to generate an authentication token. The authentication/authorization module provides the authentication token to the state engine module 28.

The access controller module 32 is controlled by the state engine module 28. Each access request by an application must have a valid authentication token (other than the initiation transaction). The access controller uses the authentication token provided by the application to evaluate whether to permit the current transaction request.

The access controller module 32 uses the application rights & credentials component 26 to validate the authentication token, and to retrieve the application's rights. For a valid authentication token, the application rights govern whether to approve the request.

The SyncLink module 34 is controlled by the state engine 28. Periodically, the state engine uses the SyncLink module to poll the update server (not shown) of a remote management system (not shown) for updates. When an update is received, the SyncLink module opens up the retrieved update package, and provides the contents of the update package to the state engine for processing. In the illustrated embodiment the working memory component 22 is implemented as solid state memory, some combination of RAM and/or Flash memory, or some other solid state memory. The encryption/decryption component 24 is implemented using the encryption algorithm AES (Advanced Encryption Standard); a US government encryption standard, which is a version of the Rijndael block cipher. It is documented by the US National Institute of Standards and Technology (NIST) as U.S. FIPS PUB 197. The encryption/decryption component provides encryption and decryption operations that can be used by other storage firewall components and modules. It also encrypts and decrypts data as it moves into and out of the protected storage component.

The application rights & credentials component 26 is implemented as a set of data structures and operations that act on these data structures. It uses the working memory component 22 to store the data structures. The data structures include an application rights table, a credentials table, and user registration data (which are further described below). The Application Rights & Credentials component 26 provides operations that validate provided values against stored values.

When validating user registration data, the validation method for the user id is to compare the provided user id against the stored user id, byte for byte. The validation method for the password is to create an encrypted hash of the provided password, then to compare this against the stored password, byte for byte.

When validating an application-signature, the validation method is to create an encrypted hash of the provided application-signature, then to verify that this matches the corresponding value stored in the application rights table for the application that submitted it with the current initiation request.

When validating an authentication token, the validation method is to create an encrypted hash of the provided authentication token, then to use this encrypted hash to verify that the provided authentication token is current, refers to an active entry in the credentials table, and was assigned to the application that submitted it with the current request.

In this embodiment the protected storage component 14 is implemented as NAND flash chips.

Explanation of Operations

Major transactions are described below in relation to the functional diagram. These transactions are:

Initiation;
Open file for read; and
Request and receive update for application.

All transactions come to the transaction processor component 20 via the host Interface 10, and all transaction results are returned (sent back) through the host Interface. The portion of the transaction processor component 20 that actually handles all transactions is the state engine module 28. This module provides all transaction command and control, using other storage firewall elements as needed.

Transaction: Initiation

The application sends an initiation request transaction to the storage firewall through the host Interface 10 to the transaction processor component 20, or in actuality, to the state engine module 28. The state engine uses the authentication/authorization module 30 to validate the transaction parameter application-signature, and to provide an authentication token.

The authentication/authorization module 30 uses the application rights & credentials component 26 to validate the application-signature against values stored in the application rights table, to verify that the current user is properly logged in to the storage firewall, to add an entry into the credentials table, and to generate the authentication token.

The application rights & credentials component 26 uses the encryption/decryption component 24 to hash and encrypt the authentication token, to store a hashed & encrypted copy in the appropriate entry of the credentials table.

Transaction: File_Open_Read

In this transaction, the application sends an open file for read (File_Open_Read) request to the storage firewall which passes through the host Interface 10 to the transaction processor, or in actuality, to the state engine module 28. The state engine uses the access controller module 32 to validate the authentication token, and to provide the application rights. The access controller module 32 uses the application rights & credentials component 26 to validate the authentication token, and to provide the application rights.

The application rights & credentials component 26 uses the encryption/decryption component 24 to hash and encrypt the input authentication token, for comparison against a copy stored in the appropriate entry of the credentials table.

If the application is authorized to open that file, then the state engine module 28 adds an entry to the File Table, and generates a file reference.

If the file has to be created, then the state engine module creates the file through the encryption/decryption component 24. The state engine module then returns the file reference to the application through the host Interface 10.

Transaction: Request and Receive Update for Application

As previously indicated, the State Engine 28 uses the SyncLink module 34 to poll a remote management system's update server for updates by sending an update poll request packet to the remote update server. In response, the update server sends an update package to the local host computer.

The state engine module 28 uses the encryption/decryption component 24 to validate the retrieved update package by cryptographic means. The state engine uses the SyncLink module to open the retrieved update package, and provide the contents of the update package to the state engine module for processing.

The package may, for example, contain a software application and associated application rights and credentials data; if so, then the state engine uses the encryption/decryption component to encrypt the application and install it into the protected storage 14, and the state engine uses the authentication/authorization module, which uses the application rights & credentials component 26, to install the associated application rights and credentials data into the corresponding data structures.

Figure 2:
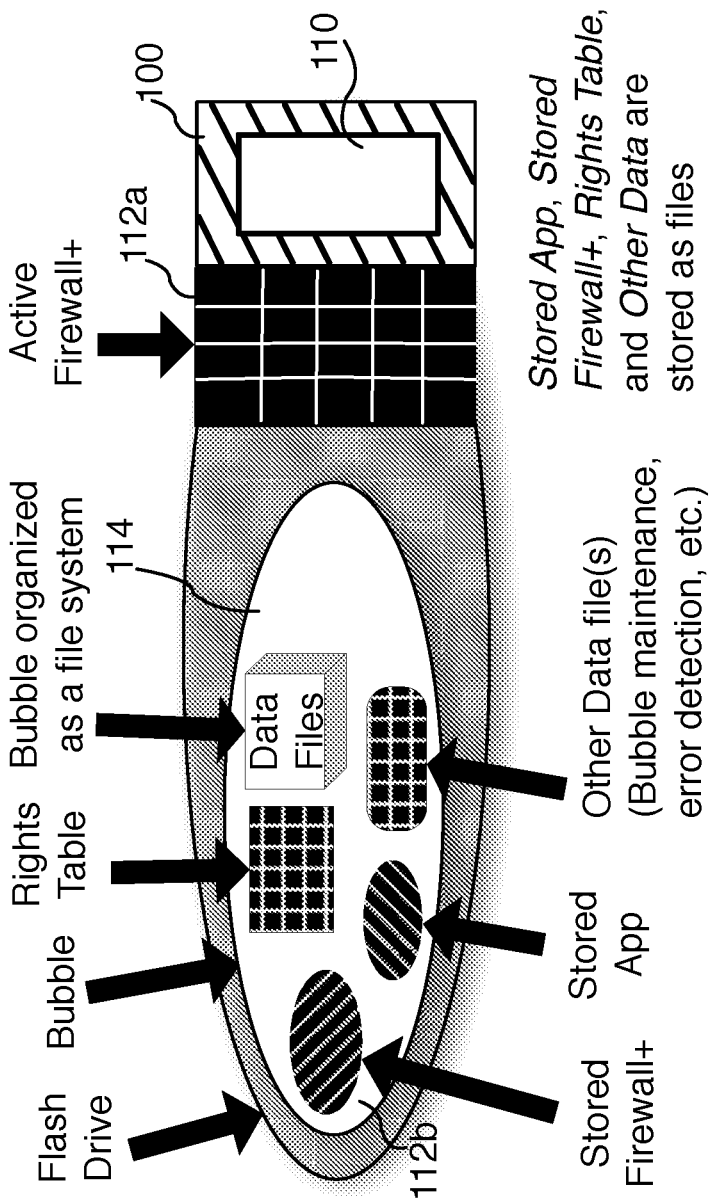
FIG. 2 is a diagram schematically illustrating an exemplary embodiment of a storage device implemented in a USB flash drive in accordance with the present invention.

FIG. 2 is an artistic or conceptual diagram schematically illustrating at 100 an exemplary embodiment of a storage device implemented in a USB flash drive in accordance with the present invention. In this diagram a host interface is shown at 110. The host interface 110 is a USB controller. USB controller chips and designs are commercially available from manufacturers such as Cypress, Anchorchips, Scanlogic, and Intel.

The active Firewall+ Storage Firewall is shown at 112a, and the storage component is shown as a Bubble at 114. If the implementation of the Firewall+ is in "software" such that the Firewall+ Storage Firewall executable is stored within the Bubble (as shown at 112b), the Firewall+ execution may be as a process executed on the host computer, rather than in the USB flash drive.

In most cases, Bubble contents will be organized in a Bubble-internal file system. This includes error detecting data, error correcting data, application rights table, Bubble maintenance data, and self-referential hash values. All of these are referred to as error correcting data. Since even the Bubble's own maintenance data is stored in a Bubble-internal file, the Bubble access operations are easier to implement, maintain, and test.

On the other hand, if the Firewall+ Storage Firewall is implemented on a chip (a "hardware" implementation) in the USB flash drive, then the "Stored Firewall+" 112b may not be present inside the Bubble.

Other possible implementations may put the Firewall+ on other hardware, such as the host computer's main board or storage controller. In these implementations, the Firewall+ may be conceptually portrayed as part of the host computer rather than a part of the USB flash drive.

Also, the same design may be used for storage devices and media other than USB flash drives.

As will be understood from the above more generalized description, the storage firewall unit has several inter-operating parts. The focus of this discussion is on aspects of the design that permit construction (implementation) of various embodiments. As previously suggested, there will be multiple different implementations and embodiments of this design to suit various applications Moreover, there will be permutations required by the architectures of the products and technology (hardware and systems) being augmented by the Firewall+ functionality, and by the market requirements of the resulting improved products. However, these embodiments will all share the design philosophies, elements, and the architecture described herein.

This description will include various components and elements of the embodiments, both inside the Bubble and in the Firewall+ storage firewall, then describe the Firewall+ storage firewall in action. It is to be understood however that all transactions will not be covered since the focus is on those transactions that demonstrate the design of the present invention.

The authentication and authorization architecture will also be discussed since authentication, authorization, and access control (AAA) are key elements to any security-enabled system; Firewall+ is no exception. There will no doubt be some repetition of material covered earlier, but in general, this section goes into greater depth, focusing on the default algorithms. It will be appreciated that the AAA module can be replaced by a third party solution (and may well be for some implementations), but the default methods should be adequate for most purposes.

An overview of the principle transactions will also be discussed as implemented in a "state table"—the design does not require that every implementation use a state table for its transaction decision tree, but the documented state table is useful as a summary of important transactions. As in the above, not all transactions are covered in this table.

In most cases, Bubble contents will be organized in a Bubble-internal file system. This includes error detecting data, error correcting data, application rights table, Bubble maintenance data, and self-referential hash values. All of these are referred to as error correcting data. Since even the Bubble's own maintenance data is stored in a Bubble-internal file, the Bubble access operations are easier to implement, maintain, and test.

The following terms will be used in this discussion. If a term is used that is missing from this "glossary", it is expected to have the meaning assigned elsewhere herein, or if not specifically defined herein, it should be considered to have the meaning provided by a standard published authoritative technical dictionary.

Glossary

| | |
|---|---|
| Access control authorization | The authentication token is provided back to the Firewall+ Storage Firewall with every subsequent access request. The authentication token is cryptographically validated on every use, and then used to validate access permissions for the requesting application. |

-continued

| Glossary | |
|---|---|
| Actor | a term which has become common in the IT industry for an entity that acts upon other entities. An actor can be a person, a software executable, a hardware device, et alia.<br>From Wikipedia, the free encyclopedia, June 2010: "In computer science, the Actor model is a mathematical model of concurrent computation that treats "actors" as the universal primitives of concurrent digital computation: in response to a message that it receives, an actor can make local decisions, create more actors, send more messages, and determine how to respond to the next message received. The Actor model originated in 1973." |
| Authentication | Part of the Initiation transaction: when an application starts to run, it must first prove it is the corresponding application, among those in the Rights table, thereby proving that it has rights to access the Bubble. This proof is provided by a cryptographic operation involving the application-supplied application-signature. |
| Authorization | Part of the Initiation transaction: when an application starts to run, the rights are examined, a credentials entry is made, and an authentication token is generated. The authentication token links to the entry in the credentials table, which provides a link back to the rights table. |
| Application | Application software that intends to access a "Bubble". This might be non-application software such as host system software. Usually used as a synonym for software executable. An application can also be thought of as an instance of executable software. |
| Blacklist | a term which has become common in the IT industry for a list of software executables or some other actors that are specifically not authorized to do something. Often used to refer to a list of software executables believed to be malicious software, malware. The opposite of a whitelist. The prior art includes many anti-virus software tools that rely on a blacklist of virus signatures. |
| Bubble | Protected storage. This might be a single partition, a set of volumes, or any other defined storage area. |
| Event | A message that links to a trigger, elicited by an internal or external situation or condition. State changes are usually caused by events. The event can 'trigger' a reaction response by the storage firewall. (More in Trigger) |
| Firewall+ | The Firewall+ Storage Firewall executable and process. In some cases this is referred to as the F+ int or Firewall+ int (int for internal) because in some implementations the executable will be stored within the Bubble when not active. But other implementations of the Firewall+ will be on an ASIC, or FPGA, not stored within the Bubble. The Firewall+ term may also sometimes be used to refer to the entire Firewall+ architecture. |
| Firewall+ Startup-Diagnostics (FSD) | In some implementations, the FSD executable will be executed before the Firewall+ storage firewall executable is activated; it verifies the health of the Bubble and Firewall+ executable, repairing damage, or attempting to repair damage, if found. In some cases this is referred to as the F+ ext or Firewall+ ext (ext for external) because its executable is never found within the Bubble. The FSD executable can also be used to perform its health and malware scan at other times than when starting up the storage firewall. In some implementations the FSD components will be designed into HDD controller components or SSD controller components. |
| Initiation | Handshake transaction when an application starts running, informing the Firewall+ that the application will start sending access requests. |
| Registration | Firewall+ operation that adds applications to the Rights table; part of provisioning |
| Rights table | Persistent data structure that contains application rights and credentials for registered applications. In some cases this is referred to as the registration table or registry. |
| Trigger | A term used to indicate that a state transition is being caused by stimuli, often a stimuli external to the storage firewall. Events link to triggers.<br>A situation or condition has elicited from a component of the storage firewall the generation of an event; the event message is sent from one storage firewall component to another, causing a state change, and possibly causing the storage firewall to act on an external entity, where this |

| | Glossary |
|---|---|
| | action can be the generation of a 'warning' message to the support server, and/or the activation of a locally present executable. |
| Whitelist | A term which has become common in the IT industry for a list of software executables or some other actors that are authorized to do something. The storage firewall list of authorized executables can be thought of a type of whitelist. The opposite of a blacklist. The whitelist concept can be thought of in this way: if the of names of the people invited to a party are on a list, then that list is a whitelist. |

Application Rights Table (Aka Rights Table, Registration Table)

Figure 3:
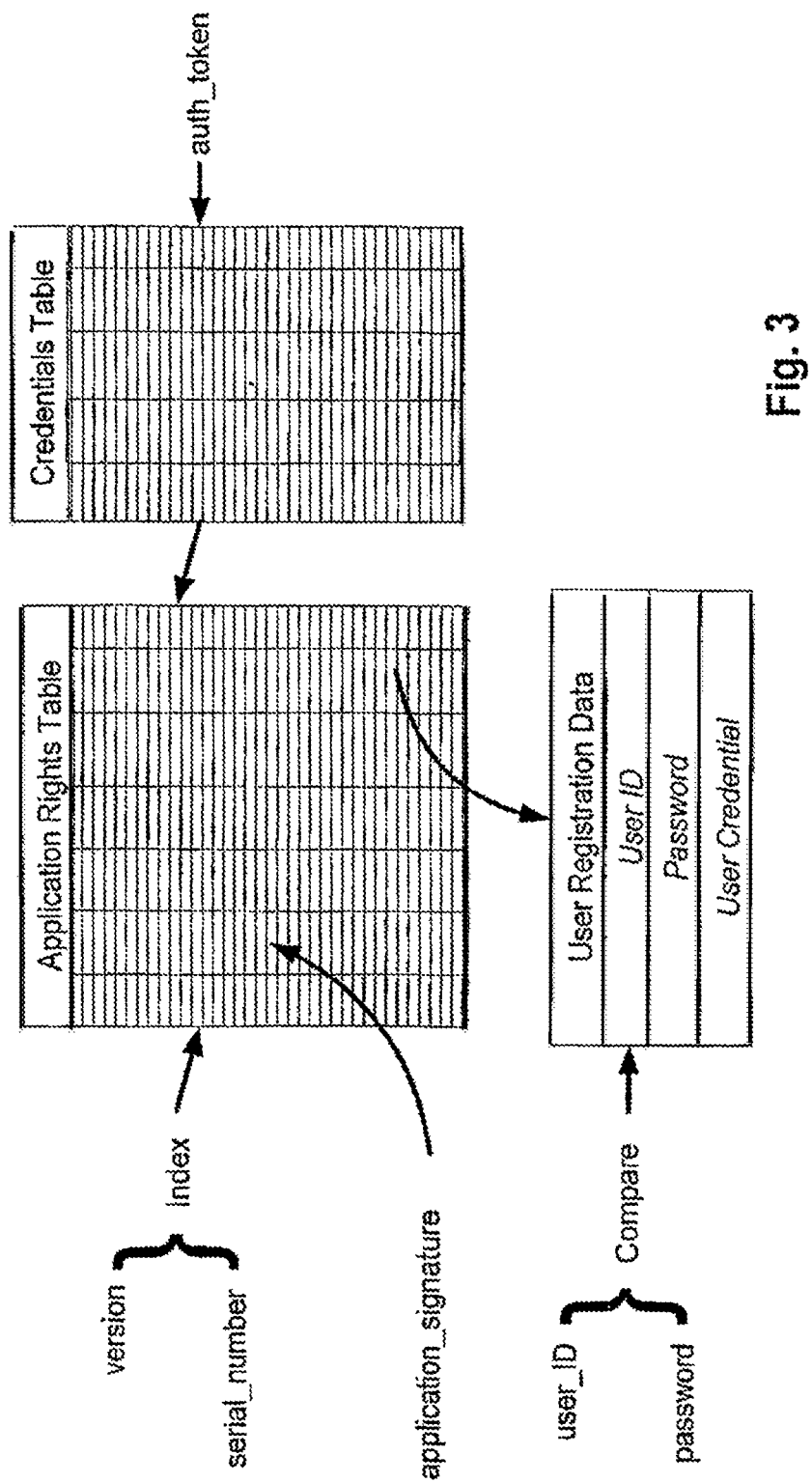
FIG. 3 is a diagram illustrating Authentication Data Structures in accordance with the present invention.

An application rights table is illustrated in FIG. 3 and is used to register deployed applications when provisioned (deployed or installed) to the Firewall+ storage firewall protected storage or device. If there are no applications within the Bubble, the application rights table does not have to exist—it is created when the first application is provisioned. It does not have to be destroyed when (or if) all applications are deleted from the Bubble.

In general, the application rights table keeps track of the presence of provisioned application software and the rights software applications have to access the Bubble. Software does not have to be installed within a Bubble to have rights to access that Bubble, but generally installation within a Bubble confers associated access rights. When an application is installed within a Bubble, or a software executable has been deployed as part of the storage firewall itself, the information in the rights table includes execution-related controls an attributes such as scheduling, execute permissions, required user or role authorizations, etc., as well as storage access permissions.

The application rights table is a key data structure. It will grow as applications are added to the Bubble. It can be indexed by the application identity (a hash of the application's version and serial_number) as well as by a generated authentication token (described below).

Key elements of the application rights table include data fields for:

version—version of the currently provisioned application, used for several purposes such as optional replacement if application is damaged or lost, as well as update and patch. May be linked to a general update behavior, on the update server.

serial_number—string identifying the currently provisioned application, generally keyed to a specific license stored on the update sever. It is used for several purposes such as replacement if application is damaged or lost, as well as update and patch.

authentication—flag if this application is permitted Bubble access, plus other data used in the application authentication operation authorization—optional Bubble access permissions, other optional authorization data The concatenation of version and serial_number is guaranteed to be a unique value across all possible supported applications. A hash of the version and serial_number may be used as an index to the Rights table.

Directory Structure

The Bubble has its own file system—independent of the file system of the host computer. A POSIX compliant approach may be used in this file system. It has a hierarchical structure, not very different from the Unix directory structure, using files to store directory information, and representing files by file names, linked to file inodes. The inodes can then be used as unique file (and directory) identifiers in the File Table.

Minimal Bubble

The minimal contents of the Bubble is a Bubble empty of any application data, but with error correcting data in one or more files. The minimal Bubble will contain an empty Rights table.

The error correcting data can be used to verify the health of the Firewall+ storage firewall executable. It can also be used to validate the empty state, when the Firewall+ storage firewall responds to a query that would otherwise return Bubble contents or Bubble state.

Bubble with Data Files Only

The Bubble either has contents or does not have contents. If it has contents, the simplest case is externally referenced data plus the contents of the minimal Bubble. The externally referenced data is organized as one or more files in the Bubble-internal file system. There is error-correcting data kept, in separate storage, for each data file.

To create a Bubble-internal file, the external software (typically a software application) sends a file creation access request to the Firewall+ storage firewall.

This request provides an externally referenced file name. This name maps to a Bubble-internal file reference, such that later access queries will map to the correct file. The Bubble-internal file reference is very similar to a Unix-style inode.

With One or More Applications and Associated Data

When applications are kept within the Bubble, they are stored and treated like data files, in the manner described above.

The method employed by the user to start executing a Bubble-resident application depends on the implementation of the Firewall+ storage firewall, on its context of use.

In a 'preferred embodiment', after the Firewall+ storage firewall finishes its startup operation, it will kick off a default application, an application-browser.

This will permit the user to select an application from a list or menu.

In this embodiment, the application-browser will always be present in every Bubble, so they would never be completely empty. This has implications for the Rights table, etc.

Firewall+ Storage Firewall Data Structures

File Table (for Open Files)

The File Table is not a permanent structure—it is transient, created and expanded as needed.

The Firewall+ uses the File table to keep track of which files applications have open. There may be all of the expected file operations; e.g. files can be created, opened for reading or writing, closed, deleted, etc. The File Table can be cached within the Bubble or kept in transient memory (RAM), or some combination of these.

The File Table is indexed by a file reference value, or a value derived from the file reference value. (In some cases, the file reference value may be referred to as a file pointer or fp.) The file reference is passed to the application when a file is successfully opened, and is passed from the application to the Firewall+ storage firewall with every successive file operation on that open file, until it is closed.

An application may have more than one file open. For each open file there is a different file reference value.

In some other file systems it is possible for more than one application to have write access to the same file, but in this design only one application may have write access to a file at a time. Multiple applications may have simultaneous read access to a file. The way the File Table keeps track is discussed below.

The File Table keeps track of which application(s) currently have authorization (permission) to access a file, a subset of the applications that currently have permission to access the Bubble.

The File Table also keeps track of which applications have opened a file for access. Because multiple applications may have read access to a file, plus another application may have write access, it is necessary for the File Table to have an expandable structure to store references to these applications.

The authentication token is described below, but a brief mention of how the authentication token relates to the File Table is useful. Each application that is granted access to the Bubble has a unique auth_token. This authentication token is used for several purposes related to access control, but it can also be used to refer back to the corresponding application. The File Table's mechanism for tracking which applications have active file references to a file uses the applications' authentication tokens (auth_tokens) as reverse references to the applications. In case there is a need to look up application access privileges or other attributes, the tracked authentication token can be used.

There is a limit to the number of files that can be open at any one time: If the Bubble is full, and Firewall+ storage firewall's working memory is full, then additional files can not be opened, because there is no space to expand the File Table. One workaround is to reserve a portion of the Bubble for File Table expansion, but this does not eliminate the issue—there is still a limit to the number of files that can be opened at any one time. This limit depends on several variable factors, so it is not a hard number. Of course, if the Bubble were full, there would be no place to put a newly created file, so File Table expansion would be irrelevant in that case.

Authentication Token

The authentication token is provided to applications when they open contact with the Firewall+ storage firewall (the Initiation transaction)—IFF they are authenticated and authorized for Bubble access. The authentication token is used to index the Credentials table to verify application rights (privileges) for an operation such as opening a file. As such it is passed to the Firewall+ storage firewall with every application file access transaction.

For the detail minded, the authentication token, auth_token, is a hash of validating data and an index to the appropriate entry in the Credentials table.

Credentials Table

The Credentials table also shown in FIG. 3 is transient, created as needed by the Firewall+ storage firewall, generally as part of the reaction to an initiation transaction request.

The Credentials table stores a version of application authentication, authorization, and access credentials and rights. It is indexed by the authentication token. It contains an index into the Rights table for the corresponding application.

The Firewall+ Storage Firewall in Action

This portion of the disclosure is organized by transaction types, where for each there is roughly the same organization of information. The transaction types covered are:

Deployment (provisioning) and registration of the application into the Rights table.

Firewall+ startup, a sort of self-transaction, which might also kick start an application.

Firewall+ initiation (handshake) transaction when the application starts running.

Application access, with a focus on read/write requests.

For each of these, there are generally four parts:

Request/response protocol, even though the application shouldn't see most of these, as they'll be hidden within the ABI;

Possible code changes to the application;

Changes to the Rights table; and

Other components used and/or changed, if any.

Overview of Application to Storage Firewall Interaction

This is an overview of the interaction between applications and the Firewall+ storage firewall, using as an example a sample set of transactions that include opening a Bubble-protected file for reading, and making a read request from that file. It provides context for the following sections.

Figure 4:
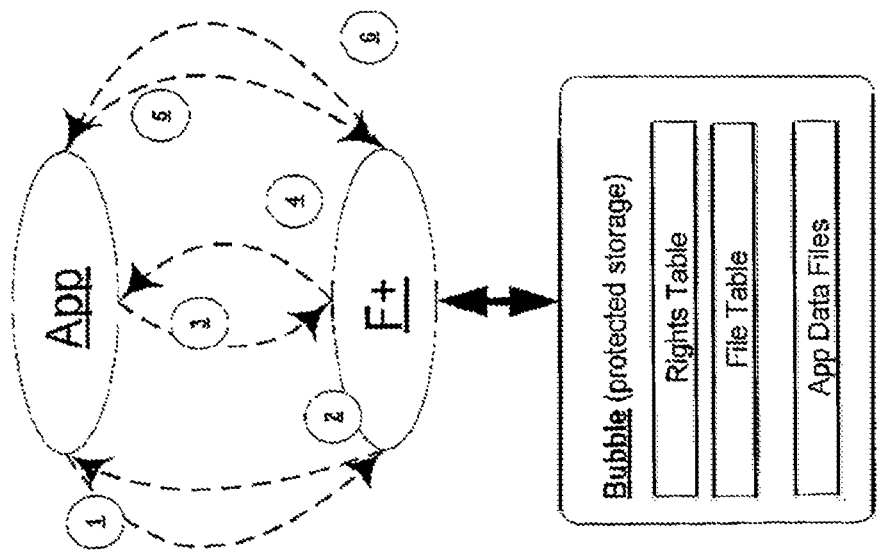
FIG. 4 is a diagram illustrating interaction between the Firewall+ Storage Firewall and an Application stored in Protected Storage in accordance with the present invention.

With reference to FIG. 4 note that: the Firewall+ API initiation request is in the application's startup code, the application is linked to the Firewall+ ABI, and the application is registered in the Firewall+ Rights table.

Steps in the file access interaction. Each pair of steps (such as steps 3 & 4) is a complete request/response transaction.

1. App starts to run, and initiates contact with the Firewall+ storage firewall.

2. Firewall+ authenticates the App, and provides authorization credential (auth_token), which the Firewall+ ABI keeps track of 3. The App sends 'open for read' file access request to F+, where the authentication token is added to the file open request by the F+ ABI.

4. Firewall+ optionally logs the access request, then verifies the App's auth_token, opens the file for read, then returns a file reference—an index into the File Table.

5. The App sends a read access request to Firewall+, where the authentication token is added to the file read request by the Firewall+ ABI, and the file pointer (fp) is a Firewall+ file reference, an index into the File Table.

6. Firewall+ optionally logs the access request, then verifies the App's auth_token, reads requested data from file, updates entry in the File Table indicating current position in the file, then returns the requested data to the App.

The Firewall+ ABI

The Firewall+ ABI hides the transaction details from the application. Application software that has been modified to work with the Firewall+ storage firewall will have been linked against the Firewall+ ABI, and have a small addition to its startup routine.

The Firewall+ ABI replaces the file operation library that the application was previously linked to. The Firewall+ ABI provides a file access operations set that has the same semantics and syntax, but that knows how to negotiate access with the Firewall+ storage firewall. There is an include (header) file set that matches the Firewall+ ABI.

The purpose of the Firewall+ ABI software is to provide file access operations, plus to negotiate with the Firewall+ storage firewall. This includes initiating interaction with one or more currently running Firewall+ storage firewalls, and authenticating the right of this application to access the protected storage; this is provided by the Firewall+ initiation transaction. The Firewall+ initiation transaction is performed by a function call, added to the application's startup code.

It is possible that more than one Firewall+ storage firewall may be running at the same time, and it is possible that an application may be separately authenticated to access multiple of the protected storage areas.

There will be a unique authentication token (referred to as auth_token) provided for each application—to—Firewall+ execution instance, passed to the application by a successful Firewall+ initiation transaction. The authentication token must be passed back to the Firewall+ storage firewall for every subsequent file access transaction. The Firewall+ ABI adds the authentication token to the file access requests on behalf of the application.

Application Provisioning (Deployment, Registration into the Rights table)

A relevant transaction occurs when an application is provisioned to the protected storage.

Before dealing with this transaction, the definitions of several terms will be resolved: provisioning, deployment, and registration. In particular, there may be some confusion over the difference between provisioning and deployment. In the Firewall+ architecture, these terms may include the following meanings:

Provisioning provides the functionality, whereas

Deployment delivers and installs the mechanism (such as the application software).

In the Firewall+ design, the successful installation of application software to a Firewall+ Bubble has these steps:

Deployment of the application software; and

Registration of the application into the Rights table.

From the perspective of the local Firewall+ storage firewall, the deployment and registration steps constitute the provisioning transaction. To repeat, provisioning requires deployment then registration.

The SyncLink description (provided elsewhere) provides an overview of the normal provisioning process. In brief:

1. The Firewall+ storage firewall requests an update from the update server,

2. The update contains instructions, including that the Firewall+ should request an application, 3. The Firewall+ requests & receives the application package, 4. The Firewall+ installs the application package, 5. The Firewall+ registers the application software.

To repeat, provisioning the functionality provided by the application software requires deployment of the software, followed by registration into the application Rights table.

When new application software is deployed, the Firewall+ receives verification and authentication data with the downloaded package. This data is used to authenticate the received package. This is in addition to the authentication done during the SyncLink operation to authenticate each of the endpoints, the Firewall+ and update server, to each other. In addition, the package verification and authentication data is used to verify that the package has not been damaged or modified since leaving the update server. If the package can be successfully authenticated and verified, it may be deployed.

Software registration is part of the provisioning transaction. Registration modifies the application Rights table. Registration is done after the Firewall+ storage firewall update manager verifies the installation. Following the instructions in the package, after deployment the Firewall+ adds into the rights table the application runtime authentication information (application-signature) provided inside the downloaded package.

Either at this same time, or at some previous time, the same application-signature is (or was) provided to the application, so at runtime it will be able to authenticate itself to the Firewall+. In addition, the particular application-signature may have a different nature for different applications. The result of this flexibility is that some applications may be provisioned on a wide scale with common application-signatures, others are provided with unique application-signatures before being packaged for deployment, while others are provided with application-signatures generated locally by the Firewall+ storage firewall. [This and other mass-customization of the applications can be done on a wide scale, with the complexity handled by the intelligence governing the update server.]

The intent of the ability to apply different authentication schemes (or permutations of the basic authentication scheme) to different software applications is:

to support contractual obligations to software authors, and to support user customization (at the user portal web site).

There are multiple types of application provisioning, with some differences in how the Firewall+ conducts the local transaction. The two most common are:

New software to be installed into the Bubble, and

Replacement of software currently installed in the Bubble.

A related transaction is the removal of currently installed application software. This is not part of the provisioning transaction, but is mentioned here for completeness. When new application software is deployed to a Bubble, it is not available for use until it has been registered. At that point, a final step is required before it is provisioned for use. This final step is generally done during the registration process, but may be done separately, later. This step is to set the active flag in the appropriate entry in the Rights table.

The active flag can have several states, including fresh, active, inactive, and purge.

Newly deployed software is generally fresh before becoming active. When replaced, software generally becomes inactive as the replacement becomes active. The purge state indicates the software is about to be (or due to be) removed (deleted) from the Bubble and the Rights table. Therefore, it is possible for there to be as many as four extant versions of the same software model in the Bubble, but it is unlikely that there would be more than three. At no time will more than one version be flagged as active. In addition, only an active version of the software can be successfully authenticated to the Firewall+ storage firewall.

Firewall+ Startup

This section discloses the process whereby the Firewall+ Startup and Diagnostics (FSD) program transfers control to the Firewall+ storage firewall. In a software implementation, before the Firewall+ storage firewall starts running, the FSD program runs. This is also discussed elsewhere as part of the Firewall+ startup mechanism. This section provides an overview of the transfer of control from the FSD to the Firewall+ storage firewall.

The process by which the user authenticates himself (herself) to the FSD is covered in the authentication, authorization, and access control (AAA) section of this disclosure.

It is a relevant topic because clearly the user has to authenticate at some point before the Firewall+ starts accepting application requests, and it does not happen during or after the FSD transfers control to the Firewall+ storage firewall.

The Firewall+ storage firewall can be implemented in several different ways. Chief among these is (1) as a software application with driver level hooks into the host operating system, and (2) as firmware within a storage controller. The transfer of control to the Firewall+ storage firewall is actually similar for both of these, but there are some differences, so a first option is discussed, then the differences with a second option are provided. Other options for implementation of the Firewall+ storage firewall have similar startup methods.

When the Firewall+ storage firewall is implemented as a software application with driver level hooks into the host operating system, the default startup process is:

The FSD does its startup and diagnostics actions, including examination of the Firewall+ storage firewall executable for evidence of damage or tampering. (This means that the FSD must have a way of opening the Bubble, since the Firewall+ storage firewall executable is within the Bubble.)

After validation, verification, and any repair, the FSD starts the Firewall+ executable. The actual transfer of control is done by sending the Firewall+a Control transaction, then getting a success' response that matches a sanity value expected from this deployment of the Firewall+ storage firewall.

However, before transferring control (i.e. before the Control transaction), the FSD sends the Firewall+ an authentication and health (Health) transaction. If the response is not one of Health, the Firewall+ executable is terminated and the backup Firewall+ executable is started.

Then the Health transaction is re-attempted. If it succeeds, the Control transaction is used, then the parent process (the FSD) can exit.

If the Health transaction to the backup Firewall+ executable fails, the FSD kills the Firewall+ executable, then attempts to repair first the primary, then the backup Firewall+ storage firewall executable, using error correction data stored in the Bubble. If the repair succeeds, the Firewall+ can be started, followed by the Health transaction.

If neither of the executables can be repaired, the FSD will inform the update server to obtain a fresh Firewall+ executable. If the attempt to replace the Firewall+ executable fails (perhaps because there is no current SyncLink to the update server), then the FSD exits with an error message to the user; the Firewall+ can not be used at this time.

This default behavior can be modified by either a system implementer or by configuration changes. These modifications can be made to a single Firewall+ or to some defined set of Firewall+ protected devices.

When the Firewall+ storage firewall is implemented as firmware within a storage controller, there is similar startup behavior, but with some differences.

One major difference is due to the assumption that firmware in the controller is less likely to become damaged by malware or other system problems, so is less likely to need to be repaired or replaced by the FSD. As a result, there will not be a backup for the firmware Firewall+. It also may be more difficult or even impossible for the FSD to download and replace an 'unhealthy' firmware Firewall+. For example, if the Firewall+ firmware is part of an ASIC, this is not field re-programmable. On the other hand, an FPGA may be field re-programmable.

Firewall+ Initiation (Handshake)

This operation initiates communication with one or more currently running Firewall+ storage firewalls. There will be different implementations on different platforms, but essentially this sets up an inter-process communication channel, according to the mechanism used on that host computer's operating system.

When an application sends an initiation (handshake) request to the Firewall+ storage firewall, the values stored in the application rights table (Rights table) determine whether that application will be permitted to access the protected storage (Bubble).

The initiation transaction request should be added to the application's startup code. If we assume the application is written in C or C++, and the inclusion of the header file Firewall+.h, the initiation transaction request would look something like this: F+_initiate(application_signature, &auth_token);

where F+_initiate( ) is a function provided by the F+ API, and the application signature is a set of cryptographic information that identifies and verifies the identity of the application executable. The application signature was provided to the application at some previous time, perhaps by linking it in before it was provisioned. Other information on the application signature and authentication token can be found in the section on authentication.

Request/response protocol, even though the application should not see most of these, as they will be hidden within the ABI There are no changes to the Rights table from this transaction, but this authentication request may be logged.

Application File Access

Open/Read

From the perspective of the typical application, the Firewall+ file-open and file-read transactions should seem to have the same syntax and semantics as the standard operations. The Firewall+ ABI handles the access control issues, adding the authentication token to each transaction.

There are no code changes to the application for read access to a Bubble-protected file, other than for the Firewall+ initiation.

Open/Write

From the perspective of the typical application, the Firewall+ file-open and file-write transactions have similar syntax, but there is a significant difference in the behavior: there can be only one application that has a given file open for write at any time. Some operating systems permit multiple applications to have the same file open for write; the Firewall+ storage firewall does not permit this.

The restriction against multiple writers can be eliminated by providing the same sort of inter-process communication (IPC) mechanisms and/or file locking as many operating systems. These were avoided to simplify the Firewall+, as well as to reduce its footprint (size), so it can fit into smaller devices, perhaps as part of an ASIC. This restriction is not likely to have much affect on most of the applications that will be encountered.

The Firewall+ ABI handles the access control issues, adding the authentication token to each transaction.

For many applications, there need not be code changes for write access to a Bubble-protected file, other than for the Firewall+ initiation. Of course, in practice, this depends on the application software design, etc.

Extensibility

Both the SyncLink and Firewall+ transaction models have been designed for maximum extensibility. This is an important quality of the Firewall+ architecture, no matter what implementation choices are made. Some of the extensibility options are:

Transactions can be added,

Scripts can be sent to the Firewall+ storage firewall for local execution,

Hidden application software can be selectively deployed, and

Firewall+ storage firewalls can be replaced by later versions.

Augmenting the System by Adding New Transactions

An implementer can add a new transaction or transaction type very easily. An existing system of deployed & provisioned Firewall+ enabled devices can also be augmented, by adding the desired transaction infrastructure, then replacing the Firewall+ storage firewalls in the field through the update mechanism.

Firewall+ Command Execution: Scripts

The update server may send to the local Firewall+ storage firewall arbitrary scripts to execute. The Firewall+ has the ability to execute these scripts. The scripts have the same high level of authentication that other SyncLink downloaded packages have, so the intent of these scripts is not questioned by the local Firewall+. These scripts are authenticated and verified in the same way as application packages, but are not added to the Rights table, because they are generally executed just once, soon after download or at a loosely scheduled time. This functionality is generally used for maintenance operations, but may be used for many other activities.

Scripts are generally transient, provisioned when needed. If a more permanent tool is needed, a system tool is deployed.

Examples of use are:

the cleanup (purge) of old versions of software littering the Bubble, backup or restore operations, quality of service monitoring, usually after the authorized customer reports a problem, disabling a provisioned service after the license expires tracking the location of a device that's been reported as stolen by the authenticated owned.

Hidden Software

The update server can selectively deploy hidden applications to one or more Firewall+ storage firewall protected devices. This software is deployed & registered in the normal way, but will not be evident to the user. In the preferred embodiment, the application-browser will not normally show the user the hidden applications deployed to the Bubble, but the application-browser can be adjusted by the user through an application configuration mechanism.

A category (type) of hidden software is system software. Most hidden software is system software.

System software applications are generally for maintenance, security, system management, quality-of-service monitoring, or other background responsibilities. They can be (may be) deployed without being activated, so they will be in place if needed later.

Augmenting the System Through Field Replacement of Firewall+

The Firewall+ storage firewall can be field replaced in the same manner as any other deployed software. The new package is deployed, then provisioned. The next time the Firewall+ storage firewall is started, the latest version is used.

When a new version of any software is provided, the most recent (proven stable) older version remains. The earlier version is not deleted until some time later, when the update server sends an instruction to do so, generally when there are two older versions in the local space.

If the newly provisioned version of the Firewall+ storage firewall won't start properly, the Firewall+ Startup and Diagnostics program will automatically kill the latest and start the earlier (proven stable) version.

Status information is automatically provided to the update server from the local Firewall+ storage firewall on each update request.

The Firewall+ Storage Firewall as Server

The Firewall+ Storage Firewall and update manager system has been designed to be extensible, as described elsewhere in this document. A related design goal is to use this extensibility to selectively enable Firewall+ Storage Firewall protected devices as relay servers to other Firewall+ Storage Firewall protected devices. There are many benefits to this design, not covered in this document.

Peer-to-Peer (P2P) Communication

The secure communication channel between the Firewall+ Storage Firewall and it's designated update manager servers can be directed to other Firewall+ Storage Firewall protected devices, and the transaction set on those other devices can be augmented with update manager services. This effectively defines those other devices as servers. This scheme can be extended, so that every Firewall+ Storage Firewall is both a storage firewall for local protected storage, and an application and general purpose update manager for other (peer) Firewall+ Storage Firewall Protected Devices.

The same SyncLink authentication mechanism defined for Firewall+ and Update Server authentication can be used for P2P SyncLink endpoint authentication. In addition, each Firewall+ Storage Firewall SyncLink module will have a flexible list of Update Managers to query for designated updates. This list can contain peers acting as servers as well as update servers that are not peers.

In addition, the Firewall+ SyncLink module can use a discovery mechanism to search for Firewall+ update servers and relays.

Pervasive Computing Vision

The purpose of using Firewall+ Storage Firewall protected devices in a P2P collaborative network is to map around possible network server outages, reduce Update Server bandwidth and server CPU congestion, and in general to provide a faster, more reliable, and better user experience.

Another use of the P2P nature of SyncLink communication and the application server nature of Firewall+ Storage Firewall enabled devices is that applications on multiple such devices can collaborate on tasks. In addition, applications can move between such devices, obtain more compute resources as needed, and do other collaborative actions in the pursuit of their goals.

Firewall+ Storage Firewall as Application Server to Local Host

The Firewall+ Storage Firewall, even if not in a P2P collaborative, essentially functions as an application and storage server to the local host. This is because of the transactional nature of Firewall+ Storage Firewall storage protective protocol. This differs from the typical local (i.e. direct attached) storage protocol which are often queue based, designed to minimize CPU involvement and cycle cost.

Authentication, Authorization, and Access Control (AAA)

The term Authentication, Authorization, and Access Control is usually abbreviated as AAA. Some definitions of AAA use accounting instead of access control—in the Firewall+ design it is access control.

There is some transaction specific detailed information on AAA provided in the Firewall+ transaction sections—this part of this document provides an overview of the authentication architecture, plus additional details. If there seems to be a contradiction in the details, this AAA section is correct on the AAA approach, architecture, and general mechanism. Authentication, Authorization, and Access Control (AAA) are Intimately Related.

In terms of the Firewall+ storage firewall design, these terms are used in this way:

Authentication is the identification step—it decides whether an entity (user or application software) is recognized. It does not seek to prove the identity in some real world manner, merely to verify to some degree of assurance that the entity is the same as is known.

Authorization uses a lookup of rights and privileges to decide whether an entity can be permitted to do some action or some set of actions.

Access control uses the authentication and authorization information to decide whether to permit the entity to a specific action at a specific time (where the time is typically at the moment the action permission is requested.) In most designs, the authentication and authorization operations are provided by the same mechanism. In the Firewall+ architecture, this is also the case, but the default AAA algorithms are designed such that these can be adjusted independently.

In addition, there are two different yet related AAA models used by the Firewall+ storage firewall. One is for the application software interaction with the Firewall+ storage firewall, while the other is for the user (or some other software entity that represents the user) to "login", so the user can then be permitted to request that a Bubble protected application be started. From these two models are derived two sets of authentication mechanisms, one for the user and the other for software that intends to access the Bubble. There is a link between them, but basically they function independently. The user authentication design is simpler, so it is handled first.

Referring to the diagram shown in FIG. 3, the key data structures and data elements are put in context to each other. These are described & explained below.

User Entity AAA

This section provides details on the way the user (device owner, or some software agent representing the user) interacts with the Firewall+ storage firewall protected device.

There is an assumption in these descriptions that the device is a USB flash drive (UFD) being used on a personal computer, perhaps one whose operating system is MS Windows XP. This interaction model is transferable and extensible to other operating systems, other platforms, and other types of protectable devices and storage media.

There is also an assumption of plug-in authentication (or plug-in AAA). In particular, while the default model is very simple, the mechanism can be easily replaced by third party user authentication. The replacement might have a more elaborate design and/or biometric mechanism, or some other innovation in identifying the user.

There needs to be a way for the user, typically a human but possibly a software or even hardware entity, to authenticate to the Firewall+ storage firewall. In other systems, user IDs and password combinations are typical. This is also the default model used by the Firewall+ architecture.

When a user obtains a new Firewall+ protected device, such as a USB flash drive, the user has to select a user ID and password. The user interface method is not described here. The user ID and password are stored on the new device, among other data that collectively are referred to as User Registration Data. The User Registration Data is stored in a special place inside the Bubble.

Later, when the user wants to use the device, the same user ID and password must be entered, compared to stored values in the User Registration Data.

When the user ID and password, along with possibly other data, are entered, there is another field created in the User Registration Data. This is the independent user credentials data field. The user credentials data field is also provided to the update manager; it is used as part of that user's identity to the update server. As such, it becomes part of the licensing and/or authentication mechanism for some software applications. There may be links from some deployed application software to the User Registration Data's user credentials data field, for license verification and/or user authentication at application startup.

Software Entity AAA

This section covers all application and other software that needs read/write access to the Bubble (protected storage). This class of entity is referred to as the application or application software in this section. It might include other software such as the host computer's operating system, in some implementations.

Plug-In Authentication

The Firewall+ storage firewall architecture permits a plug-in model for AAA modules. This permits it to leverage industry standards for authentication and authorization. For different implementations, an implementer can select the third party authentication module that best meets the specific requirements. The authentication module has to be compatible with the Firewall+ architecture, but on a survey of existing available third party authentication modules, many were compatible. The exact method used in a particular implementation will depend on which corresponding AAA library was used. The default AAA architecture is described here.

Authentication Token and Credentials Table

During the Firewall+ initiation (handshaking) transaction, application authentication and authorization take place, and the application is supplied with an authentication token (auth_token). Accompanying subsequent file access requests, the authentication token provides a sort of permission ticket for the application. The auth_token authentication token is a hash of several values including an index to the credentials stored in the Credentials table. The index can be recovered by mapping out the other values.

The Credentials table is transient, created as needed by the Firewall+ storage firewall, generally as part of the reaction to an initiation transaction request. It stores a version of application authentication, authorization, and access credentials and rights.

In some implementations, the only reason to create and store the Credentials data is when an auth_token is created. In other implementations there will be Firewall+ internal mechanisms that also make use of this data structure.

In the simplest implementation, with only one possible application, the Credentials table will have only one data set.

The auth_token index is provided to the application, but the contents of the other Credentials table's data fields are not exposed to the user nor to the application. The Credentials data includes an index to the Rights table.

Default Authentication Module

The software AAA default authentication module uses an application signature mechanism. This can be thought of as a password, but longer. The exact application signature mechanism will vary across different software applications, based on the licensing requirements imposed by the software author. The key thing is the Firewall+ and the application to agree on the application's application signature.

One application signature scheme is for it to be the hash of a shared secret and some obtainable information. The obtainable information might include the process id (PID) of the application, a value for the current time and date, and a value for the date the application was installed to that device (i.e. the Bubble on that host computer system).

The application passes the application signature to the Firewall+ storage firewall with the initiation request.

The application signature, or a way to generate it, is provided to the Firewall+ Rights table by the update server.

Corresponding information is provided to the application either before, during, or even after the application is deployed. It is expected that the same application software on different deployments will use different shared secrets.

This default authentication module is easily extensible. Extensions might be additional information added to the hash, or differing hash algorithms used by different software applications.

Authentication Module Version Number

The initiation request (transaction) uses an authentication module version number to indicate which authentication module and/or which version of the authentication's algorithm is being used by that transaction. It is assumed that the Firewall+ storage firewall knows how to dynamically select the correct algorithm based on this version information. This assumption will only be correct if this Firewall+ storage firewall has received an appropriate code module from the update server.

Authorization Per the Rights Table

Before the application requests access, the application's access privileges (or rights) are stored in the Rights table. These are provided by the update server.

If the application will be resident within the Bubble, the Rights table generally receives authorization information when the corresponding application is provisioned (deployed) to that device or Bubble.

The application rights data stored in the Rights table represents not merely the generic application's rights to file access—this data (and the corresponding access privileges) is formed from the combination of the application's generic rights (and configuration) plus the user's rights and privileges. The update server combines these. The update server can also be used to modify these. The updated Rights configuration is provided to the local Firewall+ in the normal update manner.

When the application sends the initiation request, the Firewall+ storage firewall uses the authorization information, to form the decision tree for subsequent authorization processing. If some level of access is to be permitted, based on a combination of application Rights and User Credentials, then an appropriate entry is made to the Credentials table, and an authentication token is returned to the application.

The authentication token, auth_token, is a hash of validating data and an index to the appropriate entry in the Credentials table. There is a link from this entry to the application's entry in the Rights table.

Access Control

After an application has been authenticated and authorized to access the Bubble, the application receives an authentication token (auth_token). This is sort of like an access ticket. It is a reference to the appropriate entry in the Credentials table.

The authentication token encapsulates or represents the application's rights to the Firewall+ storage firewall that generated it.

The interesting thing about this scheme for access control is that the application's runtime access rights (i.e. the data in the corresponding Credentials table entry) can be changed while the corresponding authentication token is extent.

Transaction State Table

This section provides an overview of core transactions. Core transactions are those most frequently implemented, suitable for the widest set of implementations.

The transaction state table represents the request-state-action-response path of transactions. This may or may not be implemented by an actual state table in the Firewall+ storage firewall software. The transaction state table is presented in this document as a representation of the decision tree of the Firewall+ software. Other implementations of the decision tree, in addition to a state table, could be a case statement, or a set of If-Then statements, or some other language and implementation-specific option.

The way to read the state table documentation is: when a request is received, if the current state is as shown, then the corresponding action takes place, followed by the corresponding response to the requester.

In addition, this state table documentation has a column for Flags; these provide additional information such as indicating the transaction class. These Flags are optional, and only sometimes accurate; they are provided as guides to the implementer. But in fact, all of the contents of the documented state table can be viewed as non-authoritative—the actual transactions in an implementation can be completely different. The key design element is that the Firewall+ architecture is transactional, not that there are specific transactions.

In this disclosure there are classes of requests (transactions). These class designations are for ease of design, development, and test. Depending on the implementation, there may not be a functional impact of these transaction classes. Some of the transaction classes are:

From the update server, embedded in or as part of SyncLink transaction responses;
From application software; and
Generated by the Firewall+ storage firewall mechanism(s) itself.

For ease of design, development, and test, there may be different sets of request (transaction) handling and authentication processing for each of these.

Some of these transaction classes are implemented only in a software version of the architecture, others only in a Firewall+ Storage Firewall that is capable of using the SyncLink module to reach an Update Manager server.

Flag Key

Currently, only transaction class flags are provided. These are:

U—from an update server
A—from an application or other software (non-update manager, non-Firewall+ Storage Firewall)
F—from the (local) Firewall+ Storage Firewall itself For example, provision, update, and arbitrary-execution requests (transactions) are from the update server. These arrive by secure SyncLink. These transactions are verified (authenticated) by SyncLink methods.

TRANSACTION TABLE

| Flag | Transaction | Current state | Action | Response |
|---|---|---|---|---|
| U | Provision Transaction | Application not registered | Application is installed; Application is registered in the Rights table | Success if successful; otherwise the appropriate error code |
| U | Provision Transaction | Application already registered in the Rights table for access to this Bubble | New application is installed, old application is tagged as 'replaced'; Registration info in the Rights table is updated in parallel. On the next execution, the newer version will be used. | Success if successful; otherwise the appropriate error code |
| U | Update Transaction | Application not registered | None | Error code sent back to the update server over the SyncLink channel |
| U | Update Transaction | Application already registered in the Rights table for access to this Bubble | New application is installed, old application is tagged as 'replaced'; Registration info in the Rights table is updated in parallel. On the next execution, the newer version will be used. | Success if successful; otherwise the appropriate error code |
| U | Execution Transaction | Referred-to-Package not present or not healthy | None | Error code sent back to the update server over the SyncLink channel |
| U | Execution Transaction | Referred-to-Package previously received, present, healthy | Script instructions in the Package are executed if possible And reasonable (local discretion possible). Status result from the script is prepared for response | Success code and prepared script response are sent back to the update server over the SyncLink channel |
| A | Initiation request | Application not registered | None | Error code |
| A | Initiation request | Application registered for access to this Bubble | Entry added to credentials table, etc. authentication token generated | Authentication token passed to application for use in access calls |
| A | Request to open a file for write | Authentication token is not valid | None | Error code |
| A | Request to open a file for write | Authentication token is valid | File is already open for write, so this request must fail. | Error code |
| A | Request to open a file for write | Authentication token is valid | File is opened for write, which means an appropriate entry in the file table, etc. | Success code, file-reference (fp) is provided |
| A | Request to open a file for read | Authentication token is not valid | None | Error code |
| A | Request to open a file for read | Authentication token is valid | File is opened for read, which means an appropriate entry in the file table, etc. | Success code, file-reference (fp) is provided |
| A | Write access request | Authentication token is not valid, or file reference is not valid for request type | None | Error code |
| A | Write access request | Authentication token is valid, and file reference is valid for request type | Data written to file | Success code |
| A | Read access request | Authentication token not valid, or file reference not valid for request type | None | Error code |
| A | Read access request | Authentication token is valid, and file reference is valid for request type | Data read from file | Success code, read file data |
| F | Health | Firewall+ Storage Firewall not healthy | Response on non-health condition prepared as response | Success code, prepared health response |

Functional Descriptions

Figure 5:
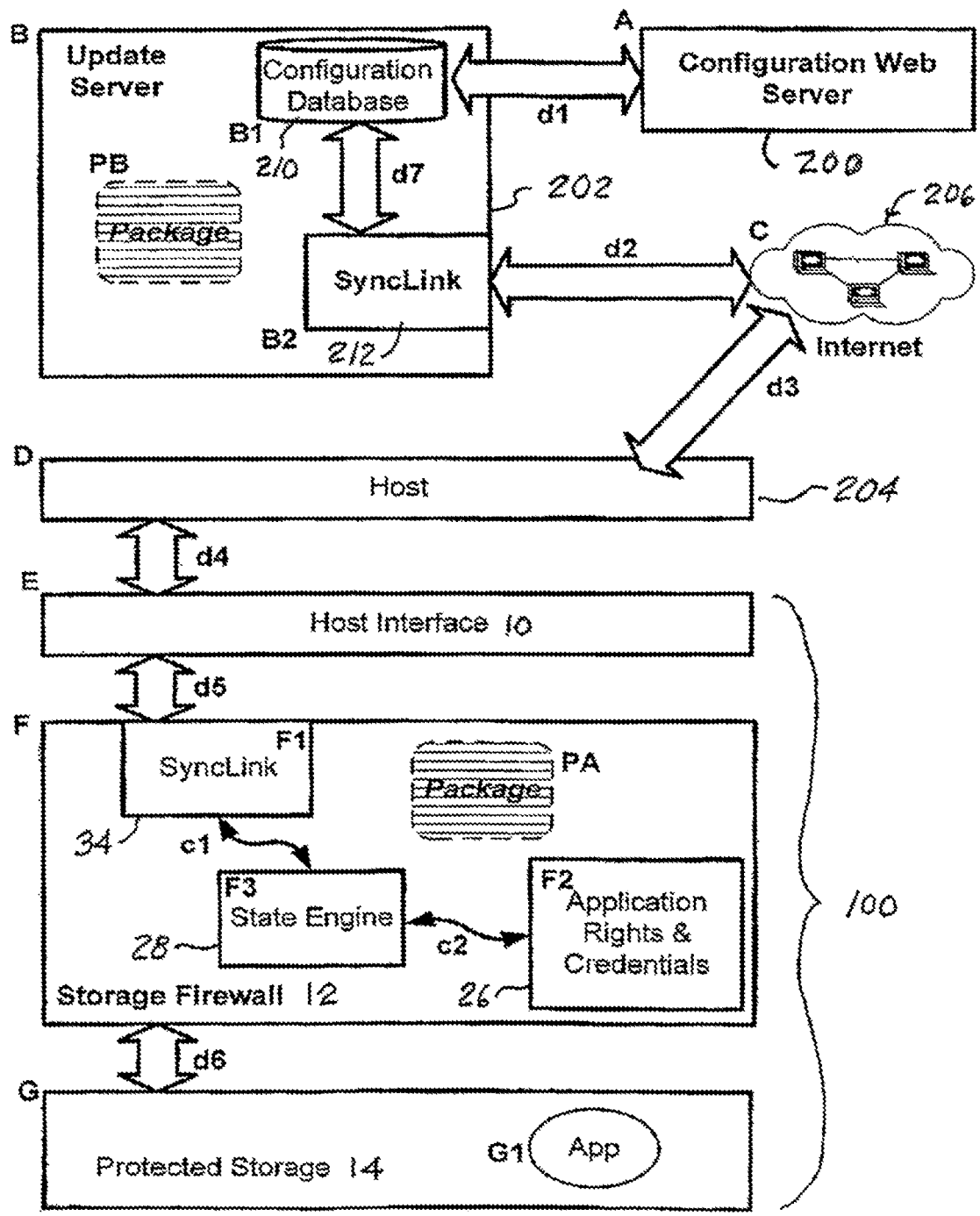
FIG. 5 is a functional block diagram illustrating a Firewall+ Storage Firewall and Remote Management System in accordance with the present invention.

Referring now to FIG. 5 of the drawing, a Remote Management System in accordance with the present invention and including a Storage Firewall Storage Device 100 as described above is shown. The system is composed of elements of a Configuration Web Server 200, an Update Server 202, a Host (Host Computer) 204, and the Storage Device 100 including the Host Interface 10, Storage Firewall 12 and Protected Storage 14.

The Internet component, as shown at 206, is not strictly speaking a component of the Remote Management System, but it is assumed to exist and be present for the System to function.

The Configuration Web Server 200 enables end users and owners to select customization options for their Storage Firewall protected storage and endpoint devices.

Update Server 202 is the remote management system's update server, providing updates, configuration changes, new software, and other information and data bundled into discrete Packages PB. The Update Server, as shown, contains a Configuration Database module 210 and a SyncLink module 212. The decision as to what information, data, software, and files to bundle into specific Packages PB depends on the information in the Configuration Database and a set of algorithms not detailed here.

The Configuration Database 210 contains configuration information about each Storage Firewall protected storage and endpoint device 100 (hereinafter called device), where such configuration information is a combination from several sources:

Class A: generic configuration information derived from the device's serial_number such as model, version, etc., combined with history information such as the most recent previous configuration update successfully provisioned, and Class B: user customizations.

At any previous time, including just previous to an update request, the owner may have selected customizations for this device's configuration. and Class C: derived from device status information combined with information provided by the device regarding its operating environment, the network bandwidth for the connection, etc.

The SyncLink module 212 provides an intelligent communication channel from the Update Server to the distributed Storage Firewall protected storage and endpoint devices 100.

The Host (Host Computer) 204 is the Host that the Storage Firewall and its protected storage is currently attached to. As described above, the Host Interface 10 of a local device 100 and provides an interface between the Host and the Storage Firewall 12.

For simplicity and the purpose of this discussion, the Storage Firewall 12 is shown to include only the SyncLink module 34, the Application Rights & Credentials module 26 and the State Engine module 28.

As described above, SyncLink module 34 provides an intelligent communication channel to the remote management system's update server 202, while the Application Rights & Credentials module 26 stores, processes, and provides user and application credentials, and access parameters for authentication, authorization, and access control purposes.

The State Engine module 28 provides the execution of the transaction decision tree or state table of the Storage Firewall. All transactions are processed through the State Engine module, which decides what to do, how to respond, and which other modules and components to use to meet the requirements of the requested transaction.

The Protected Storage 14 is the storage resource being protected by the Storage Firewall 12.

There is a multi-part data path that can be followed, through the several illustrated operative parts of the system connecting the Configuration Web Server 200 to the Protected Storage 14. This path is completed by a data path d1 which connects the Configuration Web Server to the Update Server's Configuration Database 210; a data path d7 which connects the Configuration Database to the SyncLink module 212 (The data path d7 actually represents several modules of the Update Server which are not shown.); a data path d2 which connects the Update Server's module 212 to the Internet 206; a data path d3 which connects the Internet to the Host 204; a data path d4 which connects the Host to the Host Interface 10; a data path d5 which connects the Host Interface to the Storage Firewall 12; and a data path d6 which connects the Storage Firewall to the Protected Storage 14.

Internal to the Storage Firewall 12 is a control connection and data path c1 between the SyncLink module 34 and the State Engine module 28, and a control connection and data path c2 between the State Engine module 28 and the Application Rights & Credentials module 26.

In the illustrated diagram, and within the Update Server 202, a Package PB representing Packages formed within the Update Server is shown. Similarly, within the Storage Firewall 12 a Package PA, representing Packages received by the Storage Firewall, is depicted.

The Configuration Web Server 200 can be implemented using any reasonable set of web server tools, according to the navigation design provided in the Firewall+ Architecture described herein. One choice for the Configuration Web Server technologies and tools might be the Apache web server with Java backend, JavaScript coded web pages, and firewalled network integration with the Update Server's Configuration Database.

The Update Server can be implemented using any suitable software-server tool set. An example is the Apache web server with XML, SOAP, database-integration, bit-torrent (peer-to-peer, P2P) integration, and related modules integrated for data processing performance.

The design of the SyncLink protocol drives many of the implementation requirements of the Update Server. In particular, the requirement to serve up (deploy) Packages targeted at a few or one specific supported device, while also serving up Packages intended for millions of supported devices requires the support of ad-hoc P2P collaborative peer networks, based on the intended recipients of specific update Packages. While this does not change the basic architecture, it does add complexity to the design.

The Configuration Database can be implemented using any of multiple relational database designs. The basic requirements for the Configuration Database implementation are a query engine and a storage manager. Other commercially available relational database features are used in the implementation of the Configuration Database in order to improve performance and security. These include query language, views, triggers, and symbols. There are several suitable available products and technologies that can be used to provide these.

The SyncLink module 34 provides an intelligent communication medium for providing requested updates to supported devices. It is transactional, but with "fuzzy" delivery, scheduling, and packaging of the actual updates. It is designed around 2 sets of interoperable IP-based protocols.

The first set of protocols is commonly thought of as web protocols: HTTP, HTTPS, TLS (SSL), XML, SOAP and others that have been applied and/or extended to provide and support a portion of the SyncLink protocol.

The second set is derived from the bit-torrent or BitTorrent protocol (really a family of protocols). When the SyncLink module transfers a get update request to the Update Server, the Update Server attempts to reply to the requesting device as quickly as possible using the SyncLink module, using the part of the SyncLink protocol based on web-based protocols. The reply to the requesting device is a Package that may necessitate additional update requests or that may instruct the device to obtain portions of the update from other peer devices. There is flexibility in this process, directed by an intelligent module (not shown) of the Update Server. The SyncLink module's implementation permits similar requests from different devices to be replied to quite differently, in an adaptive manner, based on knowledge of network load, server load, network topology, and other factors.

The Internet component is provided by the Internet and is interfaced to by standard network equipment (not shown).

The Host (Host Computer) 204 can be a PC or any other computer, computing device, digital equipment, or analog equipment, with interfaces to the Internet and to the Storage Firewall protected storage.

When embodied in a USB flash drive, the Host Interface 10 is a USB controller. As suggested above, USB controller chips and designs are commercially available from manufacturers such as Cypress, Anchorchips, Scanlogic, and Intel.

The Storage Firewall 12 filters access from the Host to the Protected Storage component and has three relevant subsystems including the SyncLink module 34, the Application Rights & Credentials module 26 and the State Engine module 28.

The SyncLink module 34 is controlled by the State Engine module 34 which periodically uses the SyncLink module to poll a remote management system's update server for updates. When an update is received, the SyncLink module opens up the retrieved update Package PA and provides the contents of the update Package to the State Engine module for processing.

The Application Rights & Credentials module 26 is implemented as a set of data structures and operations that act on data structures which include the Application Rights Table, the Credentials Table, and the User Registration Data depicted in FIG. 3.

The Application Rights & Credentials module is able to store new and updated information in these data structures, and provide functionality (object functions visible to and usable by the State Engine module) to manipulate, adjust, and update the contents of it's data structures.

The State Engine module 28 is the transactional portion of the Transaction Processor 20 described above. Implementation of this module is based on a software coded state table, an implementation of the Firewall+ Storage Firewall decision tree. To save space on the chip, the decision tree is encoded in a state table. The state table has an entry for every transaction provided by the Firewall+ Storage Firewall. If the chip is an FPGA (Field Programmable Gate Array) or other field-changeable chip or chip portion, it may be possible to upgrade or replace the state table in an operational Storage Firewall's Transaction Processor component's State Engine module. This is useful to add transactions, or to improve or change the behavior of existing transactions. It can also be a security vulnerability, if an attacker is able to change transaction behavior. However, this implementation is preferred in some consumer products, to reduce product support costs.

If the chip is an ASIC (Application-Specific Integrated Circuit) or other non-field-changeable chip or chip portion, then it is not possible to upgrade or replace the state table in the field. This implementation is preferred in a highly secure product or installation, such as a military application.

The Protected Storage component 14 may be implemented as NAND Flash chips.

Major transactions are described in relation to the functional diagram. These transactions include Request and receive update for an existing application, where this update provides a modified application configuration and application rights.

The provision of basic status information by the Storage Firewall to the Update Server, prompting a more complete status report from the Storage Firewall to the Update Server.

Transaction: Request and Receive Update, for Application

This is a client-server transaction from the Storage Firewall to the Update Server. Periodically (asynchronously) the Storage Firewall polls the Update Server for updates. There is no fixed schedule for this poll, since it is impossible to predict when or how often the Storage Firewall protected storage and/or endpoint device will be in use.

The update transaction is independent of whether the Configuration Web Server has been used to modify the records for this Storage Firewall in the Configuration Database 210.

When the Storage Firewall sends an update request transaction to an Update Server, the SyncLink module 34 selects which Update Server to contact, maintaining information that supports such contact. The update request transaction goes from the Storage Firewall's SyncLink module through the Host Interface to the Host (Host Computer), where it is packetized by the Host's network interface (not shown) to be suitable for transmission over the Internet, and sent through the Internet to the Update Server.

On the Update Server, the SyncLink module 212 receives and validates the update request transaction, interprets the update request transaction, and specifies the transaction response. The SyncLink module then packages the transaction response, the update, shown as Package PB, and directs it back to the Storage Firewall, over the Internet. (Not shown is the Update Server's network interface.) The update (the transaction response) is received by the Host 204, and passed through the Host Interface 10 to the Storage Firewall 12.

When the update is received by the Storage Firewall, it may include several elements. One of these is a Manifest (not shown), containing a list of other elements, including a software Package PA. The SyncLink module 34 opens the update, and provides the Manifest and Package PA to the State Engine module 28. The Manifest provides the State Engine with instructions, including what to do with the Package.

In this transaction example, the Package PA might contain changes to the configuration of an Application G1 stored in Protected Storage 14, as well as corresponding changes to the application rights for this Application stored in the Application Rights & Credentials module 26. The Application's configuration changes are applied by the State Engine directly to the Application by writing the received (updated) configuration file into the appropriate place within the Protected Storage. The changes to the application rights for this Application are effected by the State Engine module using the Application Rights & Credentials module 26.

Transaction Set: Basic status information to the Update Server, instruction from the Update Server to send complete status report, There is no acknowledgement message sent from the Storage Firewall 12 to the Update Server for completed update transactions, but periodically (asynchronously) the Storage Firewall sends to the Update Server basic information regarding its status, including information on it's current configuration. This is called a Status Poll. In this way, the Update Server's Configuration Database 210 is kept up-to-date on the health, configuration, etc. of this Storage Firewall 12.

If the If the Update Server 202 is satisfied with the status information received in the Status Poll, the response will be either a basically empty acknowledgement (or some other response that elicits an Update Server directed request from the Storage Firewall 12).

If the Update Server notes a significant discrepancy from its configuration record on this Storage Firewall, or for some other reason, its reply to the Storage Firewall 12 will elicit a more complete status report. This called a Health Report, but note that it is still presented by the Storage Firewall as a request to the Update Server. The response from the Update Server to the Storage Firewall for a Health Report is formed and treated in roughly the same way as a Status Poll.

The Update Server's response to a Health Report may be intended to elicit an update request (as documented above).

Figure 6:
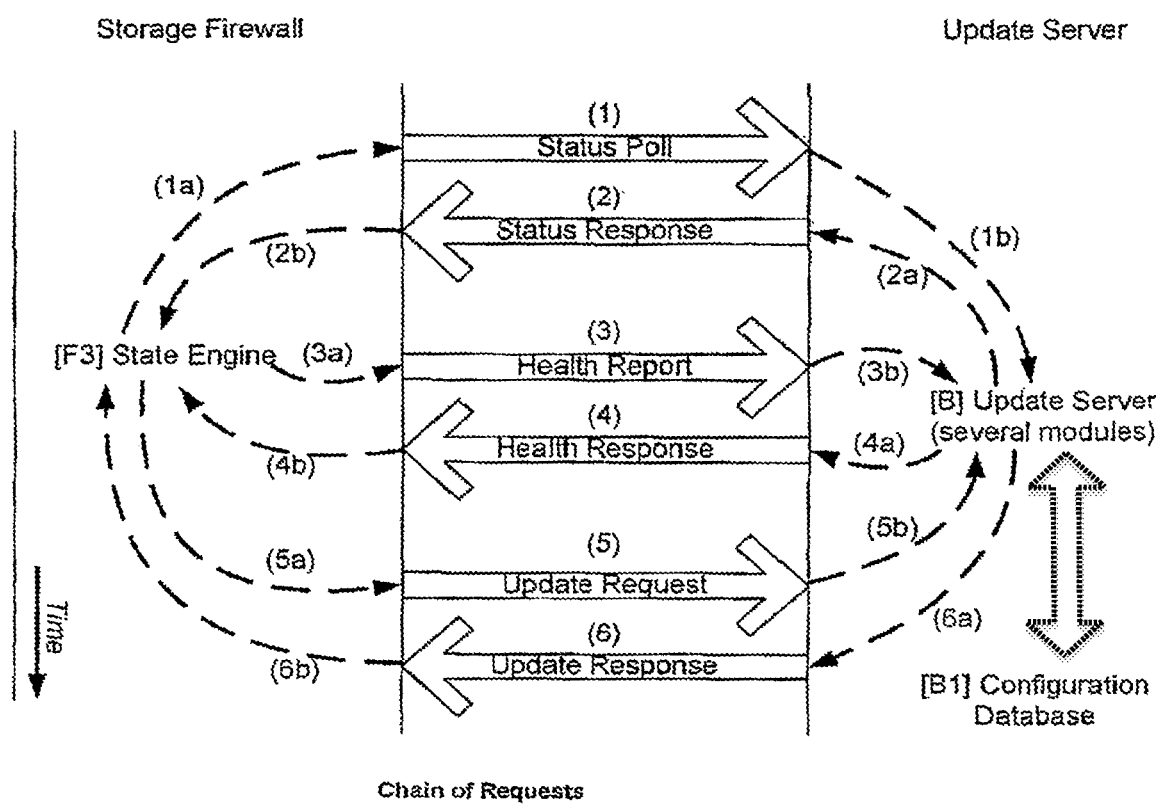
FIG. 6 is a diagram illustrating communications between a Storage Firewall and an Update Server in accordance with the present invention.

The illustrated causal chain of requests and responses is diagramed in FIG. 6.

In FIG. 6, the Status Poll (1) is generated and sent from the Storage Firewall's State Engine 28 to the Update Server.

The Status Response (2) from the Update Server 202 contains an instruction to the Storage Firewall's State Engine that elicits the Health Report request (3).

The Health transaction's response (4) contains an instruction to the State Engine that elicits the Update Request (5).

The Update Response contains the actual Update Package applied by the Storage Firewall's State Engine.

For each transaction in this chain of requests and responses, the Configuration Database 210 is provided with information from the most recent request, then information from the Configuration Database is used by the Update Server 202 to decide what instructions, if any, to put into that request's response.

Scheduling Mechanism

The storage firewall has a scheduling mechanism or component.

The storage firewall scheduling component is used for several purposes. These include scheduling the polling (of the update server), scheduled execution of software deployed to the storage firewall, scans of the Bubble (protected storage) for anomalies (and other targets), etc.

The scheduling component has the requirement to balance the prioritization of read-write access and related top priority activities, versus secondary activities such as detecting and analyzing anomalies in the access request stream (followed by sending Warning messages to the update server), versus tertiary activities such as normal update server polling, software management, and disk maintenance actions, versus background activities such as disk scanning (malware, arbitrary strings, etc.). There can not be a single scheduler design that will fit all of the multiple possible designs of the storage firewall, but the following design of the scheduling component can be used as an example.

The design of the storage firewall scheduling component can be as simple as a list of "processes", each with a priority value, perhaps on a scale of 0 to 100, where 100 is the highest possible priority on this scale. A priority of 0 implies the process is currently "sleeping". These priority values are segmented into sets, for example 1 to 20 are background tasks. In addition, a 'real-time' "interrupt" scheme causes certain (high priority) processes to be executed as needed.

The basis of one design of the storage firewall scheduling component is a queue with priority interrupts, with several subsets based on priority. A version of the schedule component could be described as follows: processes and threads are added into the queue based on their priority, the queue is processed from highest to lowest (i.e. top to bottom, or next to last). There are preemptive interrupts for certain threads, based on their being among the highest priority set.

The storage firewall scheduling component requires a timing signal from a system clock. System clock generator parts are commonly used and available, or an existing system clock (i.e. the clock of the protected digital device) can be used. If the storage firewall requires a new clock mechanism, then either a PLL (Phase Locked Loop) synthesizer or an XO (crystal oscillator) module can be used, depending on the design of the embodiment. In any case, the system clock source provides input to the storage firewall scheduling mechanism.

If the storage firewall is designed so as to be integrated into a disk controller, the design of the storage firewall scheduling component will have to be modified as necessary. For example, if the storage firewall is integrated into an SSD (Solid State Disk) which is (itself) composed of DRAM (Dynamic Random Access Memory) and Flash memory, then the storage firewall's components will likely be split among the SSD controller, as well as the separate controllers for the DRAM and Flash. This means that the storage firewall can take advantage of aspects of the SSD design such as the DRAM refresh cycle and Flash idle time to perform disk maintenance activities and run scans of disk contents.

Disk Architecture Attributes Relevant to Storage Firewall Functionality

HDD controllers have a processor, often a bit of RAM for their own processing, but often also some RAM as a cache—HDD controller design does not matter from the perspective of this level of description of storage firewall functionality and design.

SSD architecture can be some type of RAM (usually DRAM) and/or Flash, with an overall SSD controller, plus each of the RAM and Flash will have their own controller.

Flash cells can be NOR or NAND, NAND MLC or NAND SLC, or some other technology. The type does not matter.

Flash solid state memory is a type of EEPROM (electrically-erasable programmable read-only memory), but with a significant difference that it is faster because it is read in blocks, not bytes as older EEPROM is. NOR Flash is a better replacement for EEPROM. NAND is better as a replacement for HDDs and CD-ROMs, etc. MLC (multilevel cells) is denser than SLC (single level cells), because multiple voltage levels can be stored per cell.

The flash controller (usually idle) can scan cells at no-performance cost to the system it is part of the storage firewall can use the DRAM refresh cycle for scanning the DRAM.

Other storage firewall functionality may be added to the SSD controller, depending on implementation, design parameters, market requirements.

The storage firewall can execute local software (operations) such as scans for malware hiding on the disk. In spite of the storage firewall's execution-whitelist and access-whitelist mechanisms, malware can still propagate to the disk, perhaps as part of files saved by a user when browsing the web (World Wide Web, or WWW). The current state of the industry (Prior Art) is for malware scan software to execute on the mission processor (i.e. the Central Processing Unit, or CPU). It will be much more efficient for these malware scans, and other scans, and various other software executables used in the maintenance of the disk and system to execute as part of the storage firewall. Since the storage firewall functionality is likely to be integrated in the disk controller, this means that the system maintenance tools will, likewise, be integrated into the disk controller.

The base storage firewall functionality is built around read-write access control and execution control based on a whitelist of software executables, plus the server architecture and SyncLink communication mechanism. The storage firewall processor can also, obviously, be used as a base for non-access-control features, including technology hooks that provide a significant amount of value; these include arbitrary executables, scanning the disk for arbitrary strings, built-in executables such as A-V scan, an awareness of what the disk controller is doing (ex. In an SSD whether the SSD is in a DRAM refresh cycle or whether the Flash controller is busy), and an overall scheduling mechanism (which can be used for a variety of purposes). Whether or not the storage firewall is integrated into the disk controller, it can scan on the disk (storage) for:

Arbitrary content, given a list of wildcarded strings (fuzzy search);

Unlicensed software;

Unpatched software;

Bad blocks and other disk issues (either hard drive or solid state disk); and

Malware (for example, but not only, by looking for patterns that correspond to one or more parts of a 'black list' signature file).

Note: malware can end up on drive if written by legitimate (authorized) software such as an email client application saving an infected attachment. Scanning for it and removing it should be done by storage firewall rather than an application on the CPU because the entire system can run faster when tasks are off-loaded from the CPU.

Typical storage firewall scan (for whatever reason) will occur when the hard drive is less busy. On some SSDs, those that employ DRAM, the scan can occur during the DRAM 'refresh cycle'. Other storage firewall services may include those that act upon the disk (hard drive or SSD, where appropriate), such as:

defragment hard drive;

balance flat file databases' data structure and other database maintenance operations;

secure delete of drive contents;

provision arbitrary software, including system software modules; and delete, remove, manage licenses, such as software licenses.

These scanning and other executable operations, such as malware scanning may be provisioned from the update server, or they may be hard coded (built into the storage firewall) or pre-deployed, perhaps when the storage firewall or the enclosing protected device is manufactured.

Storage Firewall Functionality Integrated into Solid State Drive's (SSDs)

There are several designs for SSDs. One of these uses DRAM in combination with flash, where the design may use NAND MLC flash. The goal is to provide a very fast drive for swap space and other purposes, while using the flash as a permanent store when the drive is not powered. Flash has a relatively slow write speed, and the power to the drive may be cut at any time (ex. power failure), so the drive has to have a mechanism that can trigger the contents of the DRAM to be written to the flash component. (The drive also has to have an independent power supply to ensure that there is enough power during the time it takes to transfer this data.)

Figure 7A:
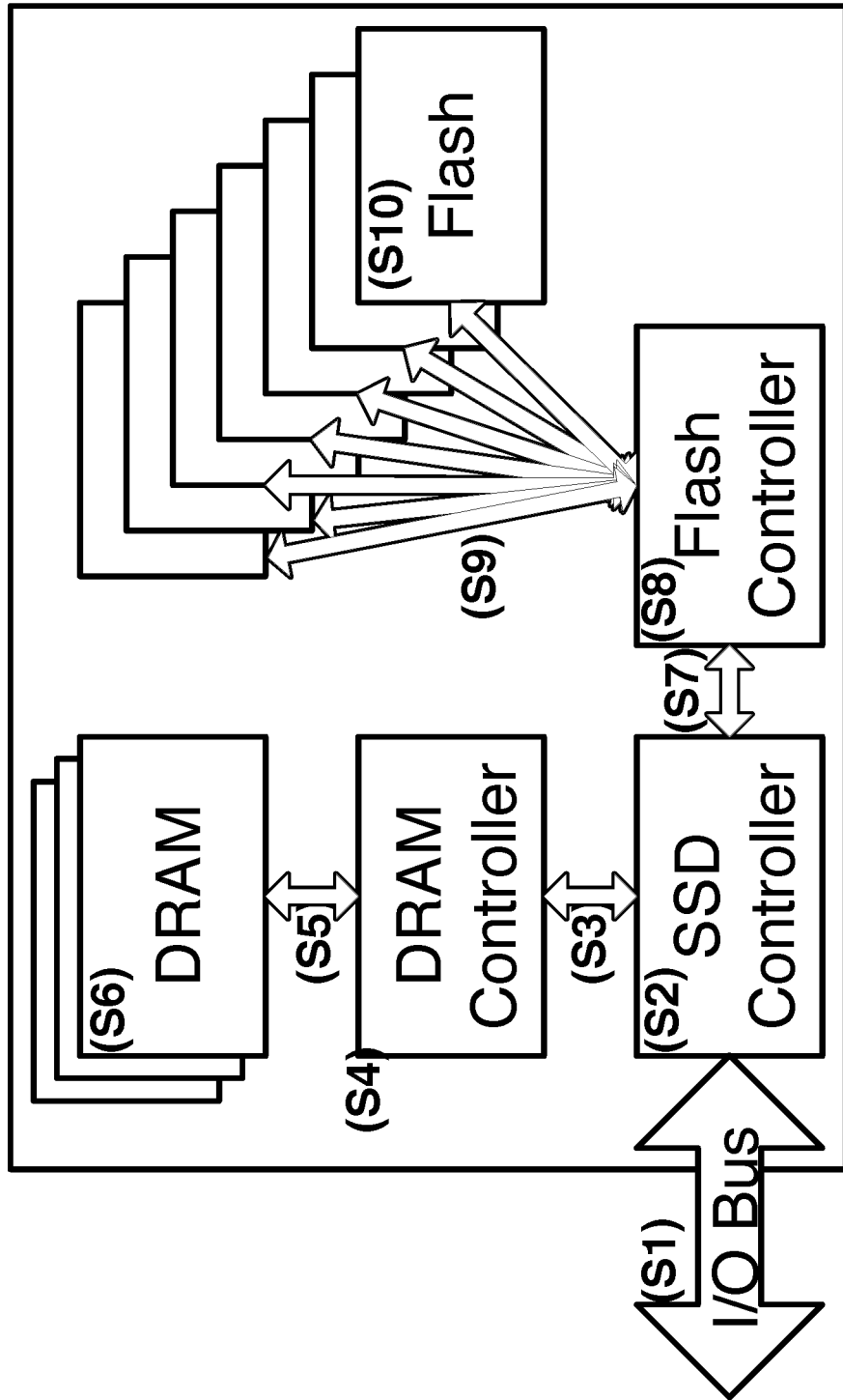
FIG. 7A is an illustration of a Solid State Disk (SSD) Conceptual Design, showing in concept how an SSD's components may be organized. (Prior Art).

FIG. 7A is an illustration of the Prior Art, an SSD (Solid State Disk) without Storage Firewall functionality.

Figure 7B:
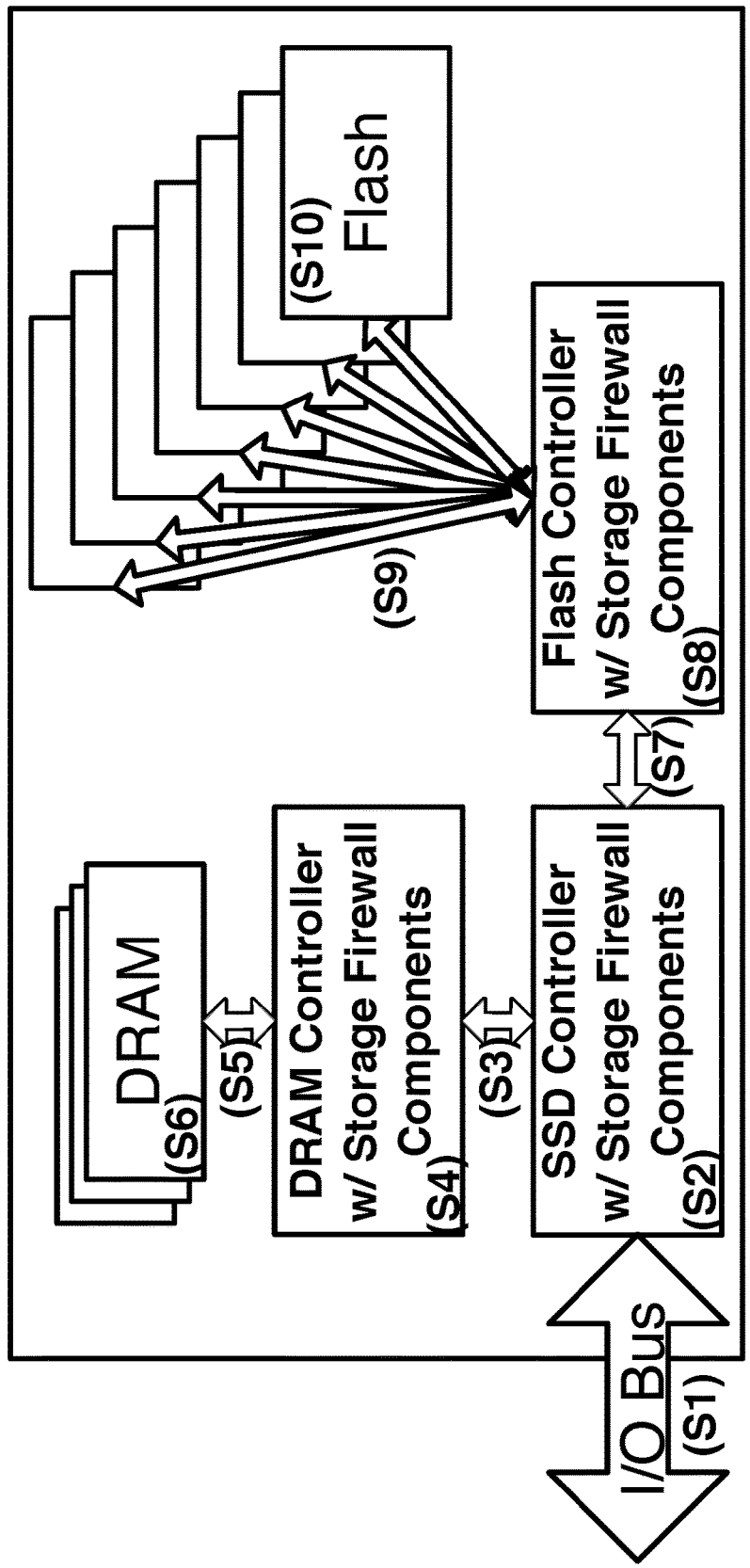
FIG. 7B is an illustration of a Solid State Disk (SSD) Conceptual Design with Storage Firewall Components integrated into SSD Components.

As illustrated in FIG. 7B, the I/O Bus (51) connects the SSD to the rest of the digital system of which it is part, and connects to SSD Component (S2), the SSD Controller. The SSD Controller may or may not have Storage Firewall functionality, without prejudicing whether other components of the SSD have such functionality.

Further, in FIG. 7B, the SSD Controller (S2) connects to the DRAM Controller (S4) through local memory bus (S3). The DRAM Controller may or may not have Storage Firewall functionality, without prejudicing whether other components of the SSD have such functionality.

Further, in FIG. 7B, the SSD Controller (S2) connects to the Flash Controller (S8) through local memory bus (S7). The Flash Controller may or may not have Storage Firewall functionality, without prejudicing whether other components of the SSD have such functionality.

The DRAM Controller (S4) connects to the DRAM (S6) through local memory bus (S5).

The Flash Controller (S8) connects to the Flash (S10) through the parallel array of local memory buses (S9).

There are use cases that require a software embodiment of the F+ Storage Firewall. These include, but are not limited to, any computing and information access environments that do not have an integrated hardware embodiment of the F+ Storage Firewall. These include, but are not limited to:

Storage controllers that support add-on software;

Virtual computing environments; and

Cloud computing environments.

The present invention provides a software embodiment of the F+ Storage Firewall and Support Server technology to provide security functionality integrated into a customizable storage controller, which is a replaceable software storage controller, or in other words, software executables that implement and provide storage controller functionality.

My earlier provisional patent application referred to above described a tight bundling of application software and storage firewall, to be deployed on a USB Flash Drive, as a FlashApp. The provisional defined a software embodiment that was intended for the support and protection of single application software executables and small sets of related software executables. The stated purpose was the protection of the application executable and it's associated data. In particular, the stated purpose was the protection of the integrity, confidentiality, and availability of the application executable's file's contents and the data file's contents by preventing unauthorized writes and reads of a protected area of storage, where the application executable and associated data reside in this protected storage when not executing on a host PC (i.e. connected computer).

My previous patents, also referred to above, focused on an embedded hardware embodiment as a separate component of computer systems. The patent focused on the integration of the F+ Storage Firewall technology into a hardware storage controller.

My CSC patent covers storage controllers that are implemented as customizable software running on off-the-shelf processors and FPGAs rather than hardwired ASICs. This is made possible by the increasing performance and decreasing cost of microprocessors and FPGAs, reducing the cost, and improving the performance. This permits smarter more flexible storage devices to be used as components in what are currently expensive flash storage arrays (for data centers, cloud computing, etc.). There are a variety of other benefits, as well.

My CSC invention is described in terms of:

the 2 CSC designs illustrated in the drawing illustrate CSC architecture, with a significant architectural difference between them; and F+ Storage Firewall integration into these 2 CSC designs, or it may be more fair to say that the F+ Storage Firewall is extended into becoming a CSC.

To clarify language, where this document refers to 'storage controller', the often used industry terms include disk controller, drive controller, and sometimes simply 'controller'. This document uses the phrase storage controller unless specifically referring to controllers for hard disk drives, in which case the phrase disk controller will be used.

A storage controller is presumed to be an integrated circuit chip or set of such chips, usually mounted on a circuit board, where this circuit board is bolted and wired onto (into) a storage device. This storage device may be a hard disk drive or may employ some other type of storage media such as a Flash (or flash) chips. This storage device itself is generally considered a component in a computer or other digital system of some type.

Where the term (Host) I/O Processor is found in the text, a common term in the storage industry is Host Bus Adapter, or HBA, or some other reference to the idea that the internal data bus is being bridged to the external storage and peripheral bus (ex PATA, SCSI, USB). Some of the recent prior art uses the North Bridge/South Bridge terms, where the North Bridge processor connects directly to the CPU core, and communicates with RAM on behalf of the CPU, etc., while the South Bridge processor communicates with the North Bridge and external storage device controllers such as Flash and hard disk drive (HDD) controllers.

In addition to the other glossaries and dictionaries mentioned, the IEEE dictionary is helpful.

The Authoritative Dictionary of IEEE Standards Terms. p. 438. doi:10.1109/IEEESTD.2000.322230. ISBN 0738126012.

Background terms, no change in their meanings is proposed by this disclosure

Introduction to Storage Controllers

Storage Controller Basics

First, a basic definition of a storage controller: it is the interface and management mechanism, both hardware and software, that does the storage operations to storage media. Storage media can be some form of solid state memory chips (such as flash memory), or rotating magnetic platters (such as in a hard disk drive).

A storage controller allows a disk or flash drive to talk to a peripheral bus. Examples of a peripheral bus are PATA, SCSI, and USB, usually physically separate or external to the host circuit board(s).

The currently most common industry term for the component(s) that allows a computer host processor to talk to this peripheral bus is host adapter or host bus adapter (HBA).

The combination of a storage controller with storage media makes a storage device.

Storage access requests are received by a storage controller from a Host I/O Processor. The storage controller generally maintains a queue of access requests, where these requests (or commands) are formatted in according to which drive interface type is being supported; ex. AT commands for the SATA interface.

The storage controller is generally single threaded, managing a queue of storage access requests, translating in turn each received and queued access request into instructions for accessing the storage media, depending on the type of storage device.

The storage controller then translates and packages the reply, before passing it across the peripheral bus interface to the host interface.

Sometimes there may be another controller between a Host I/O Processor and a storage controller; this may be a storage array controller that supports the creation and management of RAID architectures. In some implementations, the disk array controller may be integrated into a Host I/O Processor, but is still performs different functions.

This applies to any size or shape or storage device. It is especially valuable for enterprise class storage devices, which often use the more intelligent Serial Attached SCSI (SAS) rather than the Serial ATA or Serial AT Attachment (SATA) more common on the desktop PC. These enterprise class storage devices are generally deployed in data centers, which are undergoing a disruptive evolution into cloud computing facilities.

| Background Glossary | |
|---|---|
| Binary blob, Blob | en.wikipedia.org/wiki/Binary_blob |
| Booting, Bootloader | en.wikipedia.org/wiki/Bootloader#Boot_loader |
| Disk controller | en.wikipedia.org/wiki/Disk_controller |
| Firmware | en.wikipedia.org/wiki/Firmware |
| FPGA—Field programmable gate array | en.wikipedia.org/wiki/Field-programmable_gate_array |
| Hard disk drive | en.wikipedia.org/wiki/Hard_disk_drive |
| Hard disk drive interface | en.wikipedia.org/wiki/Hard_disk_drive_interface |
| Microcode | en.wikipedia.org/wiki/Microcode |
| Parallel ATA (IDE) | en.wikipedia.org/wiki/Integrated_Drive_Electronics |
| SAS (Serial attached SCSI) | en.wikipedia.org/wiki/Serial_Attached_SCSI |
| SCSI (Small Computer System Interface) | en.wikipedia.org/wiki/SCSI |
| SCSI command | en.wikipedia.org/wiki/SCSI_command |
| Serial ATA | en.wikipedia.org/wiki/Serial_ATA |
| ST-506 | en.wikipedia.org/wiki/ST-506 |

Storage controllers also perform a variety of management functions, where "enterprise" class storage devices are expected to have more management functions than desktop class storage devices. In addition, enterprise class storage devices have greater performance, and other benefits to justify a correspondingly higher price point.

Recent History of the Development of Storage Controllers

This document omits the earlier history of storage controllers, from the 1960's programmable IOPS (Input/Output ProcessorS) through the SCSI, IDE, EIDE, and PATA technology generations as someone 'skilled in the art' is expected to already have a good grasp of this information.

The goals during this storage controller evolution have included:

Improving performance,
Improving reliability and durability,
Reducing cost, usually measured as per storage unit,
Reducing power consumption,
Simplifying storage protocols and physical connections, and reducing system complexity (leading to reduced costs), and
Increasing the number of connected disks and other storage resources, which included increasing the distance of physical connections to storage.

In 1999 a group of system, semiconductor and storage device suppliers recognized that the widely deployed IDE/PATA storage controller design would soon begin to limit system performance. These suppliers created the Serial ATA Working Group which set out to develop with the goal of a faster AT storage interface. The group released its Serial ATA 1.0 specification in August 2001. The Serial ATA Working Group later became The Serial ATA International Organization (SATA-IO, serialata.org).

The SATA standard replaced the older IDE and EIDE 40-conductor and 80 conductor flat ribbon cables used to connect disk drives to the motherboards of personal computers with thin and flexible point-to-point cables. SATA 1 transfers data at a higher rate (150 Megabytes per second) than PATA (typically 100 MB/second), while the current SATA 3 specifies 60 GB/s. Serial ATA storage devices became widely used during the second half of 2003, and have since become the most common interface type of storage device.

SATA continues to evolve, with security added by other groups, but newer storage interface technologies are being introduced such as PCIe, where the goal is higher performance through eliminating the latency caused by SATA ATA command processing. Some product manufacturers, such as Apple Computer, have eliminated or combined the storage controller functions with the I/O controller in current generation mobile devices (circa 2013).

Other storage controller (interface) types include (but are not limited to):

SCSI, which incorporated the drive controller earlier than IDE/PATA,
SAS (a version of SCSI), used primarily for servers (often in data centers),
Fiber Channel, a networked controller technology used primarily in data centers,
iSCSI (a networked version of SCSI) used primarily in data centers, and
PCIe/NVMe, the new performance leader, for systems of various types, eliminates the storage-specialized Host Interface 10, relying on the PCIe/NVMe controller to act as the Host Interface 10 to the storage device(s).

Current State of Storage Controllers, Including Problems

The current storage controller situation is in flux. Small systems (including desktops, small servers, laptops) and embedded devices have benefited in the past from the ability to source common components such as standard disk drives. This has resulted in lower prices and faster revenue growth both for the disk drives and for the systems they are installed into.

Disk drive manufacturers were able to leverage higher manufacturing volumes into higher revenue growth, which enabled greater investment into research and development, which provided the world with improvements in disk drive (magnetic recording, read/write head architecture, and interface design) technologies which enabled disk drive density and cost to large track Moore's Law improvements in the density and cost of integrated circuits. So faster, denser, and cheaper computer processors and RAM were combined with faster, greater capacity, and cheaper disk drives, with standard interfaces, and commoditized This path of evolutionary innovation would be expected to continue, but as the market situation is undergoing revolutionary changes, there are expected to be disruptive changes in deployed storage technologies. These changes include developments in solid state storage technologies which promote fragmentation of the market; some types of products see lower sales and other product types see faster growth than was expected. For example, the sales (and segment revenue) of desktop personal computers (PCs) have been lower, while mobile computers and related devices such as tablets have been much higher. The manufacturers of tablets do not see value in sourcing desktop PC storage components; instead they are generally either sourcing solid state storage devices (such as mSATA or PCIe) or are attaching solid state storage components directly to their circuit boards (such as in Apple laptops through early 2013).

For those system manufacturers still sourcing storage devices, whether solid state storage or disk drives, the devices are still block oriented, though the trend is larger block sizes. (512 byte blocks is the older standard, 4K byte 'sectors' is becoming the new standard, especially on Flash arrays. A larger sector size allows for higher capacity storage and larger size reads/writes on storage access, which supports higher performance storage architectures.) This block orientation made sense in the past with strictly standard interfaced hard disk drive storage devices, but makes much less sense when designing with solid state and hybrid storage components. One issue is that the operating systems and other technologies (such as data center oriented storage architectures) that interface to the storage components have their own market inertia.

Since there are different market-driven requirements for major market segments, these should be discussed separately. These include small systems (including mobile), and data center (including cloud) storage systems. Dividing the world into just these categories seems artificial as the real world is changing so rapidly, but lines have to be drawn somewhere, to get a handle on the changing requirements for storage controllers. In addition, data storage security requirements are rapidly changing and not currently being met. The following three sections cover these market driven requirements:

Small system storage controllers
Security
Compatibility with Data Center evolution Small System Storage Controllers As mentioned above, one of the trends for small systems, mobile devices, and large manufacturing volume embedded devices is to forgo use of standard storage devices if there are significant advantages to proprietary technology approaches:

Reduce chip count and reduce required device real-estate and component (bill of material) costs, Reduce component (bill of material) costs, and Improve performance through innovative storage interface schemes.

SATA interfaced solid state storage devices should continue to be sourced by some manufacturers, but likely with extensions to the standard AT command set.

For small systems, in both the case of continued use of SATA (and other standard storage interfaces) and the use of proprietary storage interfaces, there will be a strong trend toward extensions to the older SATA interface standards in order to improve performance, reduce costs, etc. The security extension, Opal, is described below. Other extensions include Native Command Queuing. (Native Command Queuing (NCQ) specifies how storage devices can reorder read and write commands in order to optimize performance.) Some extensions will receive broad industry support and became part of the standard, while others will be proprietary to only one or some vendors' offerings.

Another trend is to replace SATA storage interface devices with PCIe, for better performance. Part of this performance increase is the reduced storage controller latency. The increased performance of flash solid state storage media has brought attention to the SATA performance penalty caused by the SATA storage controller's architecture. According to press accounts (such as electronicdesign.com/digital-ics/whats-difference-between-sata-and-nvme) forecasts are for 10% to 40% increase in design wins for PCIe for new products that formerly would have been expected to employ SATA storage devices.

Manufacturers adopting PCIe include Apple Computer, which announced (www.theinquirer.net/inquirer/news/2274453/apple-looks-to-samsung-for-mac-bookair-pciexpress-ssd) the use of PCIe in their next Macbook Air laptop.

Another emerging interface standard is NVMe (Non-Volatile Memory Express), which similar to PCIe, provides better performance than can be achieved with SATA 3 on flash storage devices.

All of these technologies and/interface types are evolving as a result of competitive pressures, to better meet current and expected market requirements.

Storage Device Security

Opal Introduction

A significant effort has been made to secure the contents of storage devices. One of the industry associations working on this is The Trusted Computing Group (TCG). Opal is the name of a specification related to self-encrypting drives, which has been developed by the TCG. Opal has some useful benefits, but also some significant problems, which are resolved or ameliorated by the integration of the F+ Storage Firewall and support system technology.

An Opal drive is a self-contained, stand-alone HDD or SSD that conforms to the TCG Opal standard. The drive is always encrypted but may or may not be locked. In addition to the standard components of a drive, an Opal drive will contain extra components such as an onboard cryptographic processor that perform all of the necessary encryption and decryption of data on the drive itself.

The Opal drive is a type of Self-Encrypting Drive (SED). It is not the only type of SED; there are other (proprietary) self-encrypting drive products (designs) in the market.

The primary Opal threat model use case is lost or theft of computers and drives.

This is the same threat model as other encryption technologies such as software Full Disk Encryption (FDE) and is designed for protection of data at rest.

There are multiple versions of the Opal Standard. The current standard is Version 1.0. The TCG is currently discussing version 2.0 but that has not been ratified, nor are version 2.0 drives in production (as of the date this is written, 2012).

The Opal specification can be found on the web at http://www.trustedcomputinggroup.org/resources/tcg_storage_security_subsystem_class_opal_version_100_revision_200, or at http://www.trustedcomputinggroup.org/files/static_page_files/B66DB2-36-1D09-3519-ADD7E75C7216311D/Opal_SSC_1.00_rev2.00-Final.pdf Opal Goals The TCG specification (Version 1.00, Revision 2.00) defines Opal goals as:

"The Storage Workgroup specifications provide a comprehensive architecture for putting Storage Devices under policy control as determined by the trusted platform host, the capabilities of the Storage Device to conform with the policies of the trusted platform, and the lifecycle state of the Storage Device as a Trusted Peripheral."

Goals for Opal include:

Drive level security,

Simplicity.

These enable (or are supported by):

Simplified management,

Robust security,

Compliance with national and state "safe harbor" laws,

Scalable because no obstacles exist to massive arrays, etc.,

Interoperable with existing systems, older disks, etc.,

Integrated with management systems, etc., and

Transparent (to the operating system, applications, etc.).

Opal Basics

From experience, the storage security community has learned that storage security requires both storage device locking and encryption of stored contents:

Locking only is easily hacked (ATA has locking), and

Encryption only does not prevent access to encrypted data, which can be decrypted later by the data thieves.

Opal includes both Locking and Encryption, so attempts to find the right balance of features:

On power off, an Opal drive locks automatically.

On power on, an Opal drive remains LOCKED, until an authentication key (AK), a variety of password, is employed to unlock the drive. When unlocked, unfettered read and write access is permitted.

Opal Advantages

An Opal drive encrypts all data transferred to it transparently to the host. There is assumed to be no performance latency penalty because the encryption engine speed matches the storage interface's max speed, and because the encryption engine is a component of the storage controller.

All stored data is encrypted, so there is no need to determine which data to encrypt. And decryption and re-encryption not required when an Authentication Key (AK) is changed.

As Opal drives are added to a set (perhaps a disk array), encryption performance scales in a linear fashion (without added latency), because each Opal drive has its own encryption engine.

Standardization and the promise of interoperability haves led to support from multiple storage device vendors, multiple file server vendors, and multiple software vendors.

Opal Benefits include:

No Back Doors (assuming we trust the vendor);

No access to an Opal drive access without AK authentication, therefore resistant to unauthorized insider access;

All stored data is always encrypted;

Encryption cannot be turned off by a user;

Encryption is not exposed outside of an Opal drive;

Rapid "erase" of drive, such as by deleting or changing the data encryption key; and On power-off an Opal drive becomes locked, and is therefore presumed secure.

Instant erase is provided by deleting the data encryption key (DEK), the symmetric key used for full disk encryption (FDE). This assumes the drive is sufficiently operable to submit the command; if the drive cannot accept the ERASE command, then it is likely not to permit storage access either, so presumably the data is safe.

The deployment of Opal drives is expected to reduce IT operating expenses and headaches because:

There will no longer be a need (or cost) to overwrite or destroy drives;

Drives can be repurposed securely;

Warranty and expired lease returns won't expose data to unauthorized access;

Use of verifiable encryption will provide "safe harbor" for data privacy laws (PCI, HIPAA, other); and Theft of data from loss of unencrypted drives is eliminated because all drives can be managed to activate encryption, therefore all stored data can always be encrypted.

Opal Problems

Opal has a set of structural problems. The following is a list of Opal problems, perhaps not all:

(a) The current Opal specification does not address prohibiting unauthorized access after an Opal drive is unlocked, i.e. protecting the storage contents of an Opal drive while it is "in use", (b) Nor does the current Opal specification address protecting accessed data while that data is "in use" in the host's memory, (c) Opal also does not address protecting data while "in flight" between hosts, (d) There is no way to wear level across drives in an array, and there is no way to move Opal encrypted data from a drive or between drives without decrypting the data. (On the other hand, there is no prevention of a second encryption of some or all data.), (e) Opal Drives and the S3 State: Sleep (Hibernation), Standby, Suspend to RAM (explained below), (f) Opal Performance, Security (explained below), and (g) ERASE Command (explained below).

Opal Drives and the S3 State: Sleep (Hibernation), Standby, Suspend to RAM

S3 is a power state, commonly known as Standby, Sleep (Hibernation), or Suspend to RAM. A system in an S3 state consumes little power, but a previous operational state is available for fast re-activation. While in S3 mode the CPU consumes no power, the RAM is in a slow refresh mode and the power supply is in a reduced power mode.

The problem with S3 and Opal drives is that Opal drives Lock when they are not provided power, and it is difficult to see how to restart the operating system when the Opal drive is Locked and there is no built-in way to Unlock it. As of January 2012, the TCG (the Opal standards body) does not have a common and agreed upon solution to the S3 issue.

There are vendors such as WinMagic (Wave, McAfee, etc.) with drive management application software systems which may resolve the S3 issue for some hosts in combination with some Opal drives.

Opal Performance, Security

It is intended for Opal drives to operate at the same speed as non-Opal drives with the same components. However it is difficult to determine whether runtime access latency is added by the cryptographic processing.

It is also difficult to determine whether a particular Opal drive's encryption engine is functioning as expected. Since there is no alternate path to sample encrypted data, and since the data encryption key can not be retrieved, it is impossible to verify whether the Opal encryption engine has properly encrypted the data.

ERASE Command

The intent of a drive erase operation is to insure that the storage contents cannot be retrieved, that the drive storage media is returned to a randomized state. When an Opal drive receives an ERASE command, the intent is for the data encryption key (DEK) to be is deleted or replaced, thus making it impossible to access previously encrypted data.

Trust in the Opal ERASE command requires one to have sufficient faith in the drive implementation, and in the strength of the encryption to withstand for some period of time novel developments in computation, mathematics, semiconductors, digital architectures, etc. Any attempt to forecast the effect of emerging and currently unknown technologies on the confidentiality of data whose persistent (non-volatile) storage media falls into the hands of hostile parties is, in my opinion, likely to end in the unfortunate situation of not knowing whether (or when) the data's confidentiality has been compromised.

Data Center Evolution and the Storage Device

The prevailing cloud, virtualization and storage architecture technologies are shaping the requirements for next-generation storage devices.

This is an overview of the big picture of the relationships among cloud computing, data center virtualization, software defined storage (SDS), storage systems, and storage devices, including flash storage devices. The evolution of cloud-related data center objectives will drive the requirements for next-generation storage device controllers, including features to support hypervisor integration, parallelism, security, data integrity, etc.

Introduction to Cloud Computing

Cloud computing is a much hyped marketing term for several competing distributed system architectures which attempt to run application software and deliver services based on these applications with a common set of benefits for customers. These customers each share a portion of the cloud computing infrastructure on an as needed basis. The benefits include lower cost, greater uptime reliability, and the ability to rapidly scale application execution both up and down, as demand requires. By sharing the same infrastructure among many customers, many users, the cost of providing the cloud computing service is much lower than if each customer built their own data center with similar uptime reliability and high demand capabilities. These customers would otherwise have to make heavy investments in their own data center or not have access to this level of data center infrastructure. The 'magic' that makes cloud computing possible relies heavily on a set of technologies collectively referred to as virtualization.

Virtualization is a technology that supports the activity of multi-tenanted computers, a type of sharing of computer resources. The term virtualization refers to the creation of a virtual machine that acts like a real computer with an operating system. Software executed on these virtual machines is encapsulated from the underlying operating environment. The host computer is the actual hardware on which the virtualization takes place. The virtual computer is sometimes referred to as a guest computer. The software that creates and manages a virtual machine on the host computer is called a hypervisor.

Cloud computing is built up from the use of virtualization on "server farms", with supporting technologies including distributed fault-tolerant storage resources such as storage arrays, RAID, Network Attached Storage (NAS), etc.

Evolution of the One-Size-Fits-all Cloud

Currently, the one-size-fits-all cloud is being transformed by market pressures. The current cloud approach is for a cloud service provider to force all applications to fit a common set of virtualization technologies and underlying infrastructure.

Cloud infrastructure, especially infrastructure-as-a-service, will increasingly rely on more flexible storage architectures. There are attempts being made to develop more flexible technology for cloud computing infrastructure. This broad category of more flexible storage architectures is sometimes referred to as 'software-defined-storage' (SDS). This is an emerging approach to better utilize storage resources.

This more flexible approach to data center storage architecture will initially improve application performance, but will later be part of the new cloud technology foundation, which will enable next-generation applications, new revenue streams and profitability for the cloud providers and their customers.

Storage Architecture Evolution, Infrastructure-as-a-Service, Software Defined Storage Software defined storage (SDS) can be currently characterized as an attempt to improve performance from flash based storage devices yet still provide management and other functionality.

Current software-defined-storage (SDS) thinking about the ways to apply the faster Flash storage devices:

Take away management latency from the read/write path on storage devices in order to free up performance for applications that both benefit from the fastest possible performance and can handle 'raw' storage access. These include database, ERP, etc.

Then add a comprehensive abstraction layer for storage management, by moving management functionality from the storage device to a new storage appliance layer. This supports data center & cloud computing trends, plus enables the combination of heterogeneous storage such as block mode, object storage, etc., into a single storage set, even from multiple vendors. This means that the enterprise storage device will increasingly be seen as a commodity component, and that the storage appliance layer is available to use as a foundation for infrastructure-as-a-service.

Security

The other side of the problem being solved is security. It is a premise, a foundational belief, that the integrity of data is only as trustworthy as each and every one of the digital system components that have contact with this data. Cloud computing relies on distributed systems technologies where even the location of their data is hidden from most of the owners and users, and where the there must be 100% assurance that data being used (such as in calculations and decisions) has not been tampered with, yet there can not today be 100% assurance that none of the relevant computing and network components have been compromised. This is a significant and costly problem for both customers and cloud vendors: customers because they will keep certain IT operations in their private data processing facilities where they have a greater assurance of security, and cloud vendors because they lose the additional revenue they would have achieved were they able to prove a verifiable level of security including data integrity.

Requirements for Next-Generation Storage Controllers

Requirements for next-generation flash storage device controllers include features such as parallelism, hypervisor integration, etc. based on a logic trail from evolving cloud data center goals.

The commercial success of the emerging next-generation storage controller will be based on characteristics and abilities of the storage controllers' hardware base, as well as evolving requirements of the larger storage and device architecture. Some of these are:

Faster general-purpose (COTS) processors becoming cheaper and faster, suitable for use as storage controller processors, Compliance with new and evolving standards for security such as from the Trusted Computing Group (TCG), the US Department of Commerce National Institute of Standards and Technology (NIST), and other government agencies and industry groups where as these evolve existing infrastructure has to evolve accordingly, Data retention requirements and the costly risk of losing access to archived data as server and data center storage access technologies evolve away from that prevailing when a storage device was manufactured, Rapidly evolving storage access requirements, including compatibility with data center trends such as cloud computing, data center virtualization, and software defined storage (SDS). The Customizable Storage Controllers (CSCs)

The CSC is a set of improvements to the storage controllers on storage devices. These storage devices can be hard disk drives (HDDs), flash drives (UFDs or FDs), and solid state drives (SSDs). These CSC improved storage devices can be used in all of the same use cases (situations and locations) where the unimproved storage devices can be used, but with better performance, greater reliability, etc. CSC improved storage devices can also be used in new use cases, such as new data center storage architectures.

This disclosure focuses attention to SATA storage devices, but the principles and invention can be applied to any storage interface, including networked storage interfaces, including but not limited to Fiber Channel (a network connected storage interface deployed in some data centers).

The earlier parts of the disclosure showed how a F+ Storage Firewall can sit between a host interface and a storage controller, and how the F+ Storage Firewall technology can be integrated seamlessly into a storage controller, but consider: if the storage controller is just a set of one or more software executables, then the F+ Storage Firewall can manage and protect these software executables just as it would any of the contents of the protected storage. And the F+ Storage Firewall support system can be used to manage, maintain, upgrade, monitor, etc. the storage controller executable software. Thus, the CSC can be viewed as an evolutionary step for storage controllers, or as an embodiment of the F+ Storage Firewall.

The most significant differences of the CSC from the Prior Art storage controllers are:

Current data center storage architectures, storage array controllers, and operating systems are forced to conform to the capabilities of the interface type of the storage devices being used. This means that the technologies and operating environment that surround and rely on the storage devices have to be designed around the weaknesses of the current generation of storage controllers A storage architecture that takes advantage of the CSC can adjust the operating configuration and even swap-out the CSC software, in order to make the CSC controlled storage device conform to the requirements of the storage architecture and/or host operating environment. This also means that some or much of the storage interface stack and I/O processing that otherwise would have to be done by the storage architecture can be done by the CSC controlled storage device. And, if the CSC is permitted to communicate with it's peers, then additional functionality is enabled, such as greater parallelism, redundancy, fault tolerance, and even application level functionality such as RAID-like fault tolerance and recovery.

In practical terms, the CSC approach requires the integration of security technologies such as are provided by the F+ Storage Firewall and support system, in order to protect the storage controller executables (Applets, SCAPs, and SCIPs) and therefore to protect the integrity of storage controller operation.

This invention proposes a third approach, where the controller software on the storage device can be customized on an as-needed basis, as frequently as needed, with greater intelligence on the storage devices. This would enable:

larger sets of storage devices to be clustered, with a reduced runtime burden on the storage appliance layer;

ad-hoc sets of storage devices, supporting the flexibility goals of infrastructure-as-a-service;

future inventions of novel storage architectures; and greater security with the integrated F+ Storage Firewall with support system (executable whitelist access control, etc.).

My CSC invention proposed that these improved storage devices can have two controller processors, where one of them is a fast and secure FPGA processor, for fast path storage access, while the other is a single or multi-core processor for storage management, volume management, RAID, snapshots, etc. The F+ Storage Firewall and support system has the right features to manage, monitor, maintain, and protect the customizable storage controller's executable software and configurations, as well as to protect the contents of the storage device.

This is an important area because storage access interfaces are and will be an area of rapid change, and this innovation makes it possible to support not only the current and emerging storage access interfaces (connectors and protocols), but also as-yet undefined storage access interfaces, so long as the physical connectors are compatible.

There are many significant changes being made to the virtualization and storage architecture technologies in use. All of these can derive performance and reliability benefits from customizable storage controllers CSCs integrated into customizable storage devices.

Software Defined Storage and the Storage Controller

The movement towards Software Defined Storage (SDS) in the data center is about:

maximizing data center IT investment by providing for 'pooling' of storage resources, assigning them as needed, automating the provisioning of storage infrastructure and corresponding applications, and improving IT operations (incl. control) through centralized management for 'health', risk, efficiency, and compliance.

There is a corresponding movement towards SDS for smaller servers and on the desktop, as the these computing environments evolve to better coordinate with the rapidly evolving data center and cloud computing environments.

The CSC fits into the SDS scheme by providing a mechanism for SDS centralized management systems to set corresponding and compliant CSC software and configurations into the managed storage devices.

The CSC software can support data center SDS virtualization in several ways. One of these is with multiple defined caches corresponding to the virtual environments, in order to enables a reduction in latency caused by stepping on cache contents, improving performance by reducing the number of times there must be access operations to retrieve frequently accessed data. The specific CSC storage controller adaptations for particular deployment scenarios will include a variety of features necessary for high availability and performance in these deployments.

The update and other support mechanisms already described for the F+ Storage Firewall will continue to be applied to the CSC, leveraging the same distributed management support system.

The customizable storage controller with integrated F+ Storage Firewall (the CSC approach) supports these SDS/Infrastructure-as-a-Service goals by:

Enabling flexibility in storage architecture and driving cloud virtualization into the storage device, and by Securing each component, each storage device, to provide assurance of data integrity as well as system integrity, data confidentiality, and reduced downtime through protection of storage device availability.

The CSC approach will transform SDS as storage architects make use of the new flexibility in storage interface design.

The CSC approach transforms the cloud by improving the ability of cloud architects to define the functionality of storage architectures through to the storage interfaces, data formats, and other storage device functionality on an as-needed basis. Cloud computing storage devices can be as provision-able and modifiable as other aspects of the virtualization foundations of the cloud, with virtualization environments directly supported by compliant (customizable) storage devices.

My CSC invention is described herein above referring to FIGS. 1, 5, 7B, 8A, 8B, 9A, and 9B.

Customizable Storage Controller, Single Processor

FIG. 8A puts the single processor CSC invention in context with a Host computer or other digital system. FIG. 8A contains an illustration of a Customizable Storage Controller with a Single Processor. This CSC is labeled Single Processor CSC 310.

The customizable storage controller Single Processor CSC 310 is an improved version of SSD Controller w/Storage Firewall Components S2 of FIG. 7B.

The Single Processor CSC 310 contains a possibly multi-core SC Processor 314, enough SC RAM 316 to hold the storage controller executable software plus any other desired contents, and the SC Program Store 318, which may employ a portion of the (as shown in FIG. 5) Protected Storage 14, and/or may employ an independent storage element (storage media).

The Single Processor CSC 310 is communicatively coupled over interface 308 to I/O Processor 306, which is a component of Host 300, which is equivalent to Host 204 on FIG. 5.

The Single Processor CSC 310 is integrated with the Storage Media 312 in a manner similar to the integration of SSD Controller w/Storage Firewall Components S2 of FIG. 7B with the one or more of elements S7, S8, and S9 of FIG. 7B.

Customizable Storage Controller, Single Processor, Internals

Figure 8B:
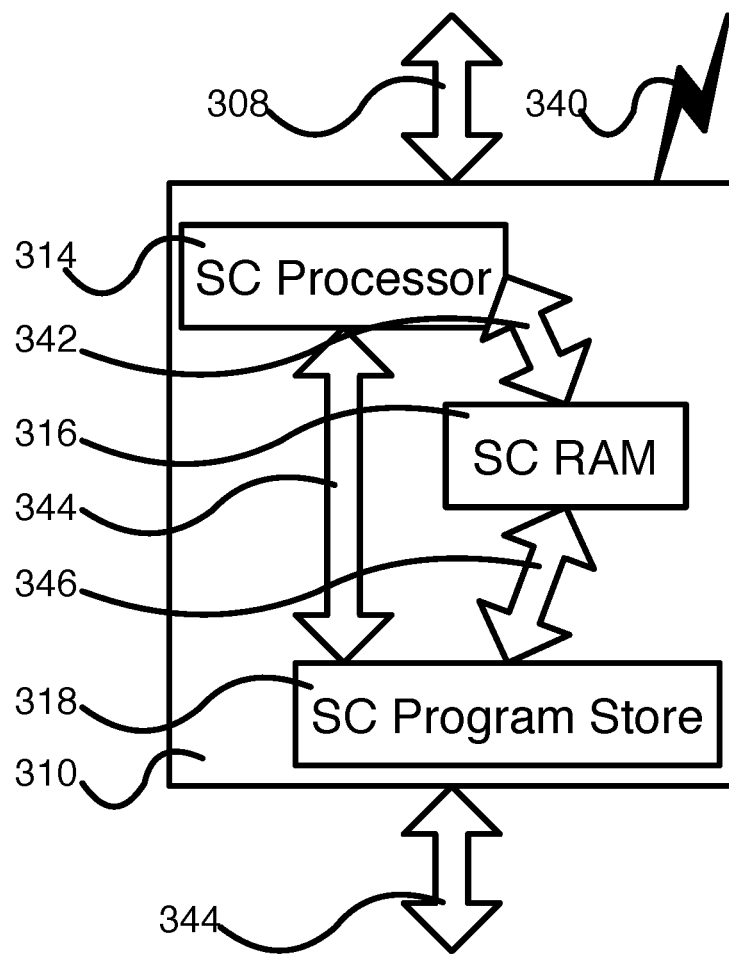
FIG. 8B is a generalized block diagram showing the principal components of the single processor CSC of FIG. 8A.

FIG. 8B illustrates how the components of a simple CSC with single processor are organized.

The Single Processor CSC 310 has the internal block diagram and data path illustrated on FIG. 8B.

The Single Processor CSC 310 has a comparatively simple design. It is basically a simple computer that processes storage access requests, storage device management requests, and other management functionality.

The storage access data path and storage device request queue are not shown. Single Processor CSC 310 is communicatively coupled to the Host over interface 308, and is integrated with the Storage Media 312 over storage media interface 344, which is equivalent to one or more of elements S7, S8, and S9 of FIG. 7B.

On the Single Processor CSC 310, the SC Processor 314 connects to SC RAM 316 over internal bus 342, and connects to SC Program Store 318 over internal bus 344.

The SC Processor 314 may often have several different software executables competing for attention; these will be processing data access requests, managing the request queue (not shown), modifying the contents of the SC Program Store 318, etc.

There is also an internal bus connection 346 between SC RAM 316 and SC Program Store 318, for loading software, runtime swap space, etc.

Customizable Storage Controller with Security Coprocessor

Figure 9A:
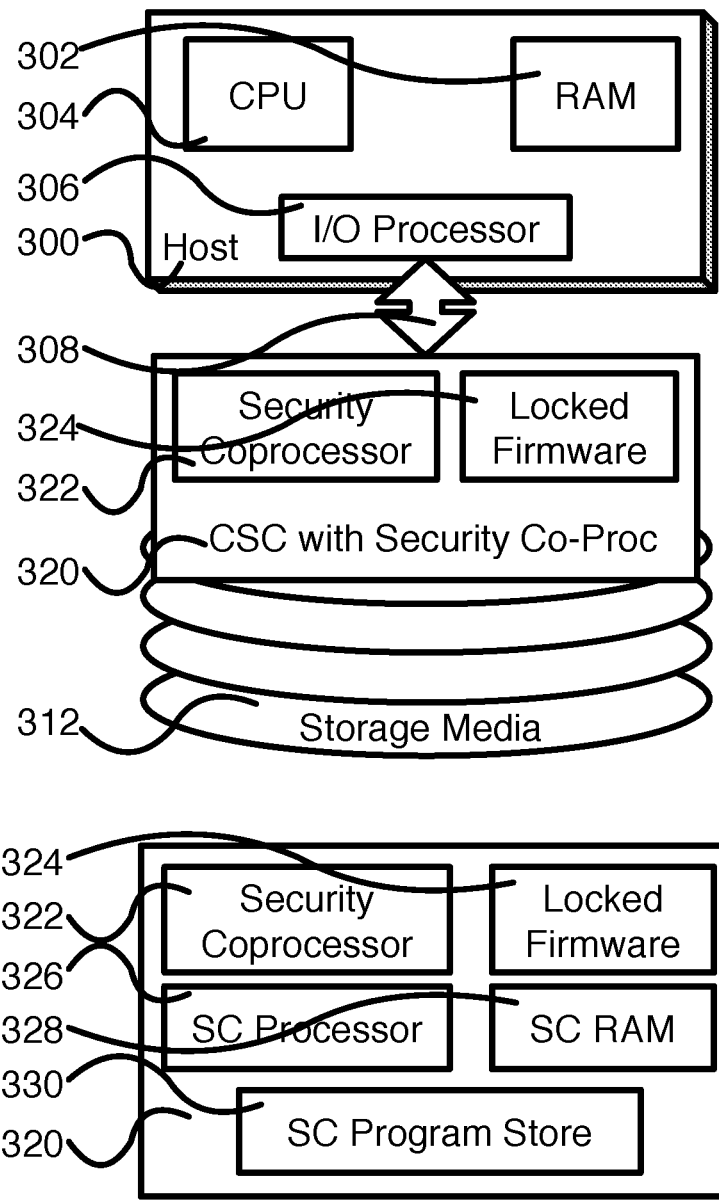
FIG. 9A is an illustration of a customizable storage controller (CSC) having a security coprocessor in accordance with a second embodiment of the present invention.

FIG. 9A puts the improved CSC (customizable storage controller) invention in context with a Host computer or other digital system. FIG. 9A contains an illustration of a Customizable SC with Security Coprocessor. This is labeled CSC with Security Co-Proc 320. The Customizable SC with Security Coprocessor 320 is an improved version of SSD Controller w/Storage Firewall Components S2 of FIG. 7B.

The CSC with Security Co-Proc 320 contains both a possibly multi-core SC Processor 326, and a Security Coprocessor 322, enough SC RAM 328 to hold the storage controller executable software plus any other desired contents, and the SC Program Store 330, which may employ a portion of the (as shown in FIG. 5) Protected Storage 14, and/or may employ an independent storage element (storage media), and Locked Firmware 324 which may employ a portion of the (as shown in FIG. 5) Protected Storage 14, and/or may employ an independent storage element (storage media).

The distinction between the SC Program Store 330 and the Locked Firmware 324 relates to how well protected the contents are to change, which is related to the difficulty of making authorized changes. There is a further implication, but not a requirement, that the Locked Firmware 324 contains functionality that is less likely to change probably because it is composed of lower level atomic operations, as well as a trusted factory approved version of the storage controller software, enabling recovery if there is a problem. In general, but not exclusively, the Security Coprocessor 322 will load its executable software from the Locked Firmware 324, while the SC Processor 326 will load its executable software from the SC Program Store 330.

The storage controller CSC with Security Co-Proc 320 is communicatively coupled over interface 308 to I/O Processor 306, which is a component of Host 300, which is equivalent to Host 204 in FIG. 5.

The storage controller CSC with Security Co-Proc 320 is integrated with the Storage Media 312 in a manner similar to the integration of SSD Controller w/Storage Firewall components S2 of FIG. 7B with one or more of the elements S7, S8, and S9.

Customizable Storage Controller with Security Coprocessor, Internals

Focusing on the storage controller CSC with Security Co-Proc 320, the distinction between the two processors (SC Processor versus Security CoProcessor) includes that the Security Coprocessor 322 protects the customizable storage controller's operations in several ways, while the SC Processor 326 enables and supports the flexibility and extensibility of the customizable storage controller.

One embodiment has the Security Coprocessor 322 performing the storage access operations, including access control aspects of the storage access processes, while the SC Processor 326 performs management functions. The Security Coprocessor 322 may be implemented by an FPGA, perhaps a non-volatile FPGA, for fast processing of storage access requests, as well as other security functions as called by the storage controller software executing on the SC Processor 326.

In the illustrated embodiment, the Security Coprocessor 322 can load software from the Locked Firmware 324 over internal bus 350, but can not write directly to the Locked Firmware 324. The SC Processor 326 can load software into the Locked Firmware 324 over internal bus 356, but can not read directly from the Locked Firmware 324.

The Security Coprocessor 322 is communicatively coupled with the SC Processor 326 over internal bus 354, and is communicatively coupled with SC Program Store 330 over internal bus 352. Not shown, but possible in some embodiments, is a memory segment of SC RAM 328 shared between Security Coprocessor 322 and SC Processor 326 for various purposes such as collaborating on operations.

The SC Processor 326 is communicatively coupled with SC RAM 328 over internal bus 358, and is communicatively coupled with SC Program Store 330 over internal bus 360. SC RAM 328 is communicatively coupled with SC Program Store 330 over internal bus 362.

The SC Processor 326 may often have several different software executables competing for attention; including management of the request queue (not shown), modifying the contents of the SC Program Store 330, etc.

Customizable Storage Controllers (CSCs)

The goal of a Customizable Storage Controller (CSC) is to provide a mechanism for CSC functionality to be modified by manufacturers, integrators, IT data centers (end-user organizations), and others to better meet performance and other metrics.

Customizable storage controllers (CSCs) are an approach to the design of intelligent storage controllers that will provide better performance in the emerging software defined storage (SDS) and virtualization environments.

The controllers are designed with features to introduce parallelism, etc. Also implementing the virtualization entity in controller hides the physical storage complexity. A CSC can therefore be thought of as a software defined storage device controller, a replacement for the more rigidly defined and programmed storage controller approach that has been used up to now. While the description focuses attention on SATA, other storage interface types such as SCSI, SAS, Fiber Channel, etc. can be improved in the same way.

The CSC is a new approach to storage device controller design; post-deployment, CSCs can adapt to current requirements; either new (changed) CSC software, changes to configuration, even new control commands, extensions to the AT command set, even replacements for the AT command set with an entirely different storage access architecture and interface. And if access to the current data on the storage media must be preserved, so long as the new storage controller software supports the current storage media format, there should not be any obstacle to the continued use of this storage device.

CSC Architecture

An improved (more secure) CSC can be designed with a security co-processor and locked firmware, again both with or without the integration of the F+ Storage Firewall. These designs can be implemented with standard parts such as microprocessors and/or FPGAs (Field Programmable Gate Arrays), RAM (Random Access Memory), and some version of nonvolatile memory as a program store.

There are several (i.e. 3) approaches to customizable storage controllers described, each with a corresponding integrated F+ Storage Firewall embodiment. It should be possible to make claims to the several approaches to CSCs as well as to the F+ Storage Firewall integrated into them.

The first is a simple architecture incorporating a storage controller processor, some sort of RAM, and some mechanism to store storage controller software, which may be separate from the storage resource being managed, or may be integrated into the storage resource being managed.

The second adds a security coprocessor and trusted "locked firmware". This can be implemented in several ways, including through the use of a second microprocessor and an EEPROM containing its software. A better approach is to use an FPGA where the processor and its software are combined as the cell (gate) contents.

The key difference between the two versions is the level of security that can be provided by providing a secure startup for the security coprocessor, which itself then provides a secure startup and a hardware 'root of trust' for the storage controller processor.

Another way to design the CSC is using an FPGA or an ASIC for 'storage primitives', i.e. low-level storage operations, to improve performance. In this scheme, the CSC software is more easily changed (updated, augmented, etc.) while the set of storage primitives is not as easily changed or is not change-able. This is the preferred embodiment of the CSC. In this scheme, there is still a secure co-processor, built into the FPGA or ASIC.

In all of these versions (embodiments), the F+ Storage Firewall can be integrated for authentication, etc., to prevent unauthorized access to protected storage contents.

Assume security co-processor can be either a 2nd microprocessor, or separate cores on the same processor, or an FPGA. The preferred embodiment is the use an FPGA as security co-processor combined with a multi-core CSC processor for management and better integration into higher level (external to storage device) storage architectures. As these external storage architectures will continue to evolve, the CSC software can evolve in compatible ways, with changes to the higher performance FPGA software (firmware, IP cores) less frequently. It is possible, and a preferred embodiment, to extend the parallelism of the CSC into the FPGA.

A CSC does not necessarily require replaceable base storage controller software to operate—there are possible ASIC embodiments of the base controller software, but the use of replaceable software simplifies the architecture and deployment. [It is assumed by this description that the operative configuration of an FPGA is a type of software.] An ASIC CSC would be customizable through changes to its configuration, and if permitted, through the addition of plug-in or add-on modules to be executed on an associated coprocessor. There are several possible datapaths and the use of one in an illustration does not prevent the use of others in the same CSC. (The term datapath (as shown in Glossary) is an abstraction for session connections between a server and an endpoint or part of an endpoint. A datapath is implemented over various components such as network interfaces. It consists of an addressing scheme, such as URLs, and a collaboration or data transfer protocol. A datapath can move data between any two identified entities (actors), which may be virtual entities, through as many 'relays' as necessary, and through whatever layers 1 & 2, switching, etc. The datapath is not a 'connection' as it is commonly understood. It is not a circuit; it is a set of components or network nodes passing data (messages) along the best path they know about, so that the data gets closer to where it's going.)

The existing manner of designing SATA and other controllers is generally to single thread storage access operations. The difference of CSC functionality and behavior enabled by the integrated F+ Storage Firewall technology are documented earlier in this disclosure. The F+ Storage Firewall Transaction Processor 20 (as seen in FIG. 5) and other F+ Storage Firewall components are interwoven into the CSC software; it's also fair to say that the CSC software is built on top of the F+ Storage Firewall and support system.

If there is a Security Co-Processor

If present, the use of the Security Coprocessor 322 changes the startup and normal operation of the CSC.

A preferred embodiment of the Security Coprocessor 322 is as an FPGA (Field Programmable Gate Array), where the Locked Firmware 324 can be stored in a persistent store such as Flash, or the FPGA can be a so-called persistent or nonvolatile FPGA. In either case, the FPGA (Security Coprocessor 322) must be loaded with software (firmware) and active before anything else will happen.

The Security Coprocessor 322 probes and initializes hardware resources and the contents of the Locked Firmware 324 during boot. This is about the same as the startup process for the F+ Storage Firewall device 12 illustrated in FIG. 1.

Assuming the Security Coprocessor 322 is implemented by an FPGA, the F+ Storage Firewall state table and transaction processing discussed earlier in this disclosure can be implemented in the FPGA, for improved performance and some resistance to tampering.

Once the Security Coprocessor 322 has verified itself and necessary resources, it verifies the CSC software stored in SC Program Store 330, then loads this software into the CSC processor, SC Processor 326, after which normal operation can start.

Performance

The possible additional latency created by CSC management and other enhanced functionality is avoided through use of an FPGA or ASIC to provide the fastest possible data path, while enabling the CSC SC Processor 326 to provide the flexibility and other benefits of the CSC.

CSCs are a New Approach

This is a new approach, in that post-deployment, CSCs can adapt to current requirements; either new (changed) CSC software, changes to configuration, even new control commands, such as extensions to the AT command set. Also the CSCs can provide benefits such as high availability, scalability, load balancing and failover.

A CSC does not necessarily require replaceable software to operate—there are possible ASIC embodiments, but the use of software simplifies the architecture. [It is assumed by this description that the operative configuration of an FPGA is a type of software.] An ASIC CSC would be customizable through changes to its configuration, and if permitted, through the addition of plug-in or add-on modules.

A Customizable Storage Controller (CSC) can therefore be thought of as a software defined storage device controller, a replacement for the more rigidly defined and programmed storage controller approach that has been used up to now.

The differences from the current storage controllers include that the CSC software will need to be protected from unauthorized modification and that it provides an excellent place to add additional storage management functionality, permitting a better fit for the evolving data center Software Defined Storage and other virtualization trends.

The CSC type of storage controller is a good place to integrate the F+ Storage Firewall storage protection technology, fitting the needs of the CSC as well as protecting stored data from unauthorized access. Another way of looking at this is that the F+ Storage Firewall concept can be gently expanded to support the management and support of CSC software executables, or slightly more expanded to become the CSC, with the added benefit of runtime security. This is the approach taken by the preferred embodiment of this invention, which is that the F+ Storage Firewall assumes the role of storage controller, with all of the management, maintenance, upgradeability, and other benefits offered by the F+ Storage Firewall architecture.

The best way to build this F+ Storage Firewall/CSC is to put into a fast processor (presumably an FPGA) functions that benefit from fast performance, and/or that don't change often, and/or that will benefit from parallelism and other FPGA features, and/or other reasons, while operations that change more often or that are of more of an executive management flavor run on a traditional processor. It is possible that this traditional processor is a multicore processor or even a set of traditional processors.

While this description focuses attention on SATA, other storage interface types such as SCSI, SAS, Fiber Channel, etc. can be improved in the same way.

The security co-processor can be either a 2nd microprocessor, or separate cores on the same processor, or an FPGA. The preferred embodiment is the use an FPGA as security co-processor combined with a multi-core CSC processor for management and better integration into higher level (external to storage device) storage architectures. As these external storage architectures will continue to evolve, the CSC software can evolve in compatible ways, with changes to the higher performance FPGA software (firmware, IP cores) less frequently. It is possible, and a preferred embodiment, to extend the parallelism of the CSC into the FPGA.

Overview of AppAccel Invention

Referring now to FIG. 11 of the drawings, an overview depiction of the AppAccel application acceleration system in accordance with the present invention, and referred to herein as the AppAccel invention, or the present AppAccel invention, or the AppAccel Application Acceleration system, or the AppAccel Application Acceleration invention, which is schematically illustrated in block diagram form. FIG. 11 graphically illustrates the relationship between a plurality of Application Servers 401, hosting the Server Hosted Analytics Applications (SHAAS) 407, to a plurality of AppAccel Improved Storage Devices 430, which each contain an AppAccel Improved Storage Controller 403, which then is shown containing Storage Controller Processor 326 and Storage Controller Program Store 330, which components cooperate to host Storage Controller Application Programs (SCAPs). Other elements of the FIG. 11 illustration are the F+ Update Server, and the Network that is employed to tie the elements together into a collaborative system. Also shown are the older generation technology Servers 405 hosting 'Software making storage access requests' 402.

FIG. 11 may be referenced by various parts of the Detailed Description and elsewhere in the disclosure, because it summarizes the invention.

SCAPs are Applets

The AppAccel Improved Storage Devices and System are part a vision where dynamically configurable software-defined datacenters are a sort of ballet or orchestra of moving pieces. Some of these pieces are short-lived software applications; the generic name for these is applets. Much of the operative software on the AppAccel Improved Storage Devices are SCIPs and SCAPs; these are applets.

As depicted in FIG. 11, the F+ AppAccel system includes network interface 308, AppAccel Improved Storage Controller 403, shown containing Storage Controller Processor 326 and Storage Controller Program Store 330, SC Processor 326 shown containing Storage Firewall 12, Operational SCAP 404, and Operational SCIP 415, SC Program Store 330 shown containing F+ SyncLink Embedded 427 and Stored SCAP 409, and Storage Media 312 shown containing Files (Data, etc.) 42, and interface 417 shown connecting AppAccel Improved Storage Controller 403 and Storage Media 312, as components of the AppAccel Improved Storage Device 430. External network interface 308 represents all of the network interface 410, External Interface (NIC, Network Interface Card) 423, and internal interface 416, as shown in FIG. 12. As shown, SC Program Store 330 contains F+ SyncLink Embedded 427, which is the target for messages from the F+ Update Server as regards the SC Program Store 330. It is fair to say that the SC Program Store 330 is built around the F+ SyncLink Embedded 427, which provides the intelligence for managing the contents of the SC Program Store 330. Stored SCAPs 409 and other software are directly managed by F+ SyncLink Embedded 427, which interprets and executes instructions from the F+ Update Server 202. To recapitulate: as illustrated in FIG. 11, datapath 392 reaches the Stored SCAP 409 through the agency of F+ SyncLink Embedded 427.

The AppAccel Improved Storage Device 430 is composed of network interface 308, AppAccel Improved Storage Controller 403, shown containing Storage Controller Processor 326 and Storage Controller Program Store 330, Storage Media 312, and interface 417. Storage Controller Processor 326 is shown containing Storage Firewall 12, Operational SCAP 404 and Operational SCIP 415 (both shown as executing within SC Processor 326). Storage Controller Program Store 330 is shown containing F+ SyncLink Embedded 427 and Stored SCAP 409 (which is directly installed and managed by the F+ SyncLink Embedded 427). Storage Media 312 stores Files (Data, etc.) 42, as well as F+ System components not shown. Interface 417 is shown connecting AppAccel Improved Storage Controller 403 and Storage Media 312.

It is easier to understand the F+ AppAccel system by following the flow of data along datapaths. The term datapath (as shown in Glossary) is an abstraction for session 'connections' between a server and an endpoint or part of an endpoint, as well as for any other simple or complex virtual 'data transfer channel' where some number and various types of software and/or hardware entities are operationally coupled. A datapath is implemented over various components such as network interfaces. It consists of an addressing scheme, such as URLs, and a collaboration or data transfer protocol. A datapath can move data between any two identified entities (actors), which may be virtual entities, through as many 'relays' as necessary, and through whatever layers 1 & 2, switching, etc. The datapath is not a 'connection' as it is commonly understood. It is not a circuit; it is a set of components or network nodes passing data (messages) along the best path they know about, so that the data gets closer to where it's going. AppAccel Improved Storage Devices 430 both contain internal datapaths and interoperate with other parts of the datacenter over and through datapaths.

Datapaths 390, 393, and 392, in common with other datapaths (including those not shown) that connect from an external mechanism into the AppAccel Improved Storage Devices 430, pass through the F+ Storage Firewall 12, even if this is not explicitly mentioned in this specification. The security functionality of the F+ Storage Firewall 12 need not be present or employed if present in order for the AppAccel invention to function. In a preferred embodiment, datapath 393 and other datapaths pass through (must pass through) Transaction Processor 20, part of Storage Firewall 12, in order to go thru F+ StateEngine 28, as shown on various Figures, even if the security functionality of the Storage Firewall 12 has been omitted or disabled. It is possible to construct a less preferred embodiment that is constructed quite a bit differently, omitting the Storage Firewall 12, for example, but with a weaker security posture and probably slower performance. Datapath 393, as shown on FIG. 11, is composed of datapaths 399 and 432 as shown on FIG. 15. Datapath 399 moves messages between the SHAA 407 (Server Hosted Analytics Application) and the F+ State Engine 28, which is shown as a part of the SC Processor 326. Datapath 432 is shown to move messages between the F+State Engine 28 and the Operational SCAP 404. Therefore, datapath 393 functions to move messages between the SHAA 407 and the Operational SCAP 404 as it executes on the SC Processor 326.

As diagrammed in FIG. 11 (Overview of AppAccel Invention), supporting the functionality of AppAccel Improved Storage Devices 430 are datapaths 390, 392, and 393. Datapath 393 connects Server Hosted Analytics Applications (SHAAs) 407 executing on Application Servers 401 with Operational SCAP 404 executing on SC Processor 326, which is part of the AppAccel Improved Storage Devices 430. Datapath 390, similarly, connects 'Software making storage access requests' 402 executing on 'Servers' 405 with Operational SCIPs executing on SC Processor 326. And datapath 392 connects the F+ Update Server 202 to Stored SCAP 409 shown as stored on SC Program Store 330, though when the system starts there may not yet be a Stored SCAP 409 installed to a particular AppAccel Improved Storage Device 430. The actions of these datapaths are illustrated by FIGS. 13, 14, and 15.

As shown in FIG. 14 (Installation and Management of SCAP) and as shown in FIG. 15 (Initiate SCAP Execution), datapath 392 is operationally assembled from datapaths 394, 395, 396, and 397, into the Stored SCAP 409. Datapaths 395 and 396 are implemented over and through CSC internal interfaces such as, but not limited to, 354 and 360, processors SC Security Coprocessor 322 and SC Processor 326 hosting (executing) F+ SyncLink modules 428 and 34 respectively, as well as F+ SyncLink Embedded 427 located within the SC Program Store 330. Datapath 397 is implemented within the SC Program Store as part of the design and coding of SyncLink Embedded 427.

Datapath 394, shown in FIG. 14 (Installation and Management of SCAP), and FIG. 15 (Initiate SCAP Execution), is implemented over and through CSC external network interface 308, Network 206, network link 408, to F+ Update Server 202.

As shown in FIG. 11, datapath 393 carries the two way communication (interaction) between a SHAA 407 executing on one or more Application Servers 401 to Operational SCAPs 404 provisioned to (executing on) AppAccel Improved Storage Devices 430. The Operational SCAPs 404 are able to access (read, write, etc.) Files (Data, etc.) 42 resident on the Storage Media 312 on the same AppAccel Improved Storage Devices 430, as peers of the Operational SCIPs 415 if any are present. Both SHAAs and other server hosted software (such as 'Software making storage access requests' 402 running on Servers 405) can employ Operational SCIPs 415 for data access, while the Operational SCAPs 404 provide storage device-resident algorithmic functionality.

As illustrated in FIG. 11, the AppAccel Improved Storage Device 430 is shown connected to the Network 206 by network interface 308. The illustrated network interface 308 provides an interface between the Network 206 and the AppAccel Improved Storage Device 430. Network interface 308 represents (employs) all of the network interface 410, External Interface (NIC, Network Interface Card) 423, and internal interface 416, as shown in FIG. 12. Network interface 308 carries (is employed for) datapaths 390, 392, and 393, as well as others not shown.

Further illustrated in FIG. 11, the Analytics Applications 407 hosted by (executing on) the Application Servers 401 are operationally coupled to the Operational SCAP 404 over and through datapath 393. The Application Servers 401 are shown connected to the Network 206 by network interface 406. The datapath 393 (virtual connection) between the Analytics Applications 407 hosted by (executing on) the Application Servers 401 and the Operational SCAP 404 is by way of network interface 406, Network 206, and network interface 308.

Further illustrated in FIG. 11, the F+ Update Server 202 is operationally coupled to (installs and manages) the Stored SCAP 409. The F+ Update Server 202 is connected to the Network 206 by a network interface 408. The datapath 392 (virtual connection) between the F+ Update Server 202 and the Stored SCAP 409 is by way of network interface 408, Network 206, and network interface 308.

The Analytics Applications 407 hosted by (executing on) the Application Servers 401 are operationally coupled to the F+ Update Server 202 for the purpose of storing a SCAP Applet at the F+ Update Server 202 (in a catalog of such stored SCAP Applets, not shown in the illustration) prior to installation by the F+ Update Server 202 on the AppAccel Improved Storage Device 430. The datapath 391 (virtual connection) between the Analytics Applications 407 hosted by (executing on) the Application Servers 401 and the F+ Update Server 202 is by way of network interface 406, Network 206, and network interface 408.

In FIG. 11, Servers 405 hosting Software making storage access requests' 402 is illustrated to demonstrate a contrast to the Application Servers 401 which host Analytics Applications 407. The Software making storage access requests' 402 hosted by Servers 405, is shown for comparison purposes. There is a datapath 390 between Software making storage access requests' 402 and Operational SCIP 415.

As diagrammed in FIG. 11, the datapath 393 between the running Server-hosted Analytics Application 407 to the Operational SCAP 404 is the key to the value of the present AppAccel invention. The rest of the present invention is for creating, deploying, initiating, maintaining, securing, and otherwise creating conditions for the success of the algorithmic collaboration supported by this datapath, much of which is provided by leveraging the base F+ Storage Firewall and Support System invention.

FIG. 12 shows the Storage Firewall 12 inside the SC Processor 326. FIGS. 14 and 15 show SyncLink 34 inside (as part of) SC Processor 326, and FIG. 15 shows the F+ StateEngine 28 inside (as part of) SC Processor 326 as well. They are shown as part of the SC Processor 326 because they are part of the Storage Firewall 12, which is part of the SC Processor 326 chip or are embodied as software running on the SC Processor 326.

In summary, the present invention illustrated in FIG. 11 may be referred to as an application acceleration system for accelerating the execution of server-hosted analytics application software (SHAAs) through the use of execution-parallelism and through encapsulating dataset-aware portions of the SHAAs' Algorithms as Storage Controller Application Programs (SCAPs) executing in close proximity to stored SHAA-relevant data. As depicted in FIG. 11, the system is composed of:

(A) a plurality of improved storage devices 430, each including:

(1) an interface 308 for coupling each of the improved storage devices 430 to a plurality of host computers 401/405/202, (2) a storage media component 312 for storing datasets to be analyzed and/or amended, and (3) an improved storage controller 403 operatively associated with the storage media component 312, and including:

(a) a storage controller program store 330 for storing multiple SCAPs and other software, and for enabling the stored SCAPs/software to start to execute, and (b) a storage controller processor 326 operatively associated with the storage controller program store 330, and for dynamically executing the SCAPs/software, the storage controller processor 326 further being capable of interoperating with other digital systems including host computers and servers, such that the SCAPs/software are supported to communicatively collaborate with the SHAAs 407 to accelerate execution of the SHAAs' Algorithms;

(B) a plurality of Application Servers 401 communicatively coupled to the plurality of improved storage devices 430 and operative to host a plurality of SHAAs 407, the SHAAs 407 being configured to communicatively collaborate with portions of the SHAAs' Algorithms, encapsulated as SCAPs, which are hosted and executing on the improved storage devices 430; and (C) an F+ Update Server 202 for provisioning and managing the SCAPs via a Network 206 or other communications link operatively interlinking the Application Servers 401, the F+ Update Server 202, and the improved storage devices 430, the F+ Update Server being further operative to receive requests from a SHAA 407 for encapsulation and execution of portions of the SHAAs' Algorithms such that the SCAPs 409 can be installed and/or caused to start to execute on one or more of the improved storage devices 430, and can be configured to interoperate with the SHAAs 407, can be configured for execution proximate to the datasets 42 stored on the storage media component 312, and can be configured for authentication on the improved storage device 430, thereby resulting in reduced network and storage queue latencies, and accelerated execution of the SHAAs.

AppAccel Software Architecture and Execution Environment

Referring now to FIG. 12 of the drawings, a data storage device controller system software execution environment in accordance with the present invention, and referred to herein as the AppAccel invention, or the AppAccel improvements to storage device controllers, or AppAccel Improved Storage Controller, is schematically illustrated in block diagram form at 403.

The present AppAccel invention enables the success of application acceleration by defining and providing a stacked set of execution environment components. These component layers enable the clear separation of the external-facing storage access interfaces and application software from the internal-facing media access & management layer.

From the external interface down, as shown in FIG. 12, the stack is:

External Interface (NIC, Network Interface Card) 423 which can be implemented variously as PCIe, Ethernet, FiberChannel, or some combination of these, or some other mechanism for connecting the AppAccel improved storage device to the Network 206.

Storage Access Interface Layer (SAIL) 411 for the operation of Storage Controller Interface Programs (SCIPs) 415 and Storage Controller Application Programs (SCAPs) 404.

Storage Device Binary Interface (SDBI) a common API and runtime ABI for storage access & SCAP 404 execution, provides higher level storage access functionality.

Media Access Layer Interface (*MALI*) 413 provides lower level storage access & data management functionality. Probably implemented as firmware, memory-mapped ASIC or FPGA. Invented for use by SCIPs 415, which require the fastest possible storage access. Common MALI API provided to various SCIPs types and storage interface protocols such as SATA, SAS, etc.

Media Controller Interface (MCI) 414 is expected to be a Flash Controller or similar for other storage technologies.

As depicted in FIG. 12, the system includes network interface 410, External Interface (NIC, Network Interface Card) 423, internal interface 416 between the External Interface 423 and the Storage Access Interface Layer (SAIL) 411, internal interface 421 between Storage Device Binary Interface (SDBI) 412 and Media Access Layer Interface (MALI) 413, and internal interface 422 between MALI 413 and Media Controller Interface (MCI) 414. External network interface 308 as shown in FIG. 11 represents all of the network interface 410, External Interface (NIC, Network Interface Card) 423, and internal interface 416.)

FIG. 12 shows the Transaction Processor 20 inside the SAIL 411, which is running on (or part of) the SC Processor 326. FIGS. 14 and 15 show SyncLink 34 inside (as part of) SC Processor 326, and FIG. 15 shows the F+ StateEngine 28 inside (as part of) SC Processor 326 as well. They can be used as part of the SC Processor 326 because they are part of the Storage Firewall 12, which is part of the SC Processor 326 chip or are embodied as software running on the SC Processor 326.

As depicted in FIG. 12, the Storage Access Interface Layer (SAIL) 411 contains multiple Operational SCAPs 404, as well as multiple SCIPs 415 for comparison purposes. SAIL is an environment for the proper operation of SCAPs 404 and SCIPs 415. In the preferred embodiment, it is expected to run on the SC Processor 326 (assuming the Security Co-Processor embodiment), and be 'memory-resident' in the SC RAM 328, which performs the same function as Working Memory 22 (as shown in FIG. 1 of the base F+ Storage Firewall and Support System).

As illustrated in FIG. 12, there is an internal call interface 418 between Operational SCAPs 404 and the Storage Device Binary Interface (SDBI) 412, an internal call interface 419 between SCIPs 415 and the SDBI 412, and an internal call interface 420 between SCIPs 415 and Media Access Layer Interface (MALI) 413. Note that, as illustrated, SCIPs can make use of the SDBI 412 and can also make direct use of the MALI 413, while SCAPs 404 are expected to use the SDBI 412 for all storage access. While in a particular implementation there may not be mechanisms to prevent SCAPs 404 from using MALI 413 directly, the SDBI 412 is intended to provide a common multi-vendor interface, so that all SCAPs 404 can be expected to operate correctly on all AppAccel improved storage devices.

As depicted in FIG. 12, the Storage Access Interface Layer (SAIL) 411 also contains Transaction Processor 20. The Transaction Processor 20 is a F+ system software module as shown in FIG. 1 of the base F+ Storage Firewall patent disclosure; it contains components such as the State Engine 28, SyncLink 34, Authentication/Authorization 30, and Access Controller 32.

The Storage Access Interface Layer (SAIL) 411 also contains, but not illustrated by FIG. 12, the Application Rights and Credentials 26 and other F+ modules necessary for proper operation.

As depicted in FIG. 12, the Storage Device Binary Interface (SDBI) 412 provides common runtime functionality as well as an interface to the storage access functionality provided by the Media Access Layer Interface (MALI) 413. In the preferred embodiment, it is expected to be accessible to software executing on the SC Processor 326 (assuming the Security Co-Processor embodiment), and be 'memory-resident' in the SC RAM 328, which performs the same function as Working Memory 22 (as shown in FIG. 1 of the base F+ Storage Firewall and Support System).

As depicted in FIG. 12, the Media Access Layer Interface (MALI) 413 can be implemented as software that executes on the SC Processor 326 (assuming the Security Co-Processor embodiment), or as part of the Locked Firmware 324 for execution either on the Security Co-Processor 322 or the SC Processor 326, or can be implemented as part of the Security Co-Processor if this is implemented as an ASIC or FPGA.

As depicted in FIG. 12, the Media Controller Interface (MCI) 414 can be a Flash Controller as shown in FIGS. 7A and 7B, or the MCI can be a different sort of controller technology corresponding to the type of storage media.

The following disclosure material further explains the design illustrated by FIG. 12.

Storage Access Interface Layer (SAIL) 411

Storage Access Interface Layer (SAIL) 411 faces the world external to the AppAccel improved storage device SAIL 411 is the layer that directly supports the storage controller interface programs (SCIPs) application software such as SATA, SAS, K-V, File, etc., and storage controller application programs (SCAPs).

As illustrated by FIG. 12, SAIL 411 interacts with the external world through the storage device's External Interface (NIC, Network Interface Card) 423, which is part of the combination that makes up element external interface 308 as shown in FIG. 11. SAIL is layered over the Storage Device Binary Interface (SDBI) 412 and Media Access Layer Interface (MALI) 413.

The present invention was conceived of in this way:

Since on the AppAccel improved storage devices storage controller software is really application software, SCIPs 415 and other sorts of storage-oriented applications can use the storage controller application interfaces such as SDBI 412 and MALI 413.

The AppAccel improved storage devices permit any authorized block, file or object storage controller software (SCIPs 415), and permit any authorized storage oriented applications (SCAPs) 404. The SCAPs 404 can use the same API/ABIs (SDBI 412 and MALI 413) that SCIPs 415 use.

This means the SCAP 404 applets deployed to the storage device are not calling into a SATA or other SCIP, the applets can directly employ the SDBI 412 and MALI 413 API/ABIs, for faster access to the underlying storage primitives (MCI 414).

The recipe of a standard runtime SDBI 412 API/ABI & common hardware base permits the development of an Open Ecosystem of third party and proprietary SCAPs 404, as well as third party and proprietary SCIPs 415.

Another benefit of the present AppAccel invention is that SCAPs 404 can be designed around the specific organization of the target dataset or with other features, and also that SCIPs 415 can be designed to better fit the design of Server-hosted Applications for more efficient operation (faster performance).

AppAccel Leverages CSC Functionality

The present AppAccel invention is about accelerating the performance of server-hosted applications by running portions of application software on the controller of improved storage devices, leveraging and improving the CSC invention functionality. The application software portions, applets, may run on a new processor added to the storage device controller board; the preferred embodiment disclosed here is for the application software to run on the processor disclosed for the CSC invention. The CSC invention disclosed two preferred embodiments, one with a single processor and one with a security coprocessor.

On CSC Patent FIGS. 8A and 8B, component Single Processor CSC 310 contains component SC Processor 314. While there can be other embodiments, if employing the Single Processor CSC 310, the AppAccel invention components SAIL 411 and Storage SDBI 412 are expected to execute on SC Processor 314. If the Media Access Layer Interface (MALI) 413 is implemented in software, then MALI 413 may also execute on SC Processor 314.

Figure 9B:
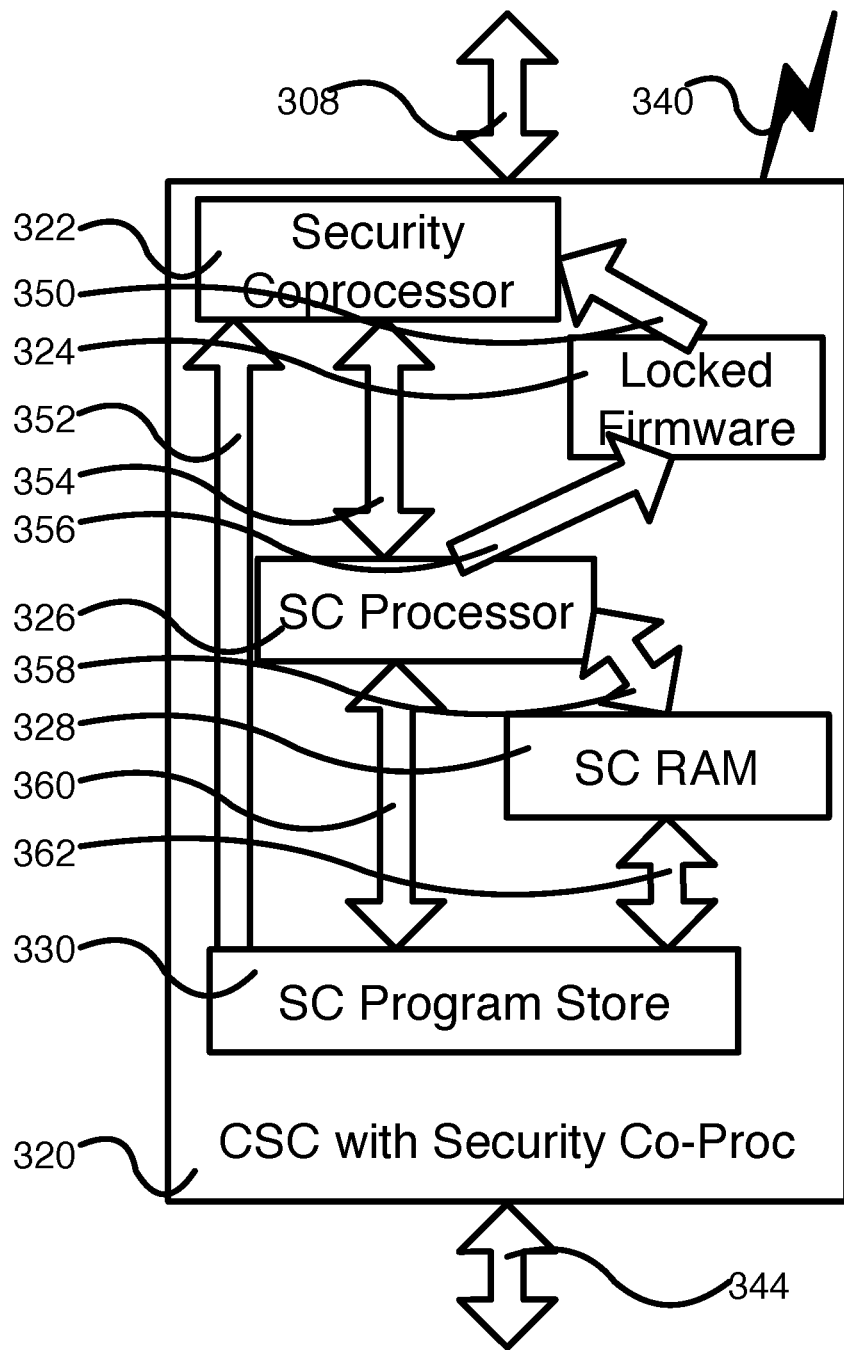
FIG. 9B is a generalized block diagram showing the principal internal components of the second embodiment of FIG. 9A.

On CSC Patent FIGS. 9A and 9B, the storage controller component CSC with Security Co-Processor 320 (shown as CSC with Security Co-Proc 320) contains component SC Processor 326. While there can be other embodiments, if employing the CSC with Security Co-Processor 320, the AppAccel invention components SAIL 411 and Storage SDBI 412 are expected to execute on SC Processor 326. If the Media Access Layer Interface (MALI) 413 is implemented in software, then MALI 413 may also execute on SC Processor 326.

SAIL 411 provides a runtime execution environment for software, both SCAPs 404, and SCIPs 415; Transaction Processor 20 and SyncLink 34 (as shown in base Patent FIG. 5) support the proper operation of SAIL 411, SCAPs 404, and SCIPs 415.

The SCAPs 404 and SCIPs 415 are installed to the AppAccel invention's SC Program Store 330 as illustrated on FIG. 13. On CSC Patent FIGS. 8A and 8B, component Single Processor CSC 310 contains component SC Program Store 318. On CSC Patent FIGS. 9A and 9B, component CSC with Security Co-Processor 320 contains component SC Program Store 330. Depending upon which embodiment is used as the basis for a particular design, either SC Program Store 318 or SC Program Store 330 will be where SyncLink 34 installs and maintains the Stored SCAP 409 and Stored SCIP 415 software. Transaction Processor 20 is what is responds to requests to start, stop, and otherwise control application software running within SAIL 411. This permits the F+ Update Server 202 (as illustrated by FIGS. 11, 14, and 15) to add, update, and configure Stored SCAPs 409 during storage device operation (no downtime required). The F+ Update Server 202 can therefore deploy, provision, update, and configure common applets to run on the shared (standard) ABI and SBI provided by SDBI 412 and MALI 413.

Storage Controller Interface Programs (SCIPs) 415

SCIPs are storage controller interface programs, application software, such as SATA, SAS, K-V, File, etc.

As illustrated by FIG. 12, the Storage Access Interface Layer (SAIL) 411 interacts with the external world through the storage device external interface 308, provided by the combination of the External Interface (NIC, Network Interface Card) 423, network interface 410, and internal interface 416. SAIL 411 is layered over the Storage Device Binary Interface (SDBI) 412 and Media Access Layer Interface (MALI) 413.

On AppAccel improved storage devices the storage controller software, a SCIP 415, is an application that can be installed and managed in the same way as any other application software (SCAP) 404.

The storage devices support SCIPs 415 to be designed to respond to any block, file or object storage interface protocol. SCIPs employ the SDBI 412 and MALI 413 API/ABIs to access storage.

Storage Controller Application Programs (SCAPs) 404

The present AppAccel invention is for programmable storage devices with ability to run multiple SCAPs 404 including data-set-aware search algorithms. The CSC invention, as disclosed in the recently allowed patent, provides per-storage-device secure execution of application software on storage devices (adjacent to the data). This present AppAccel invention builds on the CSC invention with specific improvements. For example, the storage controller component of the present AppAccel invention has a changed name and callout number from the corresponding component of the prior CSC invention. As shown on FIG. 13, the CSC invention's storage controller component's prior label "CSC with Security Co-Processor 320", has been changed in the present AppAccel invention to "AppAccel Improved Storage Controller 403". This is due to improvements in the storage controller approach, especially the introduction of the F+ SyncLink Embedded 427 component of the SC Program Store 330, as shown in FIGS. 11, 14, and 15.

As disclosed by the Provisional (description of FlashApps), and illustrated by FIG. 13, SCAP 404 applets are small pieces of software, callable by Server-hosted Applications 407 using an RPC mechanism. As illustrated by FIG. 15, the RPC call starts a SCAP 404 through the Transaction Processor 20, enabling per access authentication and authorization of each applet activation and management request.

The CIP#2 CSC disclosure defined the CSC-internal software environment as employing a state table where state transitions have the ability to activate (start the operation of) software modules, often to make use of specific storage access functionality. This can be used in various ways, one of which is start or control separate software programs, which can be either separate (heavyweight) processes, or lightweight threads, or fast returning subroutines, or some other process/thread variant, as supported by the specific implementation. The point is that the state table contains links to software, with no CSC-architecture imposed limit on the nature of this software. The present AppAccel invention makes use of this state table, with the improvement of greater size and the consequent ability to store and execute a more complex state transition set.

The present AppAccel invention includes support for SCAPs 404 to have per dataset search algorithms, corresponding (customized for) particular attributes of the dataset (and even subsets of the dataset), as well as to run close to the dataset on AppAccel improved storage devices. This is employed by the example illustrated by the FIG. 16 flowchart.

A SCAP 404 deployed to an AppAccel improved storage device can be built with a bespoke search algorithm per dataset and per storage device, as well as a proprietary interface to the Server-hosted Analytics Application 407.

The responsibility for locating relevant datasets falls to the Server-hosted Analytics Application 407; it will likely employ existing index mechanisms.

The Server-hosted Analytics Application 407 has to know about the structure of the dataset on each storage device, whether datasets span storage devices (volumes) so that the correct SCAP Applet is provisioned, with the correct parameters. This is the responsibility of the Server-hosted Analytics Application 407, or its programmer, with perhaps the use of information obtained from a dataset indexing mechanism.

From the perspective of the CSC or AppAccel improved storage device, the configuration of deployed software will change to meet the requirements of the Server-hosted Analytics Application(s) 407 employing it.

Difference Between SCAPs and SCIPs

SCIPs 415 and SCAPs 404 are different. Though they make use of many of the same mechanisms, SCIPs 415 generally conform to and serve standard and other agreed upon (published) storage device interface protocols, and while SCAPs 404 can be part of standard Application frameworks, SCAPs 404 are usually communicated with using non-blocking Secure RPC, possibly overlaid with a customized proprietary application interface protocol, and run as application-defined software at the storage device level of the larger architecture, where this 'application definition' of functionality and communications interface is defined by the requirements of the Server-hosted Analytics Application 407.

SCIPs 415 are expected to support as many server storage requests as are received, with replies sent as quickly as possible, in a well defined order (usually FIFO perhaps modified by commands embedded in the SCIP 415 protocol) for measurable IOPS (Input/output operations per second) and latency performance, while SCAPs 404 are part of application execution frameworks where immediate replies are not expected since time will be spent determining the correct reply.

Other differences, on a per SCIP 415 and per SCAP 404 basis, may include different prioritization, interrupt settings, and event handlers. And other differences may depend on the types of SCIPs 415 and SCAPs 404, so while there is much overlap at the architectural level, the differences in intent result in differences in design.

One specific difference is that while both SCIPs 415 and SCAPs 404 can access Storage Device Binary Interface (SDBI) 412, SCIPs 415 are expected to employ Media Access Layer Interface (MALI) 413 directly for faster storage access, while SCAPs should use SDBI 412.

Storage Device Binary Interface (SDBI) 412

Storage Device Binary Interface (SDBI) 412 is software that provides a common applet runtime library and storage access interface (one or more libraries) between SCAPs 404 (and SCIPs 415) and the storage functionality of the storage device.

One of the SDBI 412 features is to abstract the storage access as seen by the application software from the media access layer in order to facilitate the development of SCAPs. The storage access layer is software (a runtime accessible storage interface implementation) that uses the Media Access Layer Interface (MALI) 413 component to access storage device media (contents).

The intent is for SDBI to have multi-vendor support across storage product lines, to promote the development of an ecosystem of third party ISVs (independent software vendors) and IHVs (independent hardware vendors). It is expected that there will many SCAPs written by many ISVs, as well as by end user organizations.

The SDBI 412 runs on the SC Processor. Depending upon which CSC invention embodiment is used as the basis for a particular AppAccel invention design, either SC Processor 314 or SC Processor 326 will be where SDBI is employed by application software, and SC Program Store 318 or SC Program Store 330 will be where SyncLink 34 installs and maintains the software.

There may be multiple SDBI implementations, from multiple software vendors, able to run on any of the compliant hardware because of the common Media Access Layer Interface (MALI) 413 API/SBI.

Media Access Layer Interface (MALI) 413

MALI provides storage access & management functionality. The functionality provided is that required for SCIPs 415 to access storage efficiently. These are common storage access functions, suitable for block, file, and object SCIPs 415. The implementation is likely to be firmware, or ASIC or FPGA functions.

MALI 413 may run as software on the SC Processor 326 or may be memory mapped to off processor ASIC or FPGA; probably a combination of these. If MALI 413 is implemented in software it will likely run on the same AppAccel invention processor as the AppAccel components Storage Access Interface Layer (SAIL) 411 and Storage Device Binary Interface (SDBI) 412, managed in the same way as SDBI 412.

In a preferred embodiment, the storage controller as a whole, both SCIP 415 and other components, should be a combination of FPGA for storage access operations that require performance (parallelism, etc.), and another (non-FPGA) processor, possibly multi-core, for other functions. And, of course, both virtualization-support and security should be built into the AppAccel improved storage device.

MALI 413 was designed for the CSC (Customizable Storage Controller) invention. The CSC and this present AppAccel inventions' MALI 413 is derived from, draws heavily upon, and is a superset of, the NVMe (NVM Express) standard.

There are useful overviews and specifications available from the NVM Express organization http://www.nvmexpress.org. One of these is http://www.nvmexpress.org/wp-content/uploads/NVM_Express_1_2_1_Gold_20160-603.pdf The MALI 413 specification and architecture support the development of MALI 431 implementations from multiple vendors. Each MALI 413 implementation may work only on the specific hardware it is designed for. MALI 413 supports the development of shared SDBI 412 implementations from multiple software vendors, enabled by the common MALI API/SBI.

Media Controller Interface (MCI) 414

Media Controller Interface (MCI) 414 is the storage media facing interface, or link to storage media; this is shown in CSC Patent FIGS. 8B and 9B as interface component 344. The MCI 414 connects MALI 413 to the storage media component of the AppAccel improved storage device.

The SCAP 404 never directly interacts with MCI 414, yet the design of this interface affects the performance of the whole AppAccel architecture because of the effect on the Media Access Layer Interface (MALI) 412.

SCAP 404 Deployment & Management by F+ Update Server 202

The F+ Storage Firewall Transaction Processor 20 (as seen in FIG. 5) other F+ Storage Firewall components, and the CSC invention improvements are woven into the AppAccel invention.

FIGS. 13, 14, and 15 were derived from FIG. 9B of the currently allowed Customizable Storage Controller (CSC) disclosure. The FIG. 9B description should be read here as unchanged. The present AppAccel invention elements were added to the previous CSC invention.

As shown in FIGS. 11, 14, and 15, the F+ Update Server 202 deploys the Stored SCAP 409 to the SC Program Store 330, with complete F+ Update Server 202 management & update functionality.

Referring now to FIG. 14 of the drawings, an illustration of the installation and management of SCAPs on a storage device controller system in accordance with the present invention, and referred to herein as the AppAccel invention, or AppAccel Improved Storage Controller, is schematically illustrated in block diagram form at 403, showing datapath 392 from F+ Update Server to Stored SCAP 409, composed of a combination of datapaths 394, 395, 396, and 397.

As shown in FIG. 14, the F+ SyncLink module 428 in the SC Security Coprocessor 322 has been changed from the corresponding SyncLink module in the CSC invention; the changes relate to the deployment of SCAPs. The F+ SyncLink module 428 in the SC Security Coprocessor 322 is reached by a datapath 394 from the F+ Update Server 202, over network interface 408, Network 206, and external network interface 308. External network interface 308 represents all of the network interface 410, External Interface (NIC, Network Interface Card) 423, and internal interface 416.

As shown in FIG. 14, the F+ SyncLink module 34, running on the SC Processor 326, is unchanged. This is reached by a datapath from F+ SyncLink module 428 which passes through internal interface 354. F+ SyncLink module 34 is part of Transaction Processor 20, and relies on other components of Transaction Processor 20 (State Engine 28, Authentication/Authorization 30, and Access Controller 32) to verify SCAPs 409 to be stored in the SC Program Store 330.

There is a datapath 396 between F+ SyncLink module 34 and a new component F+ SyncLink Embedded 427, shown in FIG. 14 as part of the SC Program Store 330; this datapath 396 passes through internal interface 360. SCAPs 409 are verified before they are stored in the SC Program Store 330.

F+ SyncLink Embedded 427 is a new component of the SC Program Store 330. This can be implemented as software, firmware, FPGA gates, a portion of an ASIC, or some other implementation. F+ SyncLink Embedded 427 performs the function of interacting with the F+ Update System 202 and the various other F+ SyncLink modules and of writing/reading/making changes (and other functions) to Stored SCAPs 409 and other software.

As illustrated by FIG. 14, Stored SCAP 409 can be seen in the SC Program Store 330. Stored SCAP 409 is deployed to the SC Program Store 330 by means of the F+ Update Server 202 employing the datapath 392 to the F+ SyncLink Embedded 427 to copy the Stored SCAP 409 to storage media of SC Program Store 330.

SCAP 404 Creation

SCAP applets have to be created. There will be many; the F+ Update Server 202 is designed to manage the complexity. The Server-hosted Application 407 has to keep track of which it needs to use.

A new SCAP 404 can either be newly designed and written software, or an excerpted portion of a Server-hosted Application 407. Customary software development tools should work. A complication is in knowing the runtime operating system, C lib, etc. The AppAccel prototypes are generally written for Free RTOS. There may have to be guidance from the manufacturer/vendor of the specific storage devices as to which operating system, etc. Assume the C language is supported; other languages are possible.

From a performance perspective, it is best if SCAPs 404 incorporate knowledge of the dataset being accessed or operated on, so that they correspond to these datasets and can be deployed accordingly.

Another sort of SCAP 404 can be more generic, without this dataset specific coding; these can be written to discern the structure of the data at runtime. The value of generic SCAPs 404 is that if the employing server-hosted application does not know the dataset structure (or if there is no structure), or if there is not a corresponding SCAP 404, then a generic SCAP 404 can fill the need.

As mentioned above, one way to write useful application-aware SCAPs 404 is to excerpt key elements from storage facing portions of an existing Server-hosted Application 407. The objective is to modify the Server-hosted Application 407 software to extract the dataset-accessing core subroutine loops. These are then packaged as SCAPs 404 for deployment onto the AppAccel improved storage devices that correspond to the datasets they are designed to access.

As disclosed above, the SCAPs 404 can use a common SDBI 412 API/ABI that was designed for their use. This means that SCAPs 404 deployed to an AppAccel improved storage device are not calling into a SATA or other SCIP; the SCAPs 404 can employ the SDBI 412 API/ABI, for faster access to the underlying storage media.

The AppAccel improved storage devices are open in the sense they permit any authorized SCAPs 404, from any vendor. The recipe of a standard runtime API/ABI permits the development of an Open Ecosystem of third party and proprietary SCAPs 404 (as well as third party and proprietary SCIPs 415). Multiple SCAPs 404 can be deployed to run on the same storage hardware at the same time. This supports the open ecosystem of third party SCAPs 404.

SCAPs 404 into the F+ Update Server

The F+ Update Server 202 is designed to deploy and manage software into devices. The present AppAccel invention employs this functionality for the deployment and management of SCAPs to AppAccel improved storage devices.

SCAPs 404 can be loaded into the F+ Update Server's 202 catalog of deployable software, with information on each SCAP 404 added to the F+ Configuration Database 210, a component of the F+ Update Server 202.

How Server-Hosted Applications 407 Call SCAPs 404

FIGS. 13, 14, and 15 were derived from FIG. 9B of the currently allowed Customizable Storage Controller (CSC) disclosure. The FIG. 9B description should be read here as unchanged. The present AppAccel invention elements were added to the previous CSC invention.

Referring now to FIG. 16 of the drawings, a flowchart of an algorithmic collaboration between a SHAA 407 executing on Application Servers 401 and SCAPs 404 executing on AppAccel Improved Storage Devices 430, in accordance with the present invention, which is referred to herein as the present AppAccel invention, or the AppAccel Application Acceleration system, or the AppAccel Application Acceleration invention. This flowchart shows a search algorithm encapsulated into an Operational SCAP 404 hosted and executing on a AppAccel Improved Storage Device 430 iteratively collaborating with a corresponding Server Hosted Analytics Software (SHAA) 407 hosted and executing on an Application Server 401. This SCAP may be hosted and executing on more than one improved storage device, where the SHAA identifies these storage devices to the F+ Update Server 202 for provisioning and management, then communicatively collaborates with these SCAPs until the SHAA's algorithm has completed its operation.

FIG. 16 is a high level flowchart of the process method used to accelerate a Server-hosted Analytics Application (SHAA) 407. The method for Accelerated Analytics first determines which AppAccel improved storage devices to search (probably using an index or directory of some sort), then deploys the appropriate Operational SCAPs 404 to each of the determined AppAccel improved storage devices, then receives the results for joins and compares (merging, reducing, ranking, etc.).

If an Operational SCAP 404, on one or more AppAccel improved storage devices, was sent parameters requesting a repeated (perhaps continuous) search, there will be intermediate results sent back to the Server-hosted Analytics Application (SHAA). This could be useful if there is data streaming onto those AppAccel improved storage devices, or for other purposes.

Referring now to FIG. 16 (Server Hosted Analytics Application (SHAA) using SCAPS to parallel search multiple storage devices): this is an example of multi-haystack search, a building block of Big Data Analytics and Cognitive Computing. This is one of the ways the present invention can be applied, with many other more complex interactions possible.

FIG. 16 provides one of several preferred embodiment search algorithm archetypes or design patterns. The correlation between FIG. 16 and FIG. 11, FIG. 12, FIG. 13, FIG. 14, and FIG. 15 can be shown through a description of which datapath(s) on which Figures is/are used for each step of the FIG. 16 flowcharted algorithm.

It is easier to understand the AppAccel Application Acceleration system by following the flow of data along datapaths. The term datapath (as shown in Glossary) is an abstraction for session connections between a server and an endpoint or part of an endpoint. A datapath is implemented over various components such as network interfaces. It consists of an addressing scheme, such as URLs, and a collaboration or data transfer protocol. A datapath can move data between any two identified entities (actors), which may be virtual entities, through as many 'relays' as necessary, and through whatever layers 1 & 2, switching, etc. The datapath is not a 'connection' as it is commonly understood. It is not a circuit; it is a set of components or network nodes passing data (messages) along the best path they know about, so that the data gets closer to where it's going. AppAccel Improved Storage Devices 430 both contain internal datapaths and interoperate with other parts of the datacenter over and through datapaths.

As can be seen in FIG. 16, after the SHAA starts the next step is the setup of the algorithm. This is also the top or start of what should be regarded as a "loop" of searching that may have different search parameters on each iteration of the loop.

As can be further seen in FIG. 16, the SHAA-SCAP search loop starts with determining which storage devices to search then employs the F+ Update Server 202 to provision the appropriate SCAP. As can be seen on FIG. 11 (Overview of AppAccel Invention) and FIG. 15 (Initiate SCAP Execution), datapath 391 links the SHAA 407 and F+ Update Server 202. Datapath 391 is implemented over network link 406, Network 206, and network link 408.

The SCAP selected by the F+ Update Server 202 for a particular storage device must correspond to the requirements of the SHAA 407, and the selected storage device, and possibly the dataset on that storage device. The selection or (dynamic) generation of the appropriate SCAP can be done by either the SHAA 407 or the F+ Update Server 202 or some other mechanism, with the SHAA 407 provided with information on the currently installed SCAPs and SCAPs available to be deployed.

The F+ Update Server 202 installs the appropriate Stored SCAP 409 if it is not already installed or provisioned, then provides some or all of the required operational configuration to the Stored SCAP 409. As shown in FIG. 11, datapath 392 is employed by the F+ Update Server 202 to install and manage (provision and configure) Stored SCAP 409.

As can be further seen in FIG. 16, The SHAA 407 (or an agent mechanism representing the SHAA) communicates with each of the provisioned and executing SCAPs 404, to provide the current search parameters. As shown in FIG. 11 (Overview of AppAccel Invention), datapath 393 carries the two way communication (interaction) between a SHAA 407 executing on one or more Application Servers 401 to Operational SCAPs 404 provisioned to (executing on) AppAccel Improved Storage Devices 430. The Operational SCAPs 404 are able to access (read, write, etc.) Files (Data, etc.) 42 resident on the Storage Media 312 on the same AppAccel Improved Storage Devices 430. Datapath 393 passes through F+ Storage Firewall functionality, components such as the Transaction Processor 20, which contains the F+ SyncLink 34 and F+ StateEngine 28, and as well as other components, as shown by FIG. 1 of base patent.

As can be further seen in FIG. 16, the resulting (post search parameter) interaction between the SHAA and the SCAP can be simple or complex. At some point in time, after searching their storage devices, all SCAPs will have completed and reported to the SHAA. As is further shown in the FIG. 16 flowcharted algorithm, the SHAA waits for all SCAP results then does the joins, compares, etc. (i.e. the HADOOP or similar map reduce step) to produce a report for the human operator, who may decide to rerun the search with different search parameters, which perhaps causes the search to be of different storage devices or even a very different search. This FIG. 16 example search algorithm, one of the preferred embodiments, is both simple and powerful.

Referring now to FIG. 13 (Analytics to SCAP Interaction) of the drawings, depicting elements of an improved storage device controller, illustrating collaborative communication of the SHAA 407 and SCAP 404, in accordance with the present invention, and referred to herein as the AppAccel invention, or AppAccel Improved Storage Controller, is schematically illustrated in block diagram form at 403.

Stored SCAPS 409/Operational SCAPs 404 are (generally small) pieces of software, "called" using a RPC (remote procedure call) mechanism, in a non-blocking manner.

A SCAP 404 is 'called' by a Server Application through the non-blocking use of the standard Secure RPC protocol plus whatever additional interface protocol enhancements' are layered on top of the standard Secure RPC layer. These AppAccel and/or 3rd party and/or end-user defined enhancements are likely to include mechanisms (functionality) for entity identification, authentication, authorization, encryption key management, communication session encryption, etc. Each of these can leverage the F+ system version if available or employ some other approach. Multiple third party solutions are expected to be available for this purpose.

As shown in FIG. 13, Analytics Applications 407, hosted by Application Servers 401, reaches Operational SCAP 404 over a datapath which passes through network interface 406, Network 206, external network interface 308, SC Security Coprocessor 322, internal interface 354, and the Transaction Processor 20 (not shown) that is running on the SC Processor 326. As further shown in FIG. 13, datapath 393 from the SHAA 407 executing on Application Servers 401 is implemented over and through network link 406, Network 206, CSC external network link 308, SC Security Coprocessor 322, CSC internal interface 354, to Operational SCAP 404 executing on SC Processor 326.

As shown in FIG. 13, the datapath 393 between the Server-hosted Application 407 and the SCAP 404 employs Secure RPC in a non-blocking manner. The Server-hosted Application (that has requested the data by calling the Operational SCAP 404) does not block on the storage access I/O, but rather can make asynchronous non-blocking RPC calls to storage device—hosted Operational SCAPs 404 (for purposes such as search), which can return the result of what would have been multiple storage access requests if the access were to unimproved storage devices.

Standard Secure RPC tools and protocol permit the Server-hosted Application 407 to make function calls to the SCAP 404 as though it were locally present on the same server. RPC is a client-server protocol; in this situation, the Server-hosted Application 407 is the RPC client, and the SCAP 404 is the RPC server. This is interesting from a distributed systems perspective, since the Server-hosted Application 407 'client' can make use of, in parallel, in a non-blocking manner, an unlimited number of SCAP 404 'servers'. And there is another advantage: the SCAPs can function as servers for any other purposes in addition to the SHAA-SCAP interactions focused on in this disclosure.

Application-aware infrastructure in the datacenter and/or on the AppAccel improved storage devices can store and maintain the requirements of each "supported" Server-hosted Application so that as each of these applications needs storage related resources such as the use of SCAPs 404, these resources can and will be made available.

In the preferred embodiment, the RPC mechanism initiates the execution of a Stored SCAP 409 through the Transaction Processor 20 as shown in FIG. 15. Not shown in FIG. 15 is the F+ Application Rights and Credentials 26 module that, before the SCAP is permitted to start running, verifies authentication and authorization permissions of the SCAP applet activation, as well as per request management & update requests. This whitelist functionality is inherited from the earlier F+ inventions. The F+ Application Rights and Credentials 26 module is shown on FIG. 1 of the base F+ Storage Firewall and Support System disclosure.

FIG. 15 (Initiate SCAP Execution) of the drawings, depicting elements of an improved storage device controller in accordance with the present invention, and referred to herein as the AppAccel invention, or AppAccel Improved Storage Controller, is schematically illustrated in block diagram form at 403.

As shown in FIG. 15, the Stored SCAP 409 execution is initiated by a non-blocking Secure RPC call to the SCAP 404 from the Server-hosted Application 407; if Operational SCAP 404 is not currently running (i.e. resident in SC RAM 328, Working Memory 22), then the Transaction Processor 20 starts the execution of Stored SCAP 409 into SAIL 411 on the SC Processor 326. FIG. 15 shows the sequence steps for this. As shown in FIG. 15, this 'Initiate SCAP Execution' action employs datapath 399 and datapath 398, as well as F+ State Engine 28 and other F+ System components not shown. SC Program Store 330 contains F+ SyncLink Embedded 427, which is the target for messages from the F+ Update Server as regards the SC Program Store 330. It is fair to say that the SC Program Store 330 is built around the F+ SyncLink Embedded 427, which provides the intelligence for managing the contents of the SC Program Store 330.

As shown in FIG. 15, there are six (6) Sequence steps to initiate the execution of a Stored SCAP 409 to become an Operational SCAP 404.

Step 1 is a non-blocking Secure RPC call, addressed to the Operational SCAP 404, from the Analytics Applications 407 hosted on the Application Servers 401. This RPC call is intercepted by the F+ State Engine 28, which is a component of the Transaction Processor 20 (not shown). As shown by FIG. 15, this RPC call is implemented as datapath 399 from the Analytics Applications 407. This datapath 399 passes through network interface 406, Network 206, external network interface 308, SC Security Coprocessor 322, internal interface 354, and the F+ State Engine 28 that is running on the SC Processor 326, after which the sequence proceeds to Step 3.

Step 2 of the SCAP initiation sequence: The F+ State Engine 28 and other components of the Transaction Processor 20 decide whether to permit this RPC call to proceed. If this RPC call passes authentication and authorization, then an internal datapath 398 can be employed to cooperatively engage with mechanisms within SC Program Store 330 to prepare Stored SCAP 409 to become a running executable, after which the sequence proceeds to Step 3.

Step 3: the Stored SCAP 409 is read from the SC Program Store 330, over internal interface 360, and the Stored SCAP 409 executable is loaded into SC RAM 328 (corresponding to Working Memory 22), then the sequence proceeds to Step 4.

Step 4: the RPC call parameters are passed to the now memory resident Operational SCAP 404.

Steps 5 and 6 are optional, depending on design options of the Operational SCAP 404.

Step 5: If the Operational SCAP 404 is designed to, and the passed in parameters request this, the Operational SCAP 404 will pass a status result (message) to the F+ State Engine 28, and then the sequence proceeds to Step 6.

Step 6: if the F+ State Engine 28 has been so implemented and configured, the status result (message) from the Operational SCAP 404 will be sent to the Analytics Applications 407.

If the called SCAP is already memory resident, i.e. is an Operational SCAP 404, the non-blocking RPC call from the Analytics Applications 407 is still intercepted by the F+ State Engine 28 running on the SC Processor 326. The F+ State Engine 28 and other components of the Transaction Processor 20 decide whether to permit this RPC call to proceed. If this RPC call passes authentication and authorization, then the F+ State Engine 28 will pass the RPC call parameters to the Operational SCAP 404. In this circumstance (as described above as sequence Step 5), if the Operational SCAP 404 is designed to and the passed in parameters request this, the Operational SCAP 404 will pass a status result (message) to the F+ State Engine 28, and (as described above as sequence Step 6) if the F+ State Engine 28 has been so implemented and configured, the status result (message) from the Operational SCAP 404 will be sent to the Analytics Applications 407.

RPC Information

This disclosure does not attempt to provide programming details on how to employ RPC in a non-blocking manner. There are some good introductions on the web non-blocking RPC; one of these is https://docs.oracle.com/cd/E53394_01/html/E54804/modif-4.html Secure RPC employs authentication and encryption, to establish secure data paths.

This disclosure does not attempt to provide details on RPC and Secure RPC; these are well known and widely understood. Some background information is included here.

Good introductions to RPC and Secure RPC can be found at these web pages:

http://docs.oracle.com/cd/E23823_01/html/816-4557/auth-2.html http://docs.oracle.com/cd/E19683-01/806-4078/6jd6cjrte/index.html www.ibm.com/support/knowledgecenter/ssw_aix_72/com.ibm.aix.progcomc/rpc_auth.htm http://pubs.opengroup.org/onlinepubs/9629399/chap13.htm https://libvirt.org/internals/rpc.html#wireexamplescall www.ibm.com/support/knowledgecenter/ssw_aix_53/com.ibm.aix.progcomm/doc/progcomc/rpc_auth.htm A known problem with Secure RPC is the result of its use of the Diffie-Hellman authentication scheme. A Diffie-Hellman vulnerability has been found. Details can be found at WeakDH.org, or search the web for details of the "logjam" attack.

Paper on the Diffie-Hellman Problem:

Imperfect Forward Secrecy: How Diffie-Hellman Fails in Practice Authors David Adrian, Karthikeyan Bhargavan, Zakir Durumeric, Pierrick Gaudry, Matthew Green, J. Alex Halderman, Nadia Heninger, Drew Springall, Emmanuel Thome, Luke Valenta, Benjamin VanderSloot, Eric Wustrow, Santiago Zanella-Beguelin, Paul Zimmermann http://weakdh.org/imperfect-forward-secrecy-ccs15.pdf Nothing in the present AppAccel invention precludes the use of a different, possibly non-standard, RPC-like method and/or mechanisms, or the use of different authentication and/or encryption mechanisms.

As such, the AppAccel-enabled storage device approach is the best choice for storage controller architectures for the Software Defined Storage (SDS) paradigm being introduced into large datacenters.

Overview of F+ SyncLink in the Present AppAccel Invention

The F+ SyncLink technology employed in the present AppAccel invention leverages and improves the F+ SyncLink technology disclosed in previous patent disclosures. The changes to F+ SyncLink for the present AppAccel invention involve adaptations for various processor types and the introduction of the datapath mechanisms.

The new F+ SyncLink addressing employs the "datapath" concept; SyncLink mechanisms implement a simple version of the datapath. SyncLink needed a routing architecture, and the datapath is it. It does not assume IP (Internet Protocol) addressing, so it can traverse internal components as well as bridge any of the non-IP network schemes and IoT communication protocols.

There is also an RPC call datapath, illustrated in the present AppAccel invention as carrying through the SC Security Coprocessor 322 as shown on FIG. 13; this actually relies on the SyncLink 428 relay mechanism inserted into the SC Security Coprocessor 322. As shown in FIG. 13 datapath 393 from the SHAA 407 executing on Application Servers 401 is implemented over and through network link 406, Network 206, CSC external network link 308, SC Security Coprocessor 322, CSC internal interface 354, to Operational SCAP 404 executing on SC Processor 326.

In the currently preferred embodiment, there are three (3) F+ SyncLink modules built into the present AppAccel invention, other than the F+ SyncLink component of the F+ Update Server 202. These three are the F+ SyncLink 428, F+ SyncLink 34, and F+ SyncLink Embedded 427. Any or all of these can be implemented as software, firmware, FPGA gates, a portion of an ASIC, or some other implementation. All of these make use of the SyncLink protocol as disclosed in the Provisional patent application, with the added datapath addressing and routing mechanisms.

The F+ SyncLink 428 relay is built into (or executes on) the SC Security Coprocessor 322, if a particular implementation (alternate embodiment) includes a SC Security Coprocessor 322. The F+ SyncLink 428 relay directly communicates with the F+ Update System 202 or with an intermediate relay. The F+ SyncLink 428 relay verifies data format and may ask for a repeat of a transmission if the incoming data stream does not conform to expected forms and values.

The F+ SyncLink 34 relay is shown in the AppAccel disclosure Figures as a separate component, and it can be a separate component, but in a preferred embodiment F+ SyncLink 34 is usually a module component of the Transaction Processor 20, if the Transaction Processor 20 (or something similar) is included in a particular implementation (embodiment). F+ SyncLink 34, in the preferred embodiment, employs other F+ System modules of the Transaction Processor 20 such as the F+ State Engine 28, the Authentication/Authorization 30 module, and the Access Controller 32 (and it's use of the Application Rights and Credentials Component 26) to examine and verify any data stream (Manifests, Packages, messages, RPC calls, etc.) passed through it.

The F+ SyncLink Embedded 427 is a component of the SC Program Store 330. F+ SyncLink Embedded 427 performs the function of interacting with the F+ Update System 202 by means of a datapath through the other F+ SyncLink modules used in the AppAccel invention, and of writing/reading/making changes (and other operative functions) to Stored SCAPs 409 and other software. Since the datapath to the F+ SyncLink Embedded 427 from the F+ Update System 202 is through F+ SyncLink 34, the data stream passed over this channel (Manifests, Packages, etc.) will be examined and verified by the F+ Storage Firewall's mechanisms. F+ SyncLink Embedded 427 mechanism manages the contents of the SC Program Store 330, by providing local direct installation, management, and other operations on installed software. As shown in FIG. 11 (Overview of AppAccel Invention) datapath 392 is employed by the F+ Update Server 202 to install and manage Stored SCAPs 409 (and Stored SCIPs 425).

The datapath 393 between the running Server-hosted Analytics Application 407 to the Operational SCAP 404 is the key to the value of the present AppAccel invention. The rest of the present invention is for creating, deploying, initiating, maintaining, securing, and otherwise creating conditions for the success of this datapath, much of which is provided by leveraging the base F+ Storage Firewall and Support System invention.

The SCAPs 404 and SCIPs 415 are installed to the AppAccel invention's SC Program Store 330 as illustrated on FIG. 13. On CSC Patent FIGS. 8A and 8B, storage controller component Single Processor CSC 310 contains component SC Program Store 318. On CSC Patent FIGS. 9A and 9B, storage controller component CSC with Security Co-Processor 320 contains component SC Program Store 330. Depending upon which embodiment is used as the basis for a particular design, either SC Program Store 318 or SC Program Store 330 will be where SyncLink 34 installs and maintains the Stored SCAP 409 and Stored SCIP 415 software. Transaction Processor 20 is what responds to requests to start, stop, and otherwise control application software running within SAIL 411. This permits the F+ Update Server 202 (as illustrated by FIGS. 11, 14, and 15) to add, update, and configure Stored SCAPs 409 during storage device operation (no downtime required). The F+ Update Server 202 can therefore deploy, provision, update, and configure common applets to run on the shared (standard) ABI and SBI provided by SDBI 412 and MALI 413.

As shown in FIG. 14, the F+ SyncLink module 428 in the SC Security Coprocessor 322 has been changed from the corresponding SyncLink module in the CSC invention; the changes relate to the deployment of SCAPs. The F+ SyncLink module 428 in the SC Security Coprocessor 322 is reached by a datapath from the F+ Update Server 202, over network interface 408, Network 206, and external interface 308. External interface 308 represents all of the network interface 410, External Interface (NIC, Network Interface Card) 423, and internal interface 416.

As shown in FIG. 14, the F+ SyncLink module 34, running on the SC Processor 326, is unchanged. This is reached by a datapath from F+ SyncLink module 428 which passes through internal interface 354. F+ SyncLink module 34 is part of Transaction Processor 20, and relies on other components of Transaction Processor 20 (State Engine 28, Authentication/Authorization 30, and Access Controller 32) to verify SCAPs 409 to be stored in the SC Program Store 330.

As shown in FIG. 14, there is a datapath 396 between F+ SyncLink module 34 and component F+ SyncLink Embedded 427, part of the SC Program Store 330; this datapath 396 passes through internal interface 360. Stored SCAPs 409 are verified before they are stored in the SC Program Store 330.

F+ SyncLink Embedded 427 is a new component of the SC Program Store 330. This can be implemented as software, firmware, FPGA gates, a portion of an ASIC, or some other implementation. F+ SyncLink Embedded 427 performs the function of interacting with the F+ Update System 202 and the various other F+ SyncLink modules and of writing/reading/making changes (and other functions) to Stored SCAPs 409 and other software.

As illustrated by FIG. 14, Stored SCAP 409 can be seen in the SC Program Store 330. Stored SCAP 409 is deployed to the SC Program Store 330 by means of the F+ Update Server 202 employing the datapath to the F+ SyncLink Embedded 427 to deploy the Stored SCAP 409 to storage media of SC Program Store 330.

Referring now to FIG. 16 (Server Hosted Analytics Application (SHAA) using SCAPS to parallel search multiple storage devices): this is an example of multi-haystack search, a building block of Big Data Analytics and Cognitive Computing. This is one of the ways the present invention can be applied, with many other more complex interactions possible.

FIG. 16 provides one of several preferred embodiment search algorithm archetypes or design patterns. The correlation between FIG. 16 and FIG. 11, FIG. 12, FIG. 13, FIG. 14, and FIG. 15 can be shown through a description of which datapath(s) on which Figures is/are used for each step of the FIG. 16 flowcharted algorithm.

It is easier to understand the F+ AppAccel system by following the flow of data along datapaths. The term datapath (as shown in Glossary) is an abstraction for session connections between a server and an endpoint or part of an endpoint. A datapath is implemented over various components such as network interfaces. It consists of an addressing scheme, such as URLs, and a collaboration or data transfer protocol. A datapath can move data between any two identified entities (actors), which may be virtual entities, through as many 'relays' as necessary, and through whatever layers 1 & 2, switching, etc. The datapath is not a 'connection' as it is commonly understood. It is not a circuit; it is a set of components or network nodes passing data (messages) along the best path they know about, so that the data gets closer to where it's going. AppAccel Improved Storage Devices 430 both contain internal datapaths and interoperate with other parts of the datacenter over and through datapaths.

As illustrated by FIG. 11, enabling the functionality of AppAccel Improved Storage Devices 430 are datapaths 390, 392, and 393. Datapath 393 connects Server Hosted Analytics Applications (SHAAs) 407 executing on Application Servers 401 with Operational SCAP 404 executing on SC Processor 326, which is part of the AppAccel Improved Storage Devices 430. Datapath 390, similarly, connects 'Software making storage access requests' 402 executing on 'Servers' 405 with Operational SCIPs executing on SC Processor 326. And datapath 392 connects the F+ Update Server 202 to Stored SCAP 409 shown as stored on SC Program Store 330, though when the system starts there may not yet be a Stored SCAP 409 installed to a particular AppAccel Improved Storage Device 430, in which case the appropriate Stored SCAP 409 is caused to be installed (stored) if necessary, or configured or reconfigured. The actions of these datapaths are illustrated by FIGS. 13, 14, and 15.

Datapaths 390, 393, and 392, in common with other datapaths (including those not shown) that connect from an external mechanism into the AppAccel Improved Storage Devices 430, pass through the F+ Storage Firewall 12, even if this is not explicitly mentioned in this specification.

As can be seen in FIG. 16, after the SHAA starts the next step is the setup of the algorithm. This is also the top or start of what should be regarded as a "loop" of searching that may have different search parameters on each iteration of the loop.

As can be further seen in FIG. 16, the SHAA-SCAP search loop starts with determining which storage devices to search then employs the F+ Update Server to provision the appropriate SCAP. As can be seen on FIG. 11 (Overview of AppAccel Invention) and FIG. 15 (Initiate SCAP Execution), datapath 391 links the SHAA 407 and F+ Update Server 202. Datapath 391 is implemented over network link 406, Network 206, and network link 408.

The SCAP selected by the F+ Update Server for a particular storage device must correspond to the requirements of the SHAA, and the selected storage device, and possibly the dataset on that storage device.

The F+ Update Server installs the appropriate SCAP if it is not already provisioned, then provides some or all of the required operational configuration to the SCAP. As shown in FIG. 11, datapath 392 is employed by the F+ Update Server 202 to install and manage (provision and configure) SCAPs, represented on FIG. 11 as Stored SCAP 409.

As shown in FIG. 14 (Installation and Management of SCAP) and as shown in FIG. 15 (Initiate SCAP Execution), datapath 392 is shown to be assembled from datapaths 394, 395, 396, and 397, into the Stored SCAP 409. Datapaths 395 and 396 are implemented over and through CSC internal interfaces such as, but not limited to, 354 and 360, processors SC Security Coprocessor 322 and SC Processor 326 hosting (executing) F+ SyncLink modules 428 and 34 respectively, as well as F+ SyncLink Embedded 427 located within the SC Program Store 330. Datapath 397 is implemented within the SC Program Store as part of the design and coding of F+ SyncLink Embedded 427.

Datapath 394, shown in FIG. 14 (Installation and Management of SCAP), and FIG. 15 (Initiate SCAP Execution), is implemented over and through CSC external network interface 308, Network 206, network link 408, to F+ Update Server 202.

As shown in FIG. 15 (Initiate SCAP Execution), there is a sequence of 6 steps to start the Stored SCAP 409 executing, i.e. so that it becomes Operational SCAP 404. These steps employ datapaths 399 and 398. Either the SHAA 407 or the F+ Update Server 202 or another mechanism can cause the initiation of these steps, i.e. can be the initiator referred to below. FIG. 15 shows the initiator as SHAA 407. The initiator employs datapath 399 to carry the appropriate SCAP initiation transaction to the F+ State Engine 28 (step 1) which causes it to employ datapath 398 to fetch Stored SCAP 409 from the SC Program Store 330 (step 2), then after authentication steps not shown on FIG. 15, to start the execution as shown by the Operational SCAP 404 (step 4), which provides a status return value to the F+ State Engine 28 (step 5) indicating readiness. Then datapath 399 is employed to send a return status value to the initiator (step 6). After this sequence of steps, the SHAA 407 can start communicating (interacting) with Operational SCAP 404. On FIG. 15 datapath 399 is shown to be implemented over and through network link 406, Network 206, CSC external network link 308, SC Security Coprocessor 322, and SC Processor 326. On FIG. 15 datapath 398 is shown to be implemented over and through SC Processor 326, CSC internal link 360, and SC Program Store 330.

The SHAA 407 (or an agent mechanism representing the SHAA) communicates with each of the provisioned and executing SCAPs, to provide the current search parameters. As shown in FIG. 11 (Overview of AppAccel Invention), datapath 393 carries the two way communication (interaction) between a SHAA 407 executing on one or more Application Servers 401 to Operational SCAPs 404 provisioned to (executing on) AppAccel Improved Storage Devices 430. The Operational SCAPs 404 are able to access (read, write, etc.) Files (Data, etc.) 42 resident on the Storage Media 312 on the same AppAccel Improved Storage Devices 430.

As shown in FIG. 13 datapath 393 from the SHAA 407 executing on Application Servers 401 is implemented over and through network link 406, Network 206, CSC external network link 308, SC Security Coprocessor 322, CSC internal interface 354, to Operational SCAP 404 executing on SC Processor 326.

As can be further seen in FIG. 16, the resulting (post search parameter) interaction between the SHAA and the SCAP can be simple or complex. At some point in time, after searching their storage devices, all SCAPs will have completed and reported to the SHAA. As is further shown in the FIG. 16 flowcharted algorithm, the SHAA waits for all SCAP results then does the joins, compares, etc. (i.e. the HADOOP or similar map reduce step) to produce a report for the human operator, who may decide to rerun the search with different search parameters, which perhaps causes the search to be of different storage devices or even a very different search. This FIG. 16 example search algorithm, one of the preferred embodiments, is both simple and powerful.

To clarify the SCAP creation, deployment, and provisioning process that supports the FIG. 16 flowchart: In a preferred embodiment, a SHAA or some other datacenter mechanism tells the F+ Update Server (or some other management service) to prepare and configure SCAPs for hosting and executing on improved storage controllers that are part of improved storage devices.

In this preferred embodiment, before installation (deployment), SCAPs are generally stored on the F+ Update Server as sort of 'template' software programs, with corresponding portions of the SCAPs added by the F+ Update Server just before deploying them to corresponding improved storage devices. This means that these corresponding portions are localized for the specific improved storage devices and the data sets stored on them. They may also be provided by the SHAAs (or the SHAAs' programmers) as needed, in any of several formats, and in a possible future embodiment may be generated in other ways.

Also, in this preferred embodiment, before installation (deployment), SCAPs are generally linked to in some way by, or identified in some way, by the F+ Update Server's Configuration Database. They are stored in a different way within the F+ Update Server after they have been deployed at least once.

Also, in this preferred embodiment, before they can start to execute, SCAPs must be first installed onto on the improved storage devices; then they are locally available to be activated to execute. The action of putting a SCAP on a storage device is 'deploying' or installing, while the process of provisioning implies both installation and activating.

The mechanism that enables SCAPs to be 'dynamically' data-set-aware (DSA) is the replacement of an older SCAP by a newer one better suited to the dataset characteristics, where this replacement is under the direct control of the F+ management mechanisms such as the SyncLink, F+ SyncLink Embedded, and F+ Update Server, but is ultimately under the control of whomever or whatever controls the SHAA or SHAAs.

Further considering the FIG. 16 flowchart as an organized set of functional operations provides another way to understand this disclosure. The reader can step through the FIG. 16 flowcharted idealized SHAA (Server Hosted Analytics Application) algorithm for applying the use of SCAPs to parallel 'search' as an example operation on AppAccel Improved Storage Devices 430, sometimes abbreviated as A.I. storage devices.

This FIG. 16 flowchart is from the point of view of the SHAA, or an intermediate mechanism acting on behalf of the SHAA (intermediate between the SHAA and the SCAPs). Of course, where the FIG. 16 flowcharted idealized SHAA algorithm makes use of 'search' as an example operation, the same flowchart and its component steps and loops can be employed for any other parallelizable storage facing operation of any server hosted application.

After the SHAA starts at 450, the parallel algorithm is set up, labeled 'Algorithm set up' at 452. This is the start of the loop ('Dataset Search Loop' at 472) that performs an operation such as 'search' on a dataset.

The 'Search Complete?' diamond 454 provides a decision point: If the answer is 'No' (on line 474) then the intent is to start a parallel operation as indicated by operation-step 462 such as 'search', on a set of AppAccel Improved Storage Devices 430, or if 'Yes' then the flow continues through the SHAA algorithm without the parallel 'search' operation. On 'Yes', there are, of course, no per-SCAP results, and the flow quickly passes through operation-steps 456 and 458 to reach the flowchart diamond labeled 'Terminate?' 460.

The FIG. 16 flowchart steps 462, 464, 466, through 468 (the right-hand side of the flowchart) implement the parallel operation. Most of these steps are SHAA component modules (software subroutines or functions). The parallel operation starts with a transition from the 'Search Complete?' diamond 454 (such as a function call); on the flowchart this transition is represented by a line labeled 'Parallel A.I. Storage Device Search' 474. Of course if the operation is other than a search the actual SHAA software will have different internals labels for its component modules.

The FIG. 16 flowchart step at 462 is a part of the SHAA that selects which Improved Storage Devices 430 to operate on (i.e. which devices to install and activate SCAPs on), where the operation indicated on FIG. 16 is search. In some embodiments, this device selection may require the use of an index or other mechanism that indicates some sort of mapping between the dataset being operated on and the Improved Storage Devices 430 that contain this dataset. It is also possible that in some embodiments, the selected Improved Storage Devices 430 are determined in some other manner such as an arbitrary set, if there is no reasonable dataset-to-storage-device mapping or index.

The FIG. 16 flowchart step at 464, "SHAA requests to F+ Update Server to provision the corresponding SCAP Search Applet to identified AppAccel improved storage devices", is a part of the SHAA that selects (identifies) one or more SCAPs that correspond to the requirements of the SHAA and/or the dataset and/or the selected Improved Storage Devices 430, then sends a request to the F+ Update Server 202 to provision this SCAP or these SCAPs to the identified Improved Storage Devices, or requests of the F+ Update Server to select (identify) one or more SCAPs that correspond to the requirements of the SHAA and/or the dataset and/or the selected Improved Storage Devices 430, then provision this SCAP or these SCAPs to the identified Improved Storage Devices. The F+ Update Server is expected to install and activate (make operational) these SCAPs by deploying the executables and basic configuration and activation information, such as permission to execute on the storage device on the identified dataset in collaboration with the identified SHAA. In some embodiments, it is a different mechanism that provides this F+ Update Server functionality on behalf of the F+ Update Server.

The FIG. 16 flowchart step at 466, labeled "SHAA communicates with each of the provisioned SCAP Search Applets, provides search parameters", is a part of the SHAA that initiates communication with each SCAP as it becomes operational, and may be also be tasked in some embodiments with sending the requests to the Improved Storage Devices 430 or to the F+ Update Server to provision the SCAPs or to cause the Stored SCAPs to become Operational SCAPs. Once the Operational SCAPs are executing (activated i.e. operational), the SHAA can provide parameters for the operation, such as search. In a preferred embodiment, the SCAPs are verified to be capable of communicating with a SHAA before operational (search) parameters are provided. Once the parameters have been provided, the SCAP is expected to start to perform the intended operation. Parameters may include schedule and other operational (run-time) configuration information. In some embodiments, the flowchart step at 466 can be considered the core of the AppAccel parallel operation flow because the SCAPs start to operate properly only once they receive operational parameters. The SHAA to SCAP communication path to provide operational parameters may be direct, or may be indirect such as through the F+ Update Server or through some other mechanism. The present invention, in at least one embodiment, enables the SHAA to adjust operational parameters on the fly, as necessary, perhaps in response to intermediate results reported by the SCAP. While it is reasonable in the present AppAccel invention that a SCAP may be written to have hardcoded (i.e. firmly fixed or default) configuration parameters, hardcoding configuration parameters may deprive a SCAP of the benefits provided by adjusting the configuration parameters on an as-needed basis.

The FIG. 16 flowchart decision diamond 468 is labeled 'Are per-SCAP results Complete?'. This represents not only a decision test but also a part of the SHAA that receives and accepts partial results from the SCAPs. It controls a loop branch on 'No' represented by a line labeled 'Per-SCAP Search Loop' 478 that indicates a possible iteration on step 466, in order to adjust operational parameters to one or more SCAPs. In one preferred embodiment, this iteration applies criteria defined by the SHAA to decide at diamond step 468 whether the per-SCAP results are 'complete'. If 'not complete' then loop iterates back through step 466. If the per-SCAP results are determined to be 'complete', then the per-SCAP results are reported and the parallel flow can proceed to the next step labeled 'SHAA joins, compares' 456, where the flow is represented by the line 476.

The FIG. 16 flowchart step at 456 labeled 'SHAA joins, compares' does the hard work of the SHAA algorithm with the data returned from the SCAPs, creating a ranked set of results, etc. This step brings together the results of the work done by the SCAPs employed within the loop containing steps 466 and 468.

The FIG. 16 flowchart step at 458 labeled 'SHAA reports . . . ' translates the parallel operation's results into a format suitable for communicating to an external entity which will decide whether these results meet the criteria defined by the SHAA or some other entity.

The FIG. 16 flowchart diamond 460, labeled 'Terminate?', either permits the SHAA to terminate, or branches ('Dataset Search Loop' 472) on 'No' to the step 'Algorithm set up' at 452, described above, to prepare for another attempt to accomplish the purpose of the SHAA.

Further regarding FIG. 16, the flowcharted idealized SHAA parallel 'search' algorithm can be viewed through the lens of alternate embodiments. Many of the steps (elements) of the FIG. 16 flowchart might be omitted (skipped) in operation of alternate embodiments of the present (AppAccel) invention, depending upon the specific requirements and objectives of an embodiment.

For example, if the FIG. 16 flowchart 'Terminate?' 460 diamond were not present, implying also the absence of the 'Dataset Search Loop' line 472 which iterates from the 'Algorithm set up' 452 through the 'Terminate?' 460 diamond, the effect on that embodiment would be to eliminate the possibility of iterating and instead the flow would immediately terminate after the external report at step 458.

Or, if the FIG. 16 flowchart 'Search Complete?' 454 diamond were not present in an alternate embodiment, the branch to the labeled 'Parallel A.I. Storage Device Search' 474 would be a single function call from the end of the step at 452, labeled "Algorithm set up", to the step at 462, labeled "SHAA determines . . . ".

Another FIG. 16 flowchart step that might be omitted in an alternate embodiment is at 456, labeled "SHAA joins, compares", which would be the situation if, for example, the objective of that alternate embodiment were to report all of the per-SCAP results in a raw form. If the step at 458 were to be omitted from some alternate embodiment, then in that embodiment there would be no external decision maker controlling the SHAA's operational flow; this would be useful if the SHAA at decision diamond 460, labeled "Terminate?", had predefined success criteria by which to judge the results of the step labeled 'SHAA joins, compares' at 456.

If the FIG. 16 flowchart step at 462, labeled "SHAA determines . . . ", were omitted in an alternate embodiment, that version of the present invention would be successful if the SHAA had a known or predetermined set of Improved Storage Devices 430 to operate on (to search), such as perhaps a single Improved Storage Device 430.

Omitting the FIG. 16 flowchart step at 464, labeled "SHAA requests to F+ Update Server to provision the corresponding SCAP . . . ", from an alternate embodiment could be useful if, in that alternate embodiment, the SHAA were to employ SCAPs that were known to be already provisioned, or if, in that alternate embodiment, the AppAccel Improved Storage Devices 430 and the relevant F+ Update Server were to have the ability to provision a SCAP as needed when a SHAA tries to contact it.

The FIG. 16 flowchart step at 466, labeled "SHAA communicates with each of the provisioned SCAP . . . ", can not be omitted—it is essential to the operation of all AppAccel invention embodiments, as obviously the SCAP or SCAPs have to be configured for operation and the SCAP operation has to be started on its mission. The parameters may be bundled with the SCAP when deployed, or even derived by the SCAP from the conditions on the Improved Storage Device 430 it is running on, but there have to be some sort of parameters (even if hardcoded) and something to cause the SCAP (or other software) to start to execute.

If flowchart decision diamond 468 were omitted from an alternate embodiment, there would be no 'Per-SCAP Search Loop' 478, which means that, in that alternate embodiment, the SCAPs would return initial results to the SHAA based on the initial operational parameters, but the SHAA would not have the option of adjusting the parameters in reaction to the initial results by merely looping back to the step at 466. If the 'Dataset Search Loop' 472 is retained but the 'Per-SCAP Search Loop' 478 is omitted, the SCAP parameters can be adjusted once each time through the 'Dataset Search Loop' 472. If both loops are omitted, the way to repeat the step at 466 is to re-run the SHAA from the step at 450.

Another way to consider the FIG. 16 flowchart is to reduce it to essentials; i.e. to identify the flowchart steps that may be in combination in some alternate embodiment. There are several simpler combinations that would work, albeit with reduced functionality compared to the preferred embodiment. One of these simpler embodiments is:

- SHAA starts or is currently executing (the step at 450)
- SHAA determines or identifies or selects which AppAccel Improved Storage Devices 430 to operate on, such as which to search (the step at 462)
- SHAA (or something) starts the SCAPs on the Improved Storage Devices 430, where the initiation of a SCAP execution (an activation into operational status) is a sort of operational parameter even if no other parameter is provided to the SCAP (the step at 466)

SHAA receives the results of the SCAP operations (the step at 468)

But a more powerful approach is to employ the FIG. 16 flowchart loops 472 and 478, and add steps such as the step at 464 to this simpler embodiment provided above:

SHAA uses the F+ Update Server (or something) to provision to each of the AppAccel Improved Storage Devices 430 the SCAP (or other) software that is a match for (a) the requirements of the SHAA, (b) each particular AppAccel Improved Storage Device 430, and (c) the data format of the data expected to be or discoverable to be present on each particular AppAccel Improved Storage Device 430 (the step at 464). (If the SCAP lacks the ability to read (process) the data format discovered on that Improved Storage Device 430, some combination of the SHAA and/or the F+ Update Server and/or some other mechanism upgrades the SCAP.)

And an even more powerful embodiment, closer to the preferred embodiment, would enhance the functionality of the step at 466:

Parameterize the SCAPs, and the SHAA's use of the SCAPs, in order for the SHAA to provide pertinent operational parameters at runtime (while executing) to the provisioned SCAPs, probably by directly or indirectly communicating with them, in order to adjust SCAP operations (the step at 466).

The full flowchart as shown in FIG. 16 is a preferred embodiment of the present AppAccel invention, a system for the acceleration of application software, where this application software is expected to generally be server-hosted analytics, but there are there are performance benefits for other embodiments such as an embedded application in a medical device, with a single improved storage device and a single pre-loaded SCAP.

The key improvements of the present invention (AppAccel) over my preceding Customizable Storage Controller (CSC) invention described in my previous U.S. Pat. No. 9,455,955, include that the present AppAccel invention has the addition of a well-managed execution environment and improvement of support for collaboration of the AppAccel improved storage devices 430 with entities such as server-hosted software 407 external to the local device.

The improvements to the software execution environment are provided by several components, which provide significant benefits individually, and in combination provide an enormous advantage for a variety of classes of software. These include the addition to the SC Program Store 330 of the 'F+ SyncLink Embedded' 427, as a component of the SC Program Store 330. In one or more of the preferred embodiments the 'F+ SyncLink Embedded' 427 is a small secure processor. This is an improvement of the present AppAccel invention over the earlier CSC invention which relies on the F+ SyncLink 34 module component of the SC Processor 326 (in combination with some other software and/or hardware on the SC Processor 326) to provide management of stored software such as Stored SCAPs in the SC Program Store.

The well-managed execution environment of AppAccel also includes better defined abstraction layers as illustrated in FIG. 12. This includes APIs and ABIs for the SAIL, SDBI, and MALI layers, plus other components not shown.

The improvements to the mechanisms that support collaboration of the AppAccel improved storage devices with entities such as server-hosted software external to the local device include a better datapath mechanism for routing control messages or anything else through various links. The AppAccel datapath mechanisms provide an "optimized for collaboration" method to route data and control messages across non-IP interfaces. This approach enables the combination of one or more SHAAs with one or more SCAPs on one or more SC Processors on one or more AppAccel Improved Storage Devices.

The CSC invention included the ability to execute on each CSC improved storage device possibly ephemeral micro-services or possibly permanent web services that can be activated as needed. This is one of the benefits of employing the standard RPC mechanisms and methods. The AppAccel invention has an improved collaboration functionality supporting improved datacenter orchestration mechanisms, for better deployment and activation of micro-services and other software such as SCAPs and SCIPs.

The combination of datapaths with Operational SCAPs as RPC-reachable micro-servers enables the AppAccel Improved Storage Devices to provide a calling entity with both (a) faster access to the data while (b) requiring less load and network bandwidth overhead from the data center (or data warehouse) infrastructure. These AppAccel improvements over the earlier CSC (Customizable Storage Controller) provide better support for the hosting of web services and micro-services directly from the AppAccel Improved Storage Devices, and this same functionality also supports innovative architectures for the AppAccel Improved Storage Devices.

| Additional Glossary for the AppAccel Invention | |
|---|---|
| AI storage devices | AppAccel Improved Storage Devices support the improved performance of server-hosted software through the use of SCAPs to offload the servers, reduce network round-trips, and reduce overall network load. AI storage devices are also a fundamental building block for Cognitive Computing. |
| Applet | Industry term for small software applications or portions of larger distributed software application systems, sometimes viewed as temporary, mobile, or ephemeral, but possibly installed or memory-resident, often with limited scope or functionality. |
| DSA data-set-aware | data-set-aware or data set aware or data-set aware As described in the material on SCAPs, the 'data-set-aware portions of algorithms' are the portions of the server-hosted applications that know the data formats and other data-set specific details of how to best interact with the data. These portions of algorithms can be abstracted and/or encapsulated for hosting and execution on the improved storage devices, in proximity to the data. Different improved storage devices will likely have data format differences, so therefore differently coded SCAPs even though they are designed to work with the same SHAA. |

-continued

| Additional Glossary for the AppAccel Invention | |
|---|---|
| Datapath | An abstraction for session connections between a server and an endpoint or part of an endpoint. A datapath is implemented over various components such as network interfaces. It consists of an addressing scheme, such as URLs, and a collaboration or data transfer protocol. A datapath can move data between any two identified entities (actors), which may be virtual entities, through as many 'relays' as necessary, and through whatever layers 1 & 2, switching, etc. The datapath is not a 'connection' as it is commonly understood. It is not a circuit; it is a set of components or network nodes passing data (messages) along the best path they know about, so that the data gets closer to where it's going. |
| Network chasm | Server-side needs to use resources located on the storage-side; The network chasm is a gap (of time) caused by the very activity the data center was built to handle: as the data center activity increases, the network chasm grows larger |
| SCAP | Storage Controller Application Program Provisioned applets execute on the AppAccel Improved Storage Devices, where SCAPs can run at local storage access latency, without network latency slowing the data access. This supports running server-hosted application software such as SHAAs with high performance access to data. |
| SCIP | Storage Controller Interface Program Storage devices generally have externally visible storage interfaces such as SATA. The AppAccel Improved Storage Devices can execute multiple of these in parallel, support on-demand additions, and run these in parallel to the active SCAPs. |
| Server-side | Array of servers, server blades, and other compute resources |
| SHAA | Server Hosted Analytics Application software is a variety of server-hosted application software. The AppAccel Improved Storage Devices (AI storage devices) support the improved performance of server-hosted software through the use of SCAPs to offload the servers, reduce network round-trips, and reduce overall network load. |
| Storage-side | Pool of storage resources, no matter how it is arranged |
| Virtualization | Refers to the creation of a virtual machine that acts like a real computer with an operating system. Software executed on these virtual machines is encapsulated from the underlying operating environment. The computer (often called the host computer) is the actual hardware on which the virtualization takes place. The virtual computer is sometimes referred to as a guest computer. The words host and guest are used to distinguish the software that runs on the physical machine from the software that runs on the virtual machine. The software or firmware that creates and manages a virtual machine on the host computer hardware is called a hypervisor. |

What is claimed is:

1. An improved data storage device comprising:
a data storage component;
a storage controller processor associated with said data storage component and operative to receive and execute multiple operational Storage Controller Application Programs (SCAPs) and/or operational Storage Controller Interface Programs (SCIPs) and/or other software;
means for coupling said storage device to host computers and/or other digital systems via a digital network or communication system;
a storage controller program store for receiving and storing SCAPs, SCIPs and/or other software from the host computers and/or other digital systems;
means for installing the stored SCAPs and/or SCIPs and/or other software into said storage controller program store;
means for causing the installed SCAPs and/or SCIPs and/or other software to start to execute on said storage controller processor; and
means for causing the operational SCAPS and/or operational SCIPs and/or other executing software to be inter-operatively associated with server-hosted analytics application software (SHAAs) and/or other software executing on a host computer and/or other digital system;
whereby the collaborative combination of the SCAPs and/or SCIPs and/or other software executing on said storage controller processor, and the software executing on the host computer and/or other digital system positions SCAP operations, including search operations, proximate to stored data, whereby the SCAP and SCIP and other installed software can be tailored to the contents of the improved data storage device as well as to the improved data storage device's operational characteristics,
thereby enabling more efficient operations including an improved and faster deep search, and/or
reducing the elapsed time to completion of the software executing on the host computer and/or executing on other digital systems, and/or
reducing the execution run-time CPU-cycles of the software executing on the host computer and/or executing on other digital systems, and/or
reducing network congestion by reducing network traffic by reducing the number of host computer-to-storage roundtrips, and/or
enabling deeper search and resident continuous re-search, as data streams on to said improved data storage device and/or as data on the improved data storage device is modified by other means, so as to discover results that might not be discovered in any other way.

2. A data storage device, comprising:
a storage media component; and
a storage controller including
- a program store operative to receive and store one or more discrete softwares included in a group of discrete softwares consisting of,
  - content management softwares Storage Controller Application Programs (SCAPs) or Storage Controller Interface Programs (SCIPs),
  - data management softwares (SCAPs or SCIPs),
  - storage access softwares (SCIPs),
  - data access softwares (SCIPs),
  - other application softwares (SCAPs),
  - search softwares (SCAPs),
  - other interface softwares (SCIPs), and
  - Cognitive Computing (Big Data Analytics/Artificial Intelligence) application softwares (SCAPs), and
  - device management softwares; and
- a storage controller processor coupled to said storage media component and said program store, said storage controller processor being operative to initiate or continue execution of one or more of the stored discrete softwares, said storage controller further including:
- linking means for coupling the data storage device to one or more host computers or other digital systems via a network or other communication system.

3. A data storage device as recited in claim 2 wherein said storage controller further includes additional linking means for causing one or more of the discrete executing softwares to be inter-operatively associated with SHAAS or other softwares executing on the host computer[s] and/or other digital systems.

4. A data storage device for use in a datacenter environment or the like including one or more data storage devices, such device(s) being capable of accelerating the performance of algorithms instantiated in softwares implementing search and other data access and data processing steps, these softwares being a collaborative combination of application softwares, such as Server Hosted Analytics Applications (SHAAs), and storage-device-resident softwares, such as Storage Controller Application Programs (SCAPs), and Storage Controller Interface Programs (SCIPs), operative to execute on data storage devices which store data being searched, accessed, and/or processed, comprising:
a storage media component;
data linking means for communicating data to and from said storage media component; and
a storage controller including
  program storage means
    operative to receive and store one or more discrete softwares
    included in a group of discrete softwares consisting of
    content management softwares (SCAPs or SCIPs),
    data management softwares (SCAPs or SCIPs),
    storage access softwares (SCIPs),
    data access softwares (SCIPs),
    search softwares (SCAPs),
    Cognitive Computing (Big Data Analytics/Artificial Intelligence) application softwares (SCAPs),
    other interface softwares (SCIPs),
    other application softwares (SCAPs), and
    device management softwares and
  a storage controller processor coupled to
    said storage media component and
    said program storage means,
    said storage controller processor being operative to initiate or continue execution of one or more of the stored discrete softwares in response to internal or external events, or storage access or software initiation transactions, the execution of the one or more discrete softwares providing support for runtime performance acceleration of applications and/or other softwares.

5. A data storage device as recited in claim 4 wherein said program storage means includes a random access memory component for supporting ephemeral or memory-resident (non-persistent) ones of said one or more discrete softwares included in said group of discrete softwares.

6. A data storage device as recited in claim 4 wherein said ones of said one or more softwares of the executing discrete softwares are co-resident on the storage controller processor and/or other execution components of the data storage device, and wherein sharing of one or more software components is supported.

7. A data storage device as recited in claim 4 wherein modified versions of said ones of said one or more softwares of the executing discrete softwares are concurrently co-resident on the storage controller processor and/or other execution components of the data storage device.

8. A data storage device as recited in claim 4 wherein means are provided for update or modification of the data storage device by adding, replacing, or deleting ones of said one or more softwares of the executing discrete softwares and components of the execution environment, or by adding, replacing, or deleting configuration parameters for any part of the data storage device.

9. A data storage device as recited in claim 4 wherein the storage controller processor and other execution components of the data storage device employ means for managing state table transitions caused by transactions and events, whereby the data storage device is enabled to scan inputs, and to scan the execution environment on state table transitions, and to scan currently executing and stored discrete softwares, and evaluate state table transition actions relative to the status of the execution and data components of the data storage device, thereby providing greater security and performance.

10. A data storage device as recited in claim 4 wherein the actions of ones of said one or more softwares of the executing discrete softwares customizes the data storage device by defining and permitting modification of functional and behavioral characteristics thereof in order to execute configured search softwares, other configured data access softwares and configured data processing softwares that effect a continual research of the contents of the storage media component as data is stored on to the data storage device and/or while the data contents of the data storage device changes for other reasons, thereby potentially discovering results that might otherwise not be discovered.

11. A data storage device as recited in claim 4 wherein the actions of ones of said one or more softwares of the executing discrete softwares customizes the data storage device by defining and permitting modification of functional and behavioral characteristics thereof in order to execute search softwares, other data access softwares and data processing softwares that have been configured to correspond to the contents of the storage media component in order to enable more comprehensive search operations and other data access operations and data processing operations thereby discovering or accomplishing search results or other data access results or data processing results that might not be discovered or accomplished in any other way.

12. A data storage device as recited in claim 4 wherein the actions of ones of said one or more softwares of the executing discrete softwares customizes the data storage device by defining and permitting modification of functional and behavioral characteristics thereof in order to execute search softwares, other data access softwares and data processing softwares that have been configured to correspond to the contents of the storage media component thereby enabling faster search operations and other data access operations and data processing operations.

13. A data storage device as recited in claim 4 wherein said program storage means includes a persistent program store and a random access memory component that interoperate to support the initiation of execution and continued execution of ones of said one or more discrete softwares included in said group of discrete softwares.

14. A data storage device as recited in claim 4 wherein the actions of ones of said one or more softwares of the executing discrete softwares customizes the data storage device by defining and permitting modification of functional and behavioral characteristics thereof to provide accelerated temporal performance for ones of said one or more discrete softwares included in said group of discrete softwares.

15. A data storage device as recited in claim 4 wherein the actions of ones of said one or more softwares of the executing discrete softwares customizes the data storage device by defining and permitting modification of functional and behavioral characteristics thereof to enable faster and more responsive interoperation with datacenter storage architectures such as Software Defined Storage (SDS).

16. A data storage device as recited in claim 4 wherein the actions of ones of said one or more softwares of the executing discrete softwares customizes the data storage device by defining and permitting modification of functional and behavioral characteristics thereof to enable storing objects (object models) such as F+ Bubbles and Docker Containers, and to be able to execute these objects as SCAPs on the data storage device.

17. A data storage device as recited in claim 4 wherein said program storage means includes a persistent program store providing persistence for ones of said one or more discrete softwares included in said group of discrete softwares.

18. A data storage device as recited in claim 17 wherein said persistent program store includes means for management of ones of said one or more discrete softwares included in said group of discrete softwares.

19. A data storage device as recited in claim 4 wherein the actions of ones of said one or more softwares of the executing discrete softwares customizes the data storage device by defining and permitting modification of functional and behavioral characteristics thereof in order to execute search softwares, other data access softwares and data processing softwares that have been tailored to correspond to the contents of the storage media component thereby enabling faster search operations and other data access operations and data processing operations.

20. A data storage device as recited in claim 19 wherein the actions of ones of said one or more softwares of the executing discrete softwares further customizes the data storage device by defining and permitting modification of functional and behavioral characteristics thereof in order to execute search softwares, other data access softwares and data processing softwares that have been configured to correspond to the contents of the storage media component thereby enabling faster search operations and other data access operations and data processing operations.

21. A data storage device as recited in claim 4 wherein the actions of ones of said one or more softwares of the executing discrete softwares customizes the data storage device by defining and permitting modification of functional and behavioral characteristics thereof in order to execute tailored search softwares, other tailored data access softwares and other tailored data processing softwares that have been tailored to correspond to the contents of the storage media component in order to enable more comprehensive search operations and other data access operations and data processing operations thereby discovering search results or other data access results that might not be discovered or accomplished in any other way.

22. A data storage device as recited in claim 21 wherein the actions of ones of said one or more softwares of the executing discrete softwares further customizes the data storage device by defining and permitting modification of functional and behavioral characteristics thereof in order to execute search softwares, other data access softwares and data processing softwares that have been configured to correspond to the contents of the storage media component in order to enable more comprehensive search operations and other data access operations and data processing operations thereby discovering or accomplishing search results or other data access results or data processing results that might not be discovered or accomplished in any other way.

23. A data storage device as recited in claim 4 wherein the actions of ones of said one or more softwares of the executing discrete softwares customizes the data storage device by defining and permitting modification of functional and behavioral characteristics thereof in order to execute tailored search softwares, other tailored data access softwares and other tailored data processing softwares that effect a continual re-search of the contents of the storage media component as data is stored on to the data storage device and/or while the data contents of the data storage device changes for other reasons, thereby potentially discovering results that might otherwise not be discovered.

24. A data storage device as recited in claim 23 wherein the actions of ones of said one or more softwares of the executing discrete softwares further customizes the data storage device by defining and permitting modification of functional and behavioral characteristics thereof in order to execute configured search softwares, other configured data access softwares and configured data processing softwares that effect a continual re-search of the contents of the storage media component as data is stored on to the data storage device and/or while the data contents of the data storage device changes for other reasons, thereby potentially discovering results that might otherwise not be discovered.

* * * * *